(12) United States Patent
Saito et al.

(10) Patent No.: US 9,280,143 B2
(45) Date of Patent: Mar. 8, 2016

(54) SENSITIVITY ADJUSTMENT DEVICE AND RADIO WAVE COMMUNICATION DEVICE

(75) Inventors: Yuta Saito, Kokubunji (JP); Hideo Takenawa, Hachioji (JP); Hiroyasu Kawaoka, Fussa (JP); Masaaki Kitahara, Tokyo (JP)

(73) Assignee: Casio Computer Co., Ltd, Tokyo (JP)

(\*) Notice: Subject to any disclaimer, the term of this patent is extended or adjusted under 35 U.S.C. 154(b) by 1021 days.

(21) Appl. No.: 13/428,132

(22) Filed: Mar. 23, 2012

(65) Prior Publication Data

US 2012/0252373 A1    Oct. 4, 2012

(30) Foreign Application Priority Data

Mar. 25, 2011  (JP) ................................. 2011-066887
Mar. 25, 2011  (JP) ................................. 2011-066892
Mar. 25, 2011  (JP) ................................. 2011-066895
Jun. 30, 2011  (JP) ................................. 2011-145811
Nov. 15, 2011  (JP) ................................. 2011-249241

(51) Int. Cl.
*G04R 60/10*    (2013.01)
*G04C 17/00*    (2006.01)
*H04B 1/08*    (2006.01)

(52) U.S. Cl.
CPC ............ *G04R 60/10* (2013.01); *G04C 17/0066* (2013.01); *H04B 1/08* (2013.01)

(58) Field of Classification Search
CPC ..... G04C 17/0066; G04R 60/10; G04R 60/12
USPC .......................................................... 368/47
See application file for complete search history.

(56) References Cited

U.S. PATENT DOCUMENTS

| 8,259,024 | B2* | 9/2012 | Abe ............................... 343/788 |
| 8,328,415 | B2* | 12/2012 | Kachi et al. ................... 368/281 |
| 8,902,716 | B2* | 12/2014 | Maruyama ...................... 368/47 |
| 2002/0003481 | A1* | 1/2002 | Kantola et al. ........... 340/825.77 |
| 2003/0050009 | A1* | 3/2003 | Kurisko et al. ................. 455/41 |

FOREIGN PATENT DOCUMENTS

| JP | 61-238108 | 10/1986 |
| JP | 62-068314 | 4/1987 |
| JP | 11-074680 | 3/1999 |
| JP | 2004-117167 | 4/2004 |
| JP | 2007-536852 | 12/2007 |
| JP | 2008-232732 | 10/2008 |
| JP | 2009-079998 | 4/2009 |

OTHER PUBLICATIONS

Office Action for Chinese Patent Application No. 201210082971.6 Dated Oct. 21, 2014, 15 pages.
Japanese Office Action for Japanese Patent Application No. 2011-066892 mailed Nov. 18, 2014.

(Continued)

*Primary Examiner* — Sean Kayes
(74) *Attorney, Agent, or Firm* — Amin, Turocy & Watson, LLP

(57) ABSTRACT

A sensitivity adjustment device adjusts radio wave sensitivity of an antenna which wirelessly transmits/receives a signal to/from an external device. The sensitivity adjustment device includes: a sensitivity adjuster and an adjuster moving section. The sensitivity adjuster includes (a) a shielding part which shields a radio wave and (b) a penetration part which allows penetration of a radio wave. The adjuster moving section moves the sensitivity adjuster with respect to the antenna in such a way as (a) to change a position of the shielding part and a position of the penetration part with respect to the antenna, and (b) to adjust a covered area of the antenna covered with the sensitivity adjuster, so as to adjust the radio wave sensitivity of the antenna.

5 Claims, 45 Drawing Sheets

(56) References Cited

OTHER PUBLICATIONS

Office Action of Notification of Reasons for Refusal for Japanese Patent Application No. 2011-145811 Dated Mar. 24, 2015, 6 pages.

Notification of the First Office Action for Chinese Patent Application No. 201210082971.6 Dated Feb. 26, 2014, 24 pgs.

Office Action of Notice of Reasons for Rejection for Japanese Patent Application No. 2011-066887 Dated Jan. 6, 2015, 5 pages.

* cited by examiner

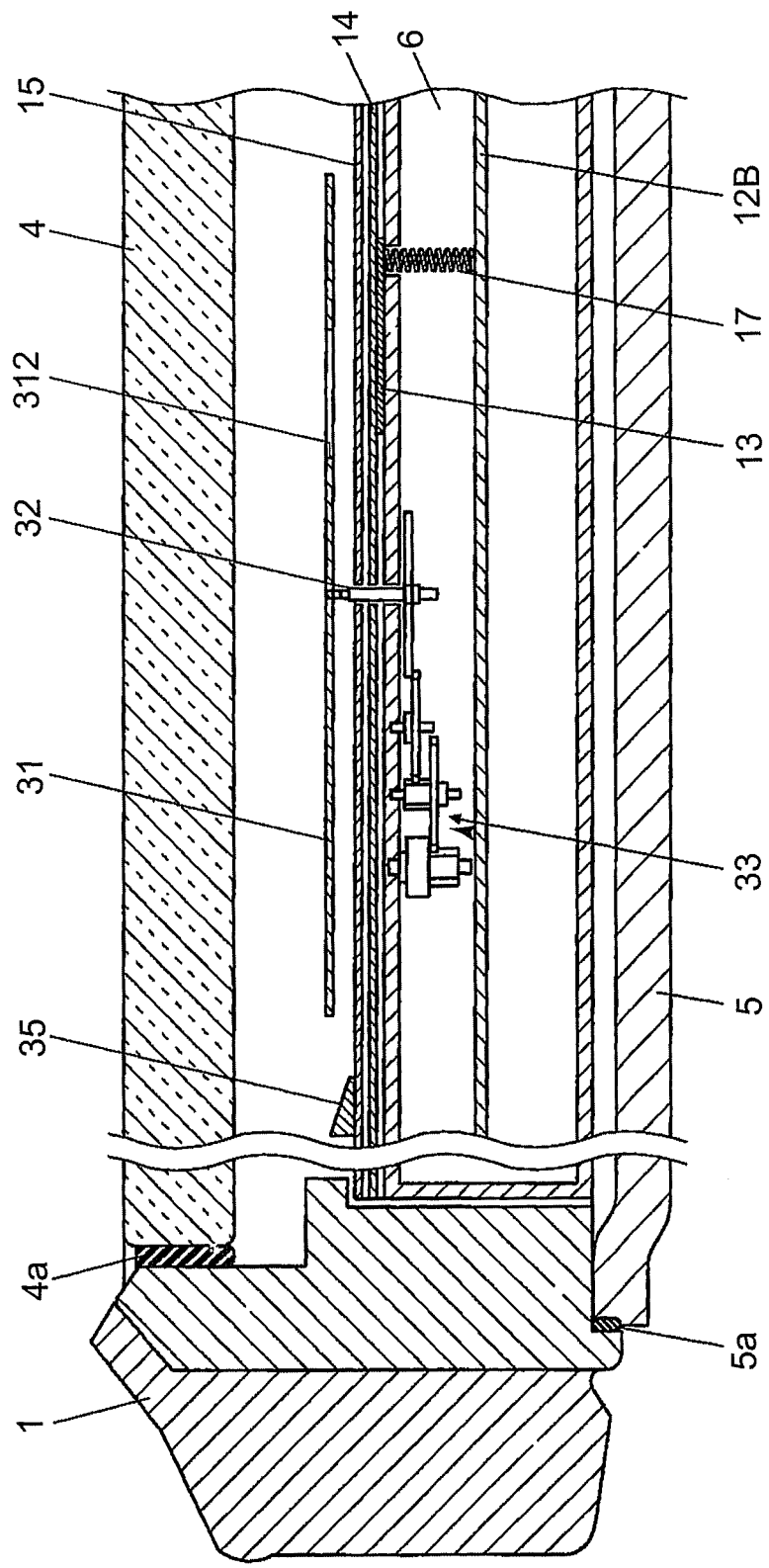

SENSITIVITY ADJUSTMENT DEVICE AND RADIO WAVE COMMUNICATION DEVICE

BACKGROUND OF THE INVENTION

1. Field of the Invention

The present invention relates to a sensitivity adjustment device and a radio wave communication device to which the sensitivity adjustment device is applied.

2. Description of the Related Art

In recent years, there have been spread of methods for transmitting and receiving (communicating) various data between electronic devices such as watches each having a wireless communication function, for example, to exchange data between the electronic devices, and to synchronize information therebetween, by a wireless system.

It is possible that data transmitted and received by wireless communications includes many pieces of personal information. Hence, it is necessary to accurately transmit/receive data from a particular electronic device to another particular electronic device in order to protect personal privacy or the like.

However, when there is a plurality of electronic devices around a user, it is possible that an electronic device of the user (main electronic device) cannot have wireless communications with another electronic device with which the main electronic device intends to have the wireless communications (intended electronic device) because the main electronic device causes interference with another electronic device with which the main electronic device does not intend to have the wireless communications (unintended electronic device). In particular, when communications are made in accordance with Bluetooth® which handles radio waves having a long wavelength, the radio waves are not blocked by obstacles, and hence a main electronic device easily causes interference with an unintended electronic device.

Conventionally, as a method for a main electronic device to appropriately establish pairing (namely, an initial registration operation) with an intended electronic device in a wireless communication system, avoiding interference from an unintended electronic device, for example, Japanese Patent Application Laid-Open Publication (Translation of PCT Application) No. 2007-536852 proposes disposing electronic devices (a main electronic device and an intended electronic device), which are desired to establish pairing with each other, close to each other, and making a query signal having an electric power level limited to being smaller than the standard signal output electric power level in a wireless communication system transmitted from one of the electronic devices, making an answer signal for the query signal transmitted from the other thereof when the other thereof detects the query signal, and starting a point-to-point connection between the electronic devices based on a fact that the other thereof answers the query signal first.

When pairing is performed by such a method, a main electronic device can establish pairing only with an intended electronic device, avoiding causing interference with an unintended electronic device.

However, the method requires disposing the electronic devices, which are desired to establish pairing with each other, close to each other or the like. This is troublesome to the user. In addition, there is a situation where the location of an intended electronic device for pairing is not known. That is, it is not always possible to dispose electronic devices, which are desired to establish pairing with each other, close to each other.

In order to avoid causing interference with an unintended electronic device, it is possible to lower sensitivity of an antenna of a main electronic device so as not to establish communication with an unintended electronic device.

However, electronic devices transmit and receive data therebetween for various purposes. There are other cases than the case where electronic devices are disposed close to each other to the extent of contacting with each other so as to communicate with each other for pairing or the like. For example, electronic devices having a short distance therebetween transmit/receive various data therebetween, the electronic devices being a portable terminal device and a watch or the like both of which a user wears. Furthermore, electronic devices expected to have some distance therebetween transmit/receive data therebetween, for example, so as to find whereabouts of one of the electronic devices, the one which a user has left somewhere (search function).

As for the former case, it is desirable to lower the sensitivity of the main electronic device because if the sensitivity thereof is too high, many electronic devices communicable with the main electronic device exist in a reception region, and consequently, it becomes difficult for the main electronic device to find an intended electronic device. On the other hand, as for the latter case, if the sensitivity thereof is low, the search function cannot be appropriately executed.

Therefore, it is required that the sensitivity of an electronic device to radio waves is changed in accordance with its purpose, use, state or the like when the electronic device transmits/receives data to/from another electronic device.

In a mobile phone, a personal computer or the like, the sensitivity is changed in a communication-related module such as a reception circuit.

In a small electronic device such as a watch, space to accommodate a battery is limited, and hence it is important to keep electric power consumption as low as possible. However, with the method described above, the electric power consumption in a communication-related module is high.

In addition, in the case where the sensitivity (reception) is changed in a communication-related module, the internal mechanism of the module or the like becomes complicated, and consequently, the shock-resistance or the like may be limited.

BRIEF SUMMARY OF THE INVENTION

The present invention is made in view of the circumstances, and objects of the present invention are to provide a sensitivity adjustment device which lowers the electric power consumption and in which the sensitivity of an antenna to radio waves is adjustable with a simple mechanism in accordance with its use, and to provide a radio wave communication device to which the sensitivity adjustment device is applied.

According to a first aspect of the present invention, there is provided a sensitivity adjustment device, which adjusts radio wave sensitivity of an antenna wirelessly transmitting/receiving a signal to/from an external device, the sensitivity adjustment device including: a sensitivity adjuster including (a) a shielding part which shields a radio wave and (b) a penetration part which allows penetration of a radio wave; and an adjuster moving section which moves the sensitivity adjuster with respect to the antenna in such a way as (a) to change a position of the shielding part and a position of the penetration part with respect to the antenna, and (b) to adjust a covered area of the antenna covered with the sensitivity adjuster, so as to adjust the radio wave sensitivity of the antenna.

According to a second aspect of the present invention, there is provided a sensitivity adjustment device, which adjusts radio wave sensitivity of an antenna wirelessly transmitting/ receiving a signal to/from an external device, the sensitivity adjustment device including: a radio wave path including (a) a radio wave entrance/exit at a first end, (b) the antenna at a second end, and (c) a peripheral wall constituted of a radio wave shielding material; a sensitivity adjuster which includes (a) a shielding part constituted of a radio wave shielding material to close the radio wave entrance/exit and (b) a penetration part to open the radio wave entrance/exit; and an adjuster moving section which moves the sensitivity adjuster in such a way as to change a position of the shielding part and a position of the penetration part with respect to the radio wave entrance/exit, so as to adjust the radio wave sensitivity of the antenna.

According to a third aspect of the present invention, there is provided a sensitivity adjustment device, which adjusts radio wave sensitivity of an antenna wirelessly transmitting/receiving a signal to/from an external device, the sensitivity adjustment device including: a sensitivity adjuster which (a) is movable to a moving direction and (b) includes a shielding part having such a property that a radio wave shielding degree varies along with the moving direction; and an adjuster moving section which moves the sensitivity adjuster with respect to the antenna in such a way as to change the radio wave shielding degree to the antenna by the shielding part, so as to adjust the radio wave sensitivity of the antenna.

According to a fourth aspect of the present invention, there is provided a sensitivity adjustment device including: an antenna which wirelessly transmits/receives a signal to/from an external device; a hand which is rotated above the antenna by a hand drive section; and a sensitivity adjustment section which makes the hand drive section rotate the hand to adjust an overlapping degree of the hand and the antenna, so as to adjust radio wave sensitivity of the antenna.

According to a fifth aspect of the present invention, there is provided a radio wave communication device including: the sensitivity adjustment device; a main body case having an opening at a front side, the opening being covered with a transparent member which has radio wave penetrating property; a plate which (a) has a radio wave entrance/exit, and (b) is disposed in the main body case to face the transparent member; and an antenna supporter which (a) is disposed at a back side of the plate in the main body case, and (b) supports the antenna.

According to a sixth aspect of the present invention, there is provided a hand-type watch including: the sensitivity adjustment device; a watch main body case having an opening at a front side, the opening being covered with a windshield which has radio wave penetrating property; a dial plate which (a) has a radio wave entrance/exit, and (b) is disposed in the watch main body case to face the windshield; and an antenna supporter which (a) is disposed at a back side of the dial plate in the watch main body case, and (b) supports the antenna.

BRIEF DESCRIPTION OF THE SEVERAL VIEWS OF THE DRAWING

FIG. 15 is a main-part sectional view showing a modification in which an antenna is disposed under a solar panel;

DETAILED DESCRIPTION OF THE INVENTION

In the following, embodiments of the present invention are described in detail with reference to the accompanying drawings. In the embodiments, it is described that a sensitivity adjustment device of the present invention is applied to a watch having a function as a radio wave communication device. However, embodiments where the present invention is applicable are not limited to the embodiments described below.

[First Embodiment]

First, a sensitivity adjustment device and a watch which includes the sensitivity adjustment device in a first embodiment of the present invention are described with reference to FIGS. 1 to 7.

Figure 1:
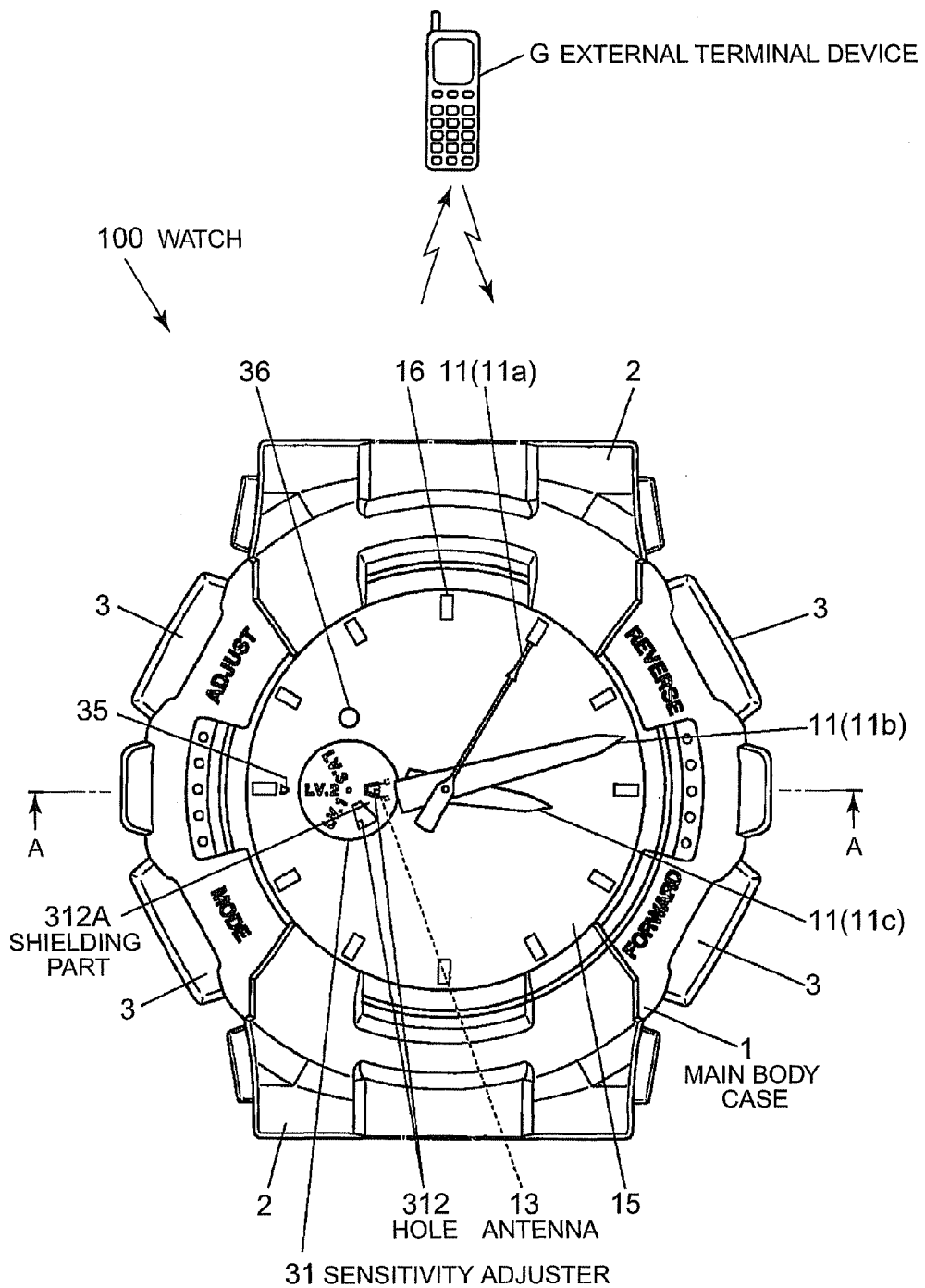
FIG. 1 is a front view of a watch main body of a watch to which a wireless communication device according to a first embodiment of the present invention is applied.
Figure 2:
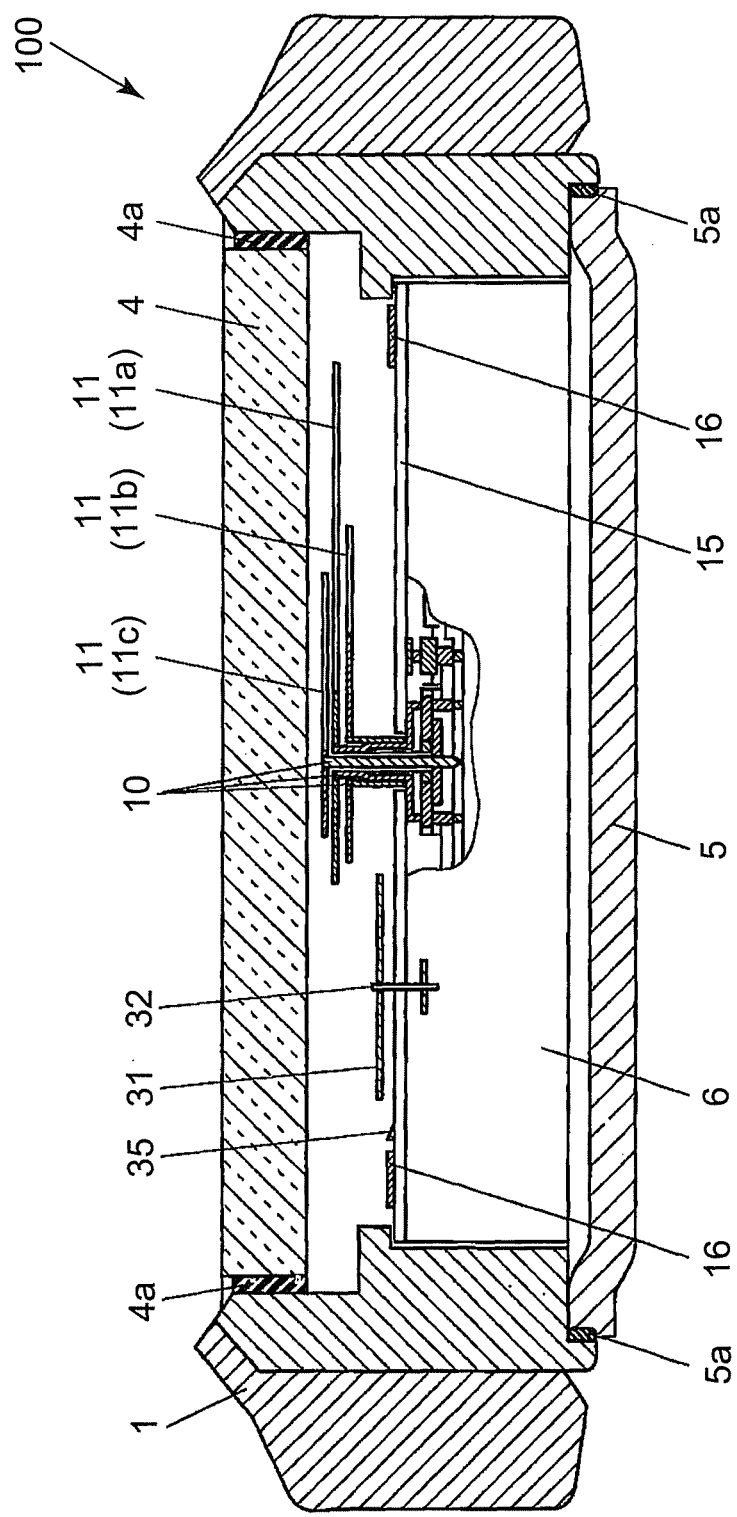
FIG. 2 is a sectional view of the watch taken along the line A-A of FIG. 1.

FIG. 1 is a front view of a watch main body of a watch in the embodiment. FIG. 2 is a sectional view taken along the line A-A of FIG. 1.

A watch 100 in the first embodiment displays time by electrically driving hands 11 (a second hand 11a, a minute hand 11b and an hour hand 11c) to rotate.

The watch 100 includes a main body case 1 formed in the shape of a short column, the inside of which is hollow. The main body case 1 is provided with strap attachment parts 2 at the upper end and the lower end (upper and lower ends in FIG. 1) to attach a watchstrap (not shown). That is, the strap attachment parts 2 are formed at the twelve o'clock direction end and the six o'clock direction end of the watch 100.

A plurality of operation buttons 3 is disposed on the outer circumference of the main body case 1. With the operation buttons 3, various operation instructions are inputted to set the watch 100 to the correct time, to adjust sensitivity to radio waves, and the like.

In the embodiment, with the operation buttons 3, communication modes (described below) can be switched. The communication modes make the sensitivity of an antenna 13 to radio waves (radio wave sensitivity of the antenna 13, hereinbelow), namely, the capability of the antenna 13 to transmit and receive radio waves, different. Hence, the operation buttons 3 function as a communication mode switching section.

More specifically, as described below, a pairing mode executed under the lowest radio wave sensitivity (LV. 1 in FIG. 4 and the like), a data synchronization mode executed under the medium radio wave sensitivity (LV. 2 in FIG. 4 and the like), and a terminal search mode/losing prevention mode executed under the highest radio wave sensitivity (LV. 3 in FIG. 4 and the like) can be switched and selected by input operations of the operation buttons 3.

The main body case 1 includes a front-side opening part on the front side (the upper side in FIGS. 2 and 3) and a back-side opening part on the back side (the lower side in FIGS. 2 and 3) thereof. A windshield 4 made of a transparent material such as glass is attached to the main body case 1 so as to cover the front-side opening part via a waterproof ring 4a. A back-side cover 5 is attached to the main body case 1 so as to cover the back-side opening part via a waterproof ring 5a.

In the main body case 1, a housing 6 made of a resin or the like is disposed. In the housing 6, a timepiece movement (not shown), a circuit substrate 12B having various electronic components thereon, and the like are installed. The timepiece movement moves the hands 11 of the second hand 11a, the minute hand 11b and the hour hand 11c.

The watch 100 in the embodiment has a solar generating function to generate electric power by incident rays. For that, a solar panel 14 taking incident rays in from outside and generating electric power, namely, a photovoltaic power generating section, is disposed above the housing 6 in the main body case 1. The power generated by the solar panel 14 is transmitted to a secondary battery 209 (an electric power storage section, shown in FIG. 7) described below so as to be stored therein.

A dial plate 15 is disposed between the solar panel 14 and the windshield 4. On the front side of the dial plate 15, time-indicating characters 16 are disposed at 12 points at almost fixed intervals in the circumferential direction.

Near the center of the dial plate 15, a not-shown through-hole is disposed. Shafts 10 are inserted to pass through the through-hole from the inner mechanism side of the timepiece movement to the front side (the side having the windshield 4 thereon, the upper side in FIG. 2) so as to respectively support the second hand 11a, the minute hand 11b and the hour hand 11c of the hands 11. The shafts 10 are connected to a hand drive motor 111 (shown in FIG. 7) via a not-shown gear train mechanism. When the hand drive motor 111 is driven under the control of a hand drive circuit 207 (shown in FIG. 7) to rotate the shafts 10, the second hand 11a, the minute hand 11b and the hour hand 11c respectively corresponding to the shafts 10 indicate the time-indicating characters 16 disposed along the circumference of the dial plate 15 so that the time indicated by the time-indicating characters 16 is displayed.

Figure 3:
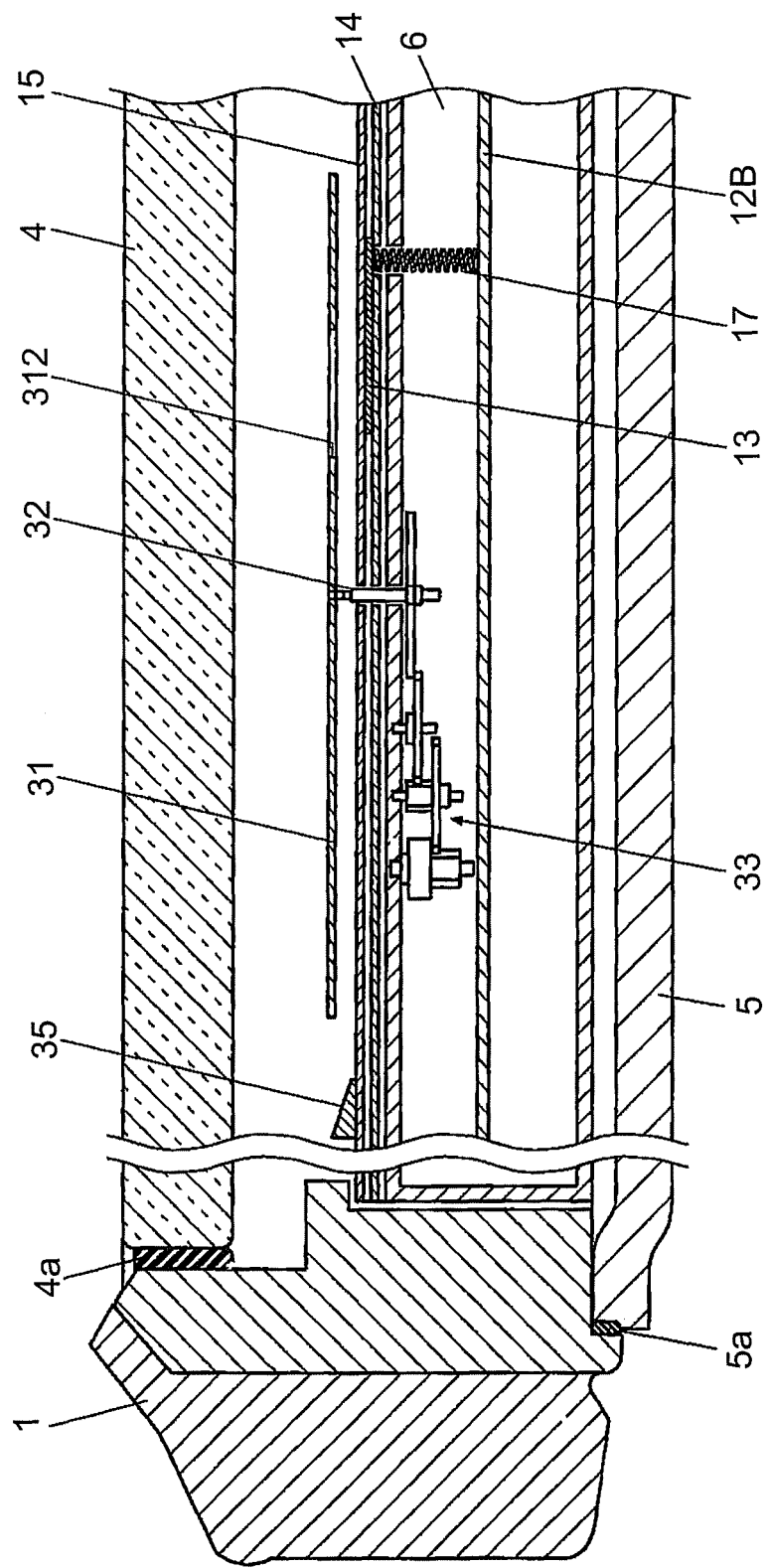
FIG. 3 is a main-part sectional view of a sensitivity adjuster and the vicinity thereof shown in FIG. 2 being enlarged.

FIG. 3 is a main-part sectional view of FIG. 2, the left part (a nine o'clock direction part of the watch 100) of which is enlarged.

As shown in FIG. 3, in the embodiment, a small chip or loop antenna 13 is disposed on the back side (the lower side in FIG. 3) of the dial plate 15. The antenna 13 performs communications in accordance with a standard such as Bluetooth®. The communication standard and the communicable frequency band of the antenna 13 are not limited to Bluetooth®, and hence appropriately selected so as to be suitable for each communication (namely, suitable for the frequency or the like of each communication) performed by the watch 100. In addition, as long as the antenna 13 is small, its type and shape are not particularly limited. Furthermore, as described below, in the embodiment, an antenna having the maximum radio wave sensitivity with which transmission/reception of signals to/from a device located within a distance of about 5 m from the antenna is available is used as the antenna 13. However, the radio wave sensitivity of the antenna 13 is not limited thereto, and hence an antenna having the maximum radio wave sensitivity with which transmission/reception of signals to/from a device located further is available may be used as the antenna 13.

A connector 17 constituted of a coil spring or the like and electrically connected with the circuit substrate 12B is connected to the antenna 13. The antenna 13 is electrically connected to a transmission/reception control circuit 204 (described below) via the connector 17.

A sensitivity adjuster 31 which adjusts the radio wave sensitivity of the antenna 13 is disposed above the dial plate 15 and over the antenna 13.

In the embodiment, the sensitivity adjuster 31 is a disc-shaped plate. At the center of the disc-shaped plate, a shaft 32 is disposed. The sensitivity adjuster 31 is a disc-shaped hand (disc indicator) which is rotatable around the shaft 32. The sensitivity adjuster 31 is connected to an adjuster drive motor 34 (shown in FIG. 7) via the gear train mechanism 33. When the adjuster drive motor 34 is driven under the control of an adjuster drive circuit 208, the sensitivity adjuster 31 rotates around the shaft 32.

The gear train mechanism 33 is not an essential component in the present invention, and hence the sensitivity adjuster 31 may be directly connected to the adjuster drive motor 34.

The position where the antenna 13 is disposed is not limited to the position shown in FIG. 3. When the antenna 13 is disposed at a position different from the position shown in FIG. 3, the sensitivity adjuster 31 is also disposed at a position corresponding to the position of the antenna 13.

A pointer 35 which indicates the radio wave sensitivity of the antenna 13 adjusted by the sensitivity adjuster 31 is disposed on the dial plate 15 in the vicinity of the sensitivity adjuster 31. The pointer 35 points one of the "LV. 1", the "LV. 2" and the "LV. 3" (shown in FIGS. 4 to 6 and the like) of mode indicators 311 disposed on the sensitivity adjuster 31. The pointer 35 points one of the mode indicators 311, thereby indicating a communication mode which is set.

Consequently, a user can easily visually confirm at which level the radio wave sensitivity of the antenna 13 currently is, or to which communication mode the current radio wave sensitivity thereof corresponds, by looking at a mode indicator 311 pointed by the pointer 35.

An LED (Light-Emitting Diode) 36 is disposed on the dial plate 15. The LED 36 lights up when the antenna 13 completes transmission/reception of radio waves.

In the embodiment, the LED 36 lights up when the pairing (initial registration) between the watch 100 and a (external) terminal device G is established (namely, when transmission/reception of radio waves between the watch 100 and the terminal device G is completed). Hence, the LED 36 functions as an informing section which informs a user about the establishment of pairing.

In the embodiment, when the pairing (initial registration) between the watch 100 and a (external) terminal device G is established in a pairing mode, the LED 36 lights up. However, the LED 36 is not an essential component in the present invention, and hence it is not necessary to provide the LED 36. In this case, a disc-shaped hand (disc indicator) or the like may be provided to display the establishment of pairing. Alternatively, an alarm or the like may inform a user about the establishment of pairing. Furthermore, it is not particularly necessary to inform a user about the establishment of pairing.

Furthermore, in the embodiment, the LED 36 lights up only when pairing is established in a pairing mode. However, for example, the LED 36 may also light up to inform a user that transmission/reception of data is completed in a data synchronization mode, or that radio waves are transmitted/received by a terminal device G in a terminal search mode, the terminal device G which a user searches for.

Figure 4:
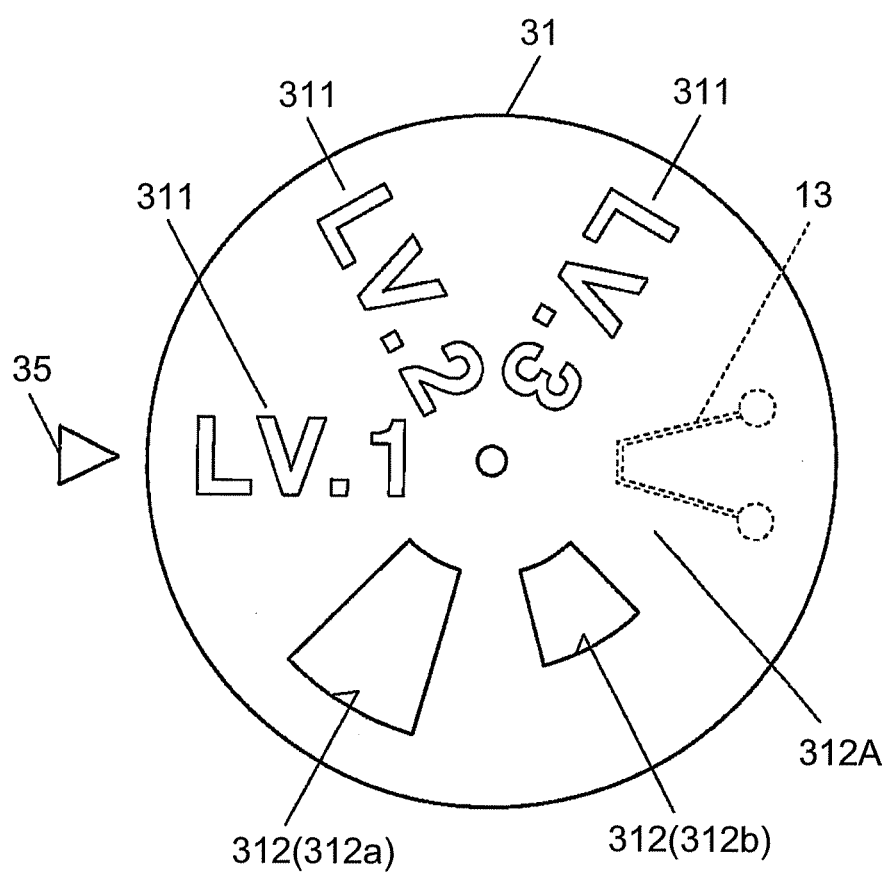
FIG. 4 is a plan view showing that the sensitivity adjuster in the first embodiment is adjusted to a level 1.
Figure 5:
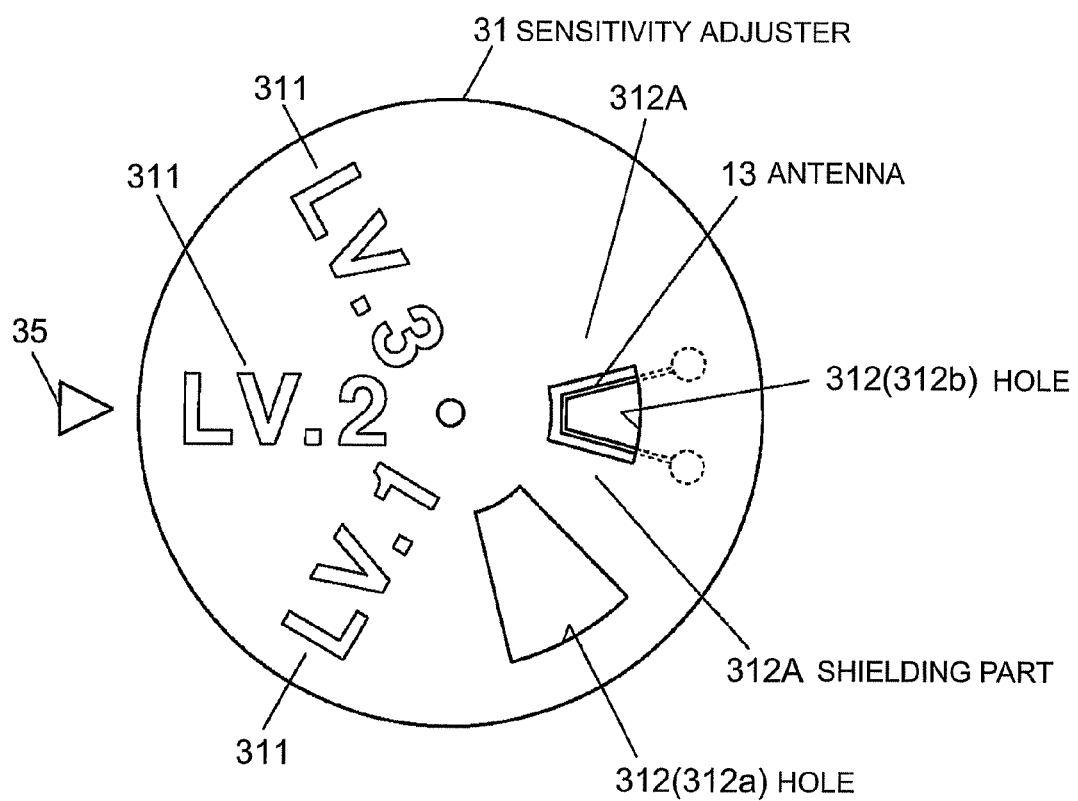
FIG. 5 is a plan view showing that the sensitivity adjuster in the first embodiment is adjusted to a level 2.
Figure 6:
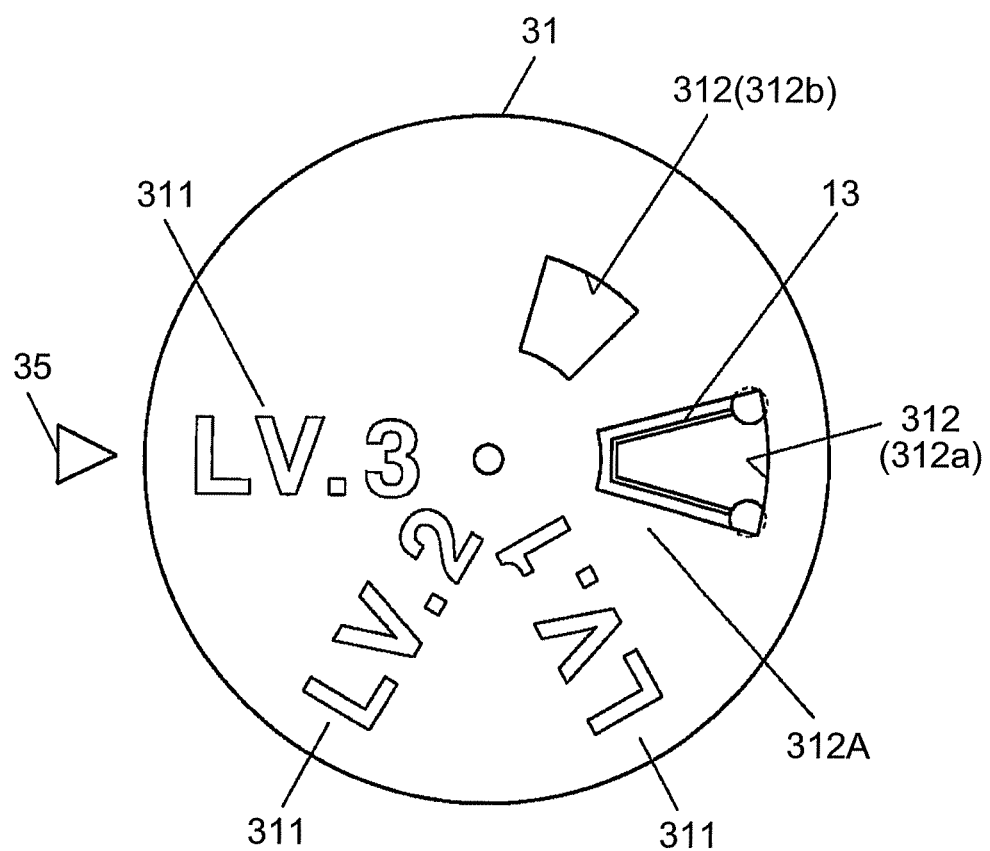
FIG. 6 is a plan view showing that the sensitivity adjuster in the first embodiment is adjusted to a level 3.

FIGS. 4 to 6 are plan views of the sensitivity adjuster 31 in the embodiment.

As shown in FIGS. 4 to 6, as the mode indicators 311 which indicate communication modes, the "LV. 1", the "LV. 2" and the "LV. 3" are attached to the vicinity of the center of the disc-shaped sensitivity adjuster 31. In the embodiment, as described below, the pairing mode, the data synchronization mode and the terminal search mode/losing prevention mode exist as the selectable communication modes. The "LV. 1", the "LV. 2" and the "LV. 3" of the mode indicators 311 respectively correspond to the pairing mode, the data synchronization mode and the terminal search mode/losing prevention mode.

Two holes 312 (312a and 312b) having different sizes are made so as to respectively face the "LV. 2" and the "LV. 3" of the mode indicators 311 across the center of the disc-shaped sensitivity adjuster 31.

The sensitivity adjuster 31 is constituted of a material which shields radio waves, such as a radio wave absorber (radio wave absorbing material) which absorbs radio waves. More specifically, for example, the sensitivity adjuster 31 is formed by casting a magnetic material or a material including magnetic powder to be a predetermined shape or by attaching a magnetic sheet to a base material casted to be a predetermined shape.

In the sensitivity adjuster 31, the holes 312 constitute a penetration part to allow penetration of radio waves, and the other part, namely, the part other than the holes 312, constitutes a shielding part 312A to shield radio waves.

The holes 312a and 312b and the shielding part 312A are positioned over the antenna 13 in turn when the sensitivity adjuster 31 is rotated around the shaft 32 disposed at the center of the sensitivity adjuster 31.

More specifically, when the sensitivity adjuster 31 is moved (rotated) to a point where the pointer 35 points the "LV. 3" of the mode indicator 311, the hole 312a is positioned over the antenna 13 (shown in FIG. 6). When the sensitivity adjuster 31 is moved (rotated) to a point where the pointer 35 points the "LV. 2" of the mode indicator 311, the hole 312b is positioned over the antenna 13 (shown in FIG. 5). When the sensitivity adjuster 31 is moved (rotated) to a point the pointer 35 points the "LV. 1" of the mode indicator 311, the shielding part 312A is positioned over the antenna 13 (shown in FIG. 4).

The hole 312a corresponding to the "LV. 3" (equivalent to the terminal search mode/losing prevention mode) of the mode indicator 311 has the size (dimensions) with which nearly the entire antenna 13 is exposed. When the hole 312a is positioned over the antenna 13, the radio wave sensitivity of the antenna 13 is the maximum. In the embodiment, the antenna 13 can transmit and receive radio waves within a distance of about 5 m under this best radio wave sensitivity.

The hole 312b corresponding to the "LV. 2" (equivalent to the data synchronization mode) of the mode indicator 311 has the size with which about half the antenna 13 is exposed. When the hole 312b is positioned over the antenna 13, the radio wave sensitivity of the antenna 13 is medium. In the embodiment, when the hole 312b is positioned over the antenna 13, the antenna 13 can transmit and receive radio waves within a distance of about 1 m to 2 m.

The part corresponding to the "LV. 1" (equivalent to the pairing mode) of the mode indicator 311 is the shielding part 312A with no hole. When the shielding part 312A is positioned over the antenna 13, the radio wave sensitivity of the antenna 13 is the minimum. In the embodiment, when the shielding part 312A is positioned over the antenna 13, the antenna 13 can transmit and receive radio waves to/from a device which contacts or almost contacts with the watch 100, namely, within a distance of about 10 cm.

In the embodiment, the antenna 13 and the transmission/reception control circuit 204 (described below) themselves always maintain the maximum radio wave sensitivity (for example, the radio wave sensitivity with which transmission/reception of radio waves are available within a distance of about 5 m from the antenna 13, in the embodiment), and the radio wave sensitivity of the antenna 13 is mechanically adjusted by changing a covered area of the antenna 13 covered with the sensitivity adjuster 31.

A user may decide at which level the radio wave sensitivity is set in the initial state (namely, in a state in which a switching operation of communication modes is not performed). For example, when the data synchronization mode is considered to be used most frequently, in the initial state, the sensitivity adjuster 31 is disposed at a point where the radio wave sensitivity of the antenna 13 becomes the "LV. 2" which corresponds to the data synchronization mode.

Next, the functional configuration of the watch 100 in the embodiment is described with reference to FIG. 7.

Figure 7:
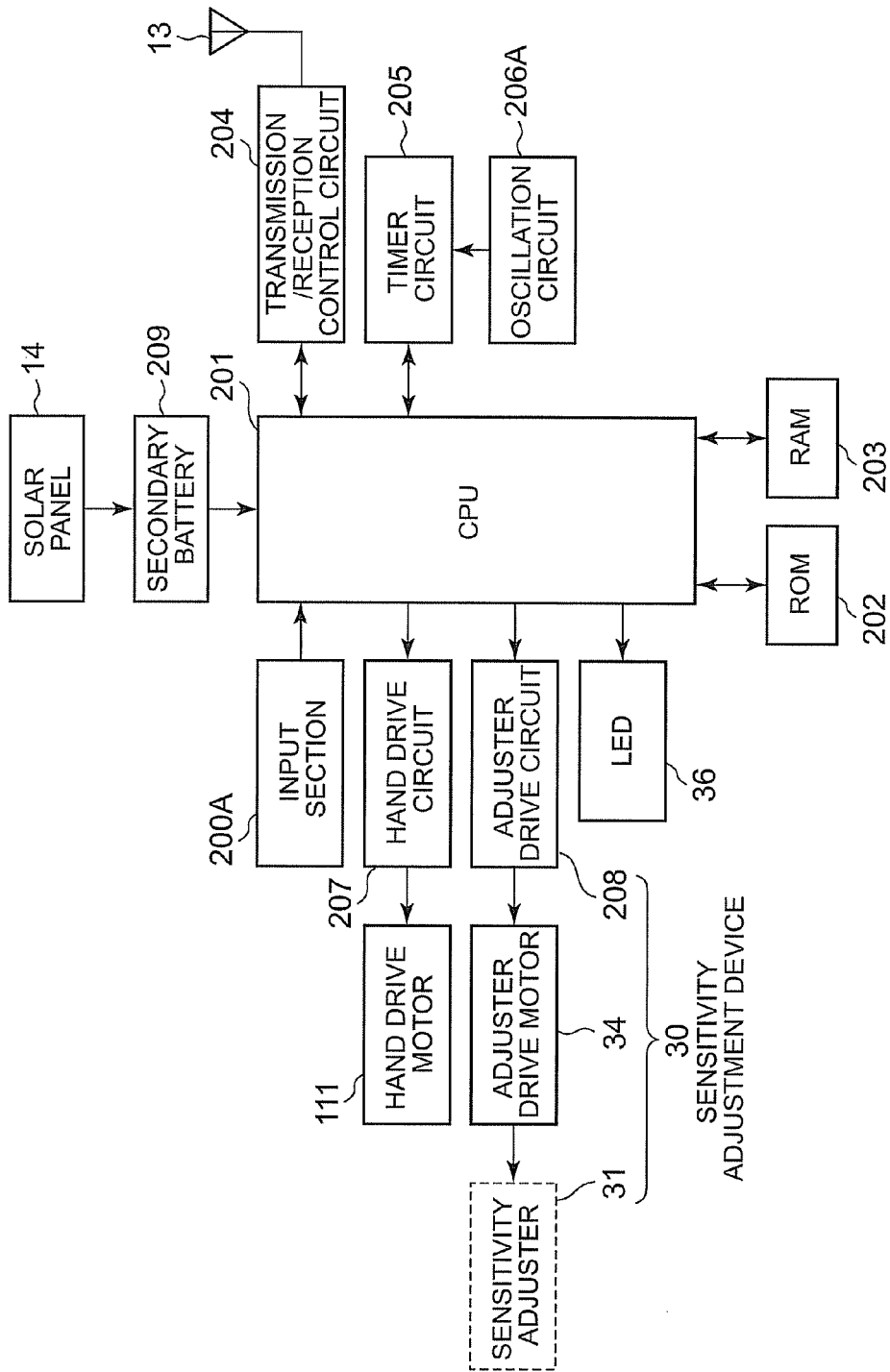
FIG. 7 is a block diagram showing a circuit configuration in the watch shown in FIG. 1.

As shown in FIG. 7, the watch 100 includes, for example, an input section 200A, a CPU (Central Processing Unit) 201, a ROM (Read Only Memory) 202, a RAM (Random Access Memory) 203, the transmission/reception control circuit 204, a timer circuit 205, an oscillation circuit 206A, the hand drive circuit 207, the adjuster drive circuit 208 and the secondary battery 209 as a power supply section.

The input section 200A is constituted of a switch operated by the operation buttons 3 or the like to instruct execution of various functions of the watch 100. When a user operates an operation button 3 or the like, based thereon, the input section 200A outputs an operation signal corresponding to the operation button 3 or the like to the CPU 201.

In the embodiment, the watch 100 has a plurality of communication modes (namely, the pairing mode, the data synchronization mode and the terminal search mode/losing prevention mode in the embodiment) executable under different radio wave sensitivity of the antenna 13. With a user operating an operation button 3 or the like, the communication modes can be switched as needed. When an instruction to switch the communication modes is inputted by user's operation of an operation button 3 or the like, the input section 200A outputs an operation signal corresponding to the instruction to the CPU 201. Hence, the input section 200A functions as a communication mode switching section.

The CPU 201 reads various programs stored in the ROM 202, for example, at predetermined timing or in accordance with operation signals or the like inputted from the input section 200A to load the read programs into a work area of the RAM 203, and performs various types of processing in accordance with the programs, such as instructing each section or the like of the watch 100 and transferring data thereto.

More specifically, the CPU 201 performs various controls to perform various types of processing, for example, based on signals outputted from the oscillation circuit 206A which includes an oscillator. The various types of processing include processing to correct current time data counted (measured) by the timer circuit 205 and processing to display current time or the like by outputting a signal or the like based on the corrected current time data to the hand drive circuit 207.

Furthermore, in the embodiment, the CPU 201 controls the transmission/reception control circuit 204 to transmit various data from the antenna 13, stores various data received by the antenna 13 in the RAM 203A, and controls each section or the like to perform various types of processing based on the data stored in the RAM 203, for example.

Furthermore, when an instruction to switch to a communication mode is inputted from the input section 200A, the CPU 201 reads an application program for the instructed communication mode from the ROM 202 to start the application program, and also controls the adjuster drive circuit 208 to drive the adjuster drive motor 34 so as to rotate the sensitivity adjuster 31 to a point where the radio wave sensitivity becomes suitable for the communication mode.

In the embodiment, the watch 100 has the pairing mode, the data synchronization mode and the terminal search mode/losing prevention mode as the communication modes.

The pairing mode is a communication mode, for example, used by a user of the watch 100 to establish pairing (namely, the initial registration to associate terminal devices with each other) between the watch 100 and a terminal device G (a terminal device of a friend of the user, for example) so that the watch 100 can transmit/receive data to/from the terminal device G. For example, when pairing between the watch 100 and a terminal device G, which is a mobile phone of the user's friend, is performed, the watch 100 transmits a query signal to the terminal device G. When the terminal device G transmits an answer signal for the query signal to the watch 100, and the antenna 13 of the watch 100 receives the answer signal and transmits the signal to the CPU 201, the pairing is established between the watch 100 and the terminal device G.

When an instruction to select the pairing mode is inputted from the input section 200A, in order that the pairing is not established between the watch 100 and another terminal device G which is not expected to establish pairing with the watch 100 but is located around the watch 100, the CPU 201 adjusts the sensitivity adjuster 31 of the sensitivity adjustment device 30. The CPU 201 adjusts the sensitivity adjuster 31 in such a way that the radio wave sensitivity of the antenna 13 becomes low to the extent that the transmission/reception of radio waves is available only when the watch 100 and the terminal device G to be expected to establish pairing with the watch 100 contact with each other or come close enough to almost contact with each other.

In the embodiment, the communication mode represented by the "LV. 1" in FIG. 4 makes the radio wave sensitivity correspond to the pairing mode. When the pairing mode is selected, the CPU 201 controls the adjuster drive circuit 208 to drive the adjuster drive motor 34 so as to rotate the sensitivity adjuster 31 to a point where the pointer 35 on the dial plate 15 points the mode indicator 311 of the "LV. 1".

The data synchronization mode is a communication mode, for example, used when data are synchronized between the watch 100 and a terminal device G or the like which already establishes pairing with the watch 100 and is located relatively close to the watch 100, for example, a terminal device G which a user of the watch 100 wears (a not-shown mobile phone or the like which the user carries).

When an instruction to select the data synchronization mode is inputted from the input section 200A, the CPU 201 adjusts the sensitivity adjuster 31 of the sensitivity adjustment device 30 in such a way that the radio wave sensitivity of the antenna 13 becomes radio wave sensitivity with which the antenna 13 can transmit/receive radio waves to/from a terminal device G located within a distance of about 1 m to 2 m from the antenna 13.

In the embodiment, the communication mode represented by the "LV. 2" in FIG. 5 makes the radio wave sensitivity correspond to the data synchronization mode. When the data synchronization mode is selected, the CPU 201 controls the adjuster drive circuit 208 to drive the adjuster drive motor 34 so as to rotate the sensitivity adjuster 31 to a point where the pointer 35 on the dial plate 15 points the mode indicator 311 of the "LV. 2".

The terminal search mode is a communication mode, for example, used by a user of the watch 100 to search for a terminal device G of the user or a friend of the user, the terminal device G which already establishes pairing with the watch 100. The losing prevention mode is a communication mode, for example, in which when a user of the watch 100 is a predetermined distance away from a terminal device G of the user, the terminal device G which already establishes pairing with the watch 100, a warning is given to the user by a buzzer sound or the like.

When an instruction to select either of the communication modes is inputted from the input section 200A, the CPU 201 adjusts the sensitivity adjuster 31 of the sensitivity adjustment device 30 in such a way that the radio wave sensitivity of the antenna 13 becomes radio wave sensitivity with which the antenna 13 can transmit/receive radio waves to/from a terminal device G located within a distance of about 5 m from the antenna 13.

In the embodiment, the communication mode represented by the "LV. 3" in FIG. 4 makes the radio wave sensitivity correspond to the terminal search mode/losing prevention mode. When the terminal search mode/losing prevention mode is selected, the CPU 201 controls the adjuster drive circuit 208 to drive the adjuster drive motor 34 so as to rotate the sensitivity adjuster 31 to a point where the pointer 35 on the dial plate 15 points the mode indicator 311 of the "LV. 3".

The ROM 202 is a memory for reading only, and stores a system program, various application programs, various data, and the like to execute various functions of the watch 100.

In the embodiment, as the application programs, programs to execute the pairing mode, the data synchronization mode and the terminal search mode/losing prevention mode are stored in the ROM 202.

The RAM 203 is, for example, a volatile semiconductor memory, and includes a memory area to temporarily store various programs executed by the CPU 201, data for executing these programs, and the like. In addition, the RAM 203 is used as the work area for the CPU 201.

The transmission/reception control circuit 204 removes unnecessary frequency components from received signals received by the antenna 13 to take out predetermined frequency signals, converts the frequency signals into electrical signals, and then outputs the electrical signals corresponding to the frequency signals to the CPU 201.

The oscillation circuit 206A is a circuit which always outputs clock signals having a fixed frequency. The timer circuit 205 counts the signals inputted from the oscillation circuit 206A to obtain the current time data or the like. The timer circuit 205 outputs the obtained current time data to the CPU 201.

The hand drive circuit 207 drives the hand drive motor 111, for example, based on data, control signals or the like from the CPU 201 to operate the not-shown gear train mechanism, and accordingly, to move each hand 11 (namely, the second hand 11a, the minute hand 11b or the hour hand 11c).

The adjuster drive circuit 208 drives the adjuster drive motor 34, for example, based on control signals or the like from the CPU 201 to rotate the sensitivity adjuster 31 to a point where the radio wave sensitivity becomes radio wave sensitivity at a level corresponding to a communication mode inputted and instructed by the input section 200A or the like.

In the embodiment, by moving the sensitivity adjuster 31 with respect to the antenna 13, positions of the shielding part 312A and the holes 312 as the penetration part are changed, and the covered area of the antenna 13 covered with the sensitivity adjuster 31 is adjusted, whereby the radio wave sensitivity of the antenna 13 is adjusted. Hence, the adjuster drive circuit 208 and the adjuster drive motor 34 constitute an adjuster moving section which adjusts the radio wave sensitivity of the antenna 13.

The sensitivity adjustment device 30 which adjusts the radio wave sensitivity of the antenna 13, which transmits/receives wireless signals to/from a terminal device G of an external device such as a mobile phone, is constituted of the adjuster drive circuit 208, the adjuster drive motor 34, and the sensitivity adjuster 31 including the shielding part 312A to shield radio waves and the holes 312 as the penetration part to allow penetration of radio waves.

The secondary battery 209 accumulates electric power generated by the solar panel 14, and supplies the power to each section or the like via the CPU 201. Hence, the secondary battery 209 is the power supply section of the watch 100.

Next, operations of the sensitivity adjustment device 30 and the watch 100 which is a radio wave communication device in the embodiment are described.

When a user would like to newly establish pairing (initial registration) between the watch 100 of the user and a terminal device G of the user or a friend of the user so that transmission/reception of data between the watch 100 and the terminal device G becomes available, the user operates an operation button 3 to input an instruction to select the pairing mode as a communication mode, and consequently an instruction signal to perform communications in the pairing mode is transmitted from the input section 200A to the CPU 201.

When receiving the instruction signal, the CPU 201 reads the application program to execute the pairing mode from the ROM 202 to start the application program, and also controls the adjuster drive circuit 208 to drive the adjuster drive motor 34 so as to rotate the sensitivity adjuster 31 to a point where the pointer 35 on the dial plate 15 points the "LV. 1" of the mode indicator 311.

When, in this state, the user makes the terminal device G which is a party for the pairing contact with the watch 100 or puts the terminal device G within a distance of about 10 cm from the watch 100, a query signal for pairing (a signal including an individual identification number of the watch 100, for example) is transmitted from the antenna 13 of the watch 100. The query signal is received by only a terminal device G located within a distance in which the query signal can be received. The terminal device G which receives the query signal returns an answer signal (a signal including an individual identification number of the terminal device G, for example) to the watch 100. When the antenna 13 of the watch 100 receives the answer signal, the antenna 13 of the watch 100 transmits the answer signal to the CPU 201. Then, the CPU 201 registers the terminal device G as a terminal device to/from which the watch 100 can transmit/receive data. Thus, pairing is established, and the CPU 201 makes the LED 36 light up to inform the user about the establishment of pairing.

When pairing is not established although the pairing mode is set and a user brings the watch 100 and a terminal device G which is a party for the pairing close enough to each other, namely, when the LED 36 does not light up although a predetermined time has elapsed since the start of communications in the pairing mode, the user may attempt to perform pairing again by switching the communication mode to another communication mode, such as the data synchronization mode, in which the radio wave sensitivity of the antenna 13 becomes higher than that in the pairing mode.

When a user would like to perform transmission/reception of data between the watch 100 and a terminal device G which already establishes pairing (initial registration) with the watch 100 so that data thereof are synchronized, the user operates an operation button 3 to input an instruction to select the data synchronization mode as a communication mode, and consequently an instruction signal to perform communications in the data synchronization mode is transmitted from the input section 200A to the CPU 201.

When receiving the instruction signal, the CPU 201 reads the application program to execute the data synchronization mode from the ROM 202 to start the application program, and also controls the adjuster drive circuit 208 to drive the adjuster drive motor 34 so as to rotate the sensitivity adjuster 31 to a point where the pointer 35 on the dial plate 15 points the "LV. 2" of the mode indicator 311.

Thus, the watch 100 is in a state in which the watch 100 can transmit/receive radio waves to/from a terminal device G located within a distance of about 1 m to 2 m from the watch 100. Accordingly, for example, the watch 100 transmits/receives data to/from the terminal device G which is located relatively close to the watch 100, such as a mobile phone which the user wears, whereby data of the watch 100 and data of the terminal device G are synchronized.

When a user would like to search, with the watch 100, for a terminal device G which already establishes pairing (initial registration) with the watch 100, or would like to be informed when such a terminal device G is a predetermined distance or more away from the watch 100, the user operates an operation button 3 to input an instruction to select the terminal search mode/losing prevention mode as a communication mode, and consequently an instruction signal to perform communications in the terminal search mode/losing prevention mode is transmitted from the input section 200A to the CPU 201.

When receiving the instruction signal, the CPU 201 reads the application program to execute the terminal search mode/losing prevention mode from the ROM 202 to start the application program, and also controls the adjuster drive circuit 208 to drive the adjuster drive motor 34 so as to rotate the sensitivity adjuster 31 to a point where the pointer 35 on the dial plate 15 points the "LV. 3" of the mode indicator 311.

Thus, the radio wave sensitivity of the antenna 13 of the watch 100 becomes the maximum, and consequently the watch 100 can transmit/receive radio waves to/from a terminal device G located within a distance of about 5 m from the watch 100.

In the terminal search mode, a query signal to request answering is transmitted from the antenna 13 of the watch 100 to a terminal device G which already establishes pairing with the watch 100 and is located within a distance of about 5 m from the watch 100. When the terminal device G receives the query signal, and transmits an answer signal to the watch 100, the user is informed about that by a buzzer sound, flashing of the LED 36 or the like. In the losing prevention mode, a query signal to request answering is transmitted from the antenna 13 of the watch 100 to a terminal device G which already establishes pairing with the watch 100. The terminal device G receives the query signal, and transmits an answer signal to the watch 100. When not receiving the answer signal from the terminal device G, the CPU 201 judges that the terminal device G is a predetermined distance or more away (in the embodiment, 5 m within which the antenna 13 can transmit/receive radio waves) from the watch 100, and informs the user about that by a buzzer sound, flashing of the LED 36 or the like.

As described above, according to the embodiment, a plurality of communication modes (for example, the pairing mode, the data synchronization mode and the terminal search mode/losing prevention mode) can be executed under the different radio wave sensitivity of the antenna 13, and consequently various communications can be performed in accordance with a user's purpose or use of the watch 100.

As a method for adjusting the radio wave sensitivity of the antenna 13 in accordance with the communication modes, the sensitivity adjuster 31 is mechanically rotated so that the covered area of the antenna 13 covered with the sensitivity adjuster 31 is adjusted. Hence, the electric power consumption for the adjustment of the radio wave sensitivity of the antenna 13 can be lower as compared with a case where the radio wave sensitivity thereof is changed in a communication-related module such as a reception circuit. Consequently, in a radio wave communication device having no space to accommodate a large battery such as the watch 100 too, the radio wave sensitivity of the antenna 13 can be appropriately adjusted.

The sensitivity adjuster 31 is a disc-shaped plate. By rotating the sensitivity adjuster 31 around the center thereof so as to move (adjust) the positions of the holes 312 (penetration part) made in the sensitivity adjuster 31 and the part other than the holes 312 (the shielding part 312A) thereof, the radio wave sensitivity of the antenna 13 can be adjusted. Accordingly, without making the internal mechanism of a module or the like complicated or limiting the shock-resistance or the like, the radio wave sensitivity of the antenna 13 can be adjusted.

Furthermore, because the sensitivity adjuster 31 is constituted of a radio wave absorber, the sensitivity adjuster 31 which adjusts the radio wave sensitivity of the antenna 13 can be formed by simple processing, namely, by making (providing) the holes 312 in the sensitivity adjuster 31 as the penetration part and using the other part thereof as the shielding part 312A.

Furthermore, in the embodiment, the mode indicators 311 (the "LV. 1", the "LV. 2" and the "LV. 3" in FIGS. 4 to 6) are attached to the sensitivity adjuster 31 for the pairing mode, the data synchronization mode and the terminal search mode/losing prevention mode, respectively. When the communication modes are switched, and the sensitivity adjuster 31 moves to a point where the radio wave sensitivity of the antenna 13 becomes suitable for the set communication mode, the pointer 35 points the mode indicator 311 for the currently set communication mode, thereby indicating the currently set communication mode. Accordingly, without adding a component to display a communication mode, a user can easily visually confirm the currently set communication mode.

[Second Embodiment]

Next, a sensitivity adjustment device and a radio wave communication device in a second embodiment of the present invention are described with reference to FIGS. 8 to 11. Only some of the configuration of the sensitivity adjustment device in the second embodiment is different from that of the sensitivity adjustment device in the first embodiment. Hence, in the following, differences from the first embodiment are described in particular.

Figure 8:
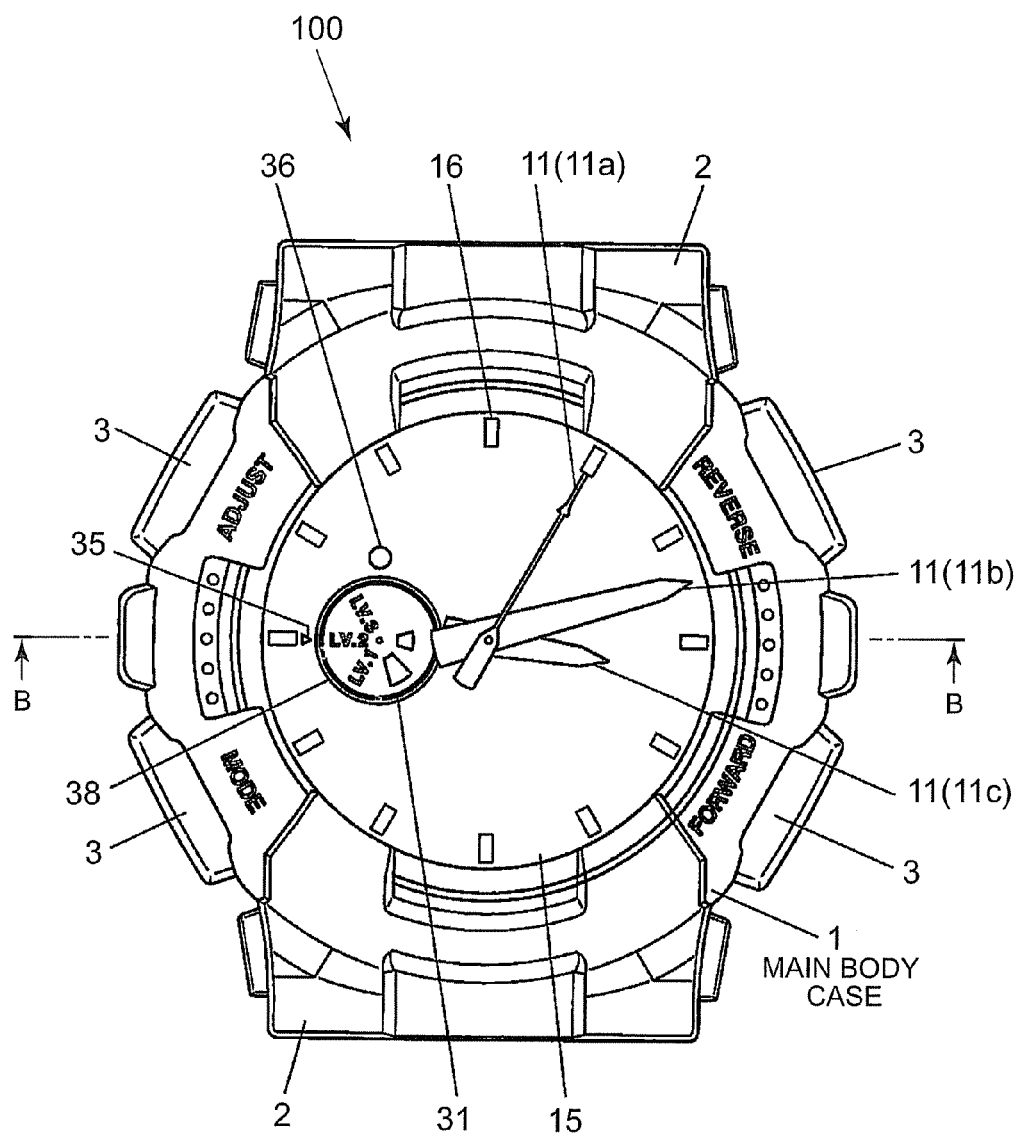
FIG. 8 is a front view of a watch main body of a watch to which a wireless communication device according to a second embodiment of the present invention is applied.
Figure 9:
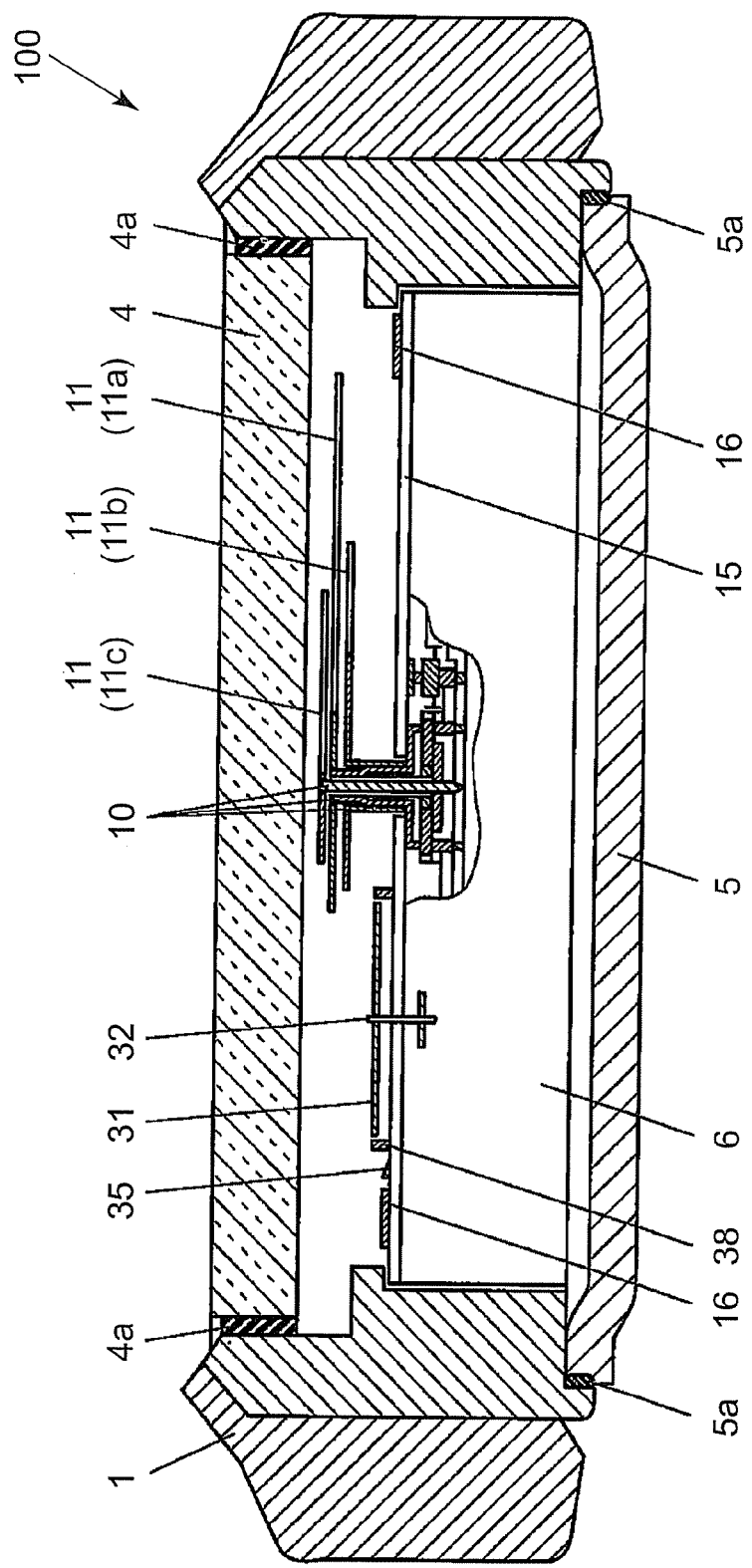
FIG. 9 is a sectional view of the watch taken along the line B-B of FIG. 8.
Figure 10:
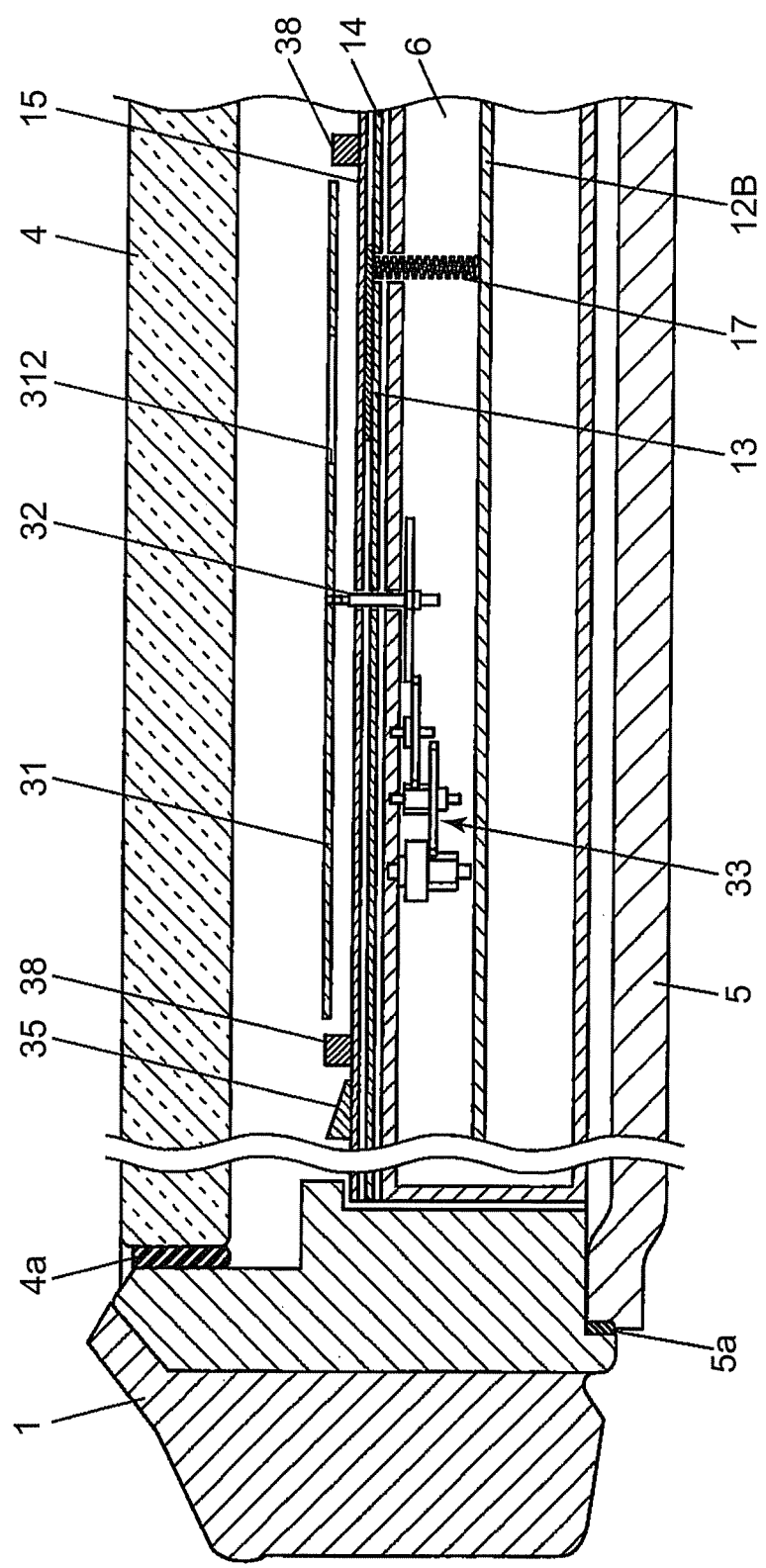
FIG. 10 is a main-part sectional view of a sensitivity adjuster and the vicinity thereof shown in FIG. 9 being enlarged.

FIG. 8 is a front view of a watch main body of a watch in the second embodiment. FIG. 9 is a sectional view taken along the line B-B of FIG. 8. FIG. 10 is a main-part sectional view of FIG. 9, the left part (where the sensitivity adjuster is disposed) of which is enlarged.

As shown in FIGS. 8 to 10, in the embodiment, a ring-shaped radio wave shield 38 is disposed to stand up and to enclose the circumference of the sensitivity adjuster 31 on the dial plate 15.

Figure 11:
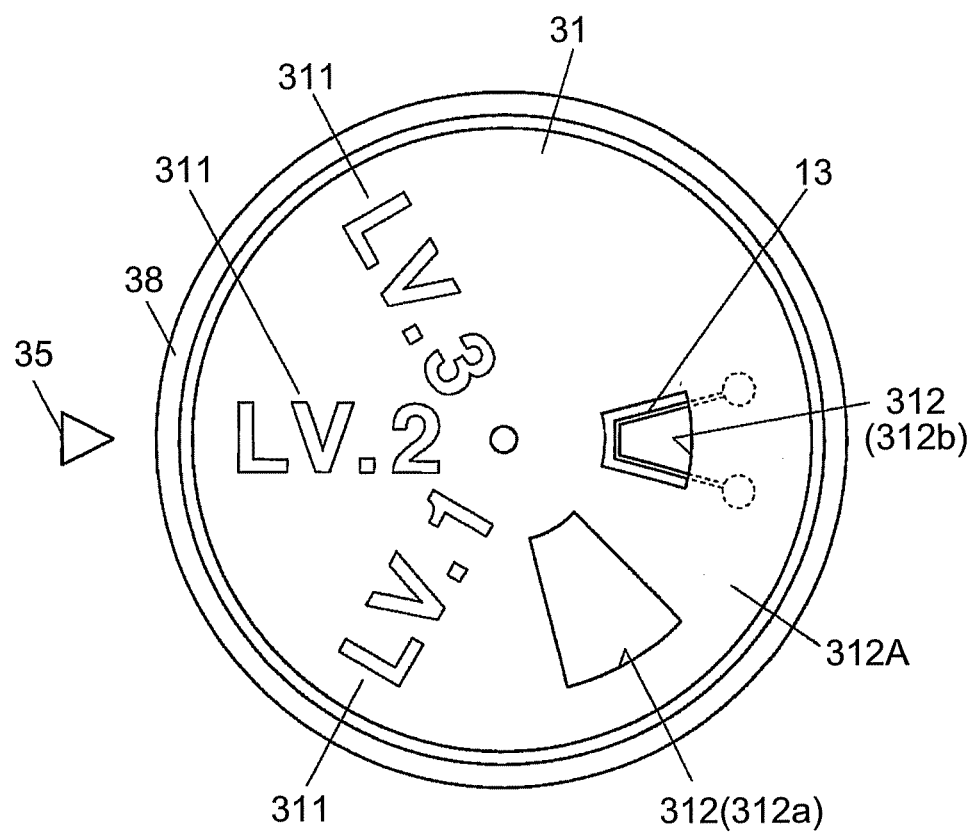
FIG. 11 is a plan view showing that a sensitivity adjuster in the second embodiment is adjusted to a level 2.

FIG. 11 is a plan view showing the sensitivity adjuster 31, the radio wave shield 38 and the like being enlarged.

The radio wave shield 38 shields radio waves entering the antenna 13 from the horizontal direction (the lateral direction in FIGS. 9 and 10), so as to limit the direction in which the antenna 13 transmits/receives radio waves (radio wave transmission/reception direction of the antenna 13, hereinbelow).

The radio wave shield 38 is made of a material which shields radio waves, such as a radio wave absorber which absorbs radio waves. More specifically, for example, the radio wave shield 38 is formed by casting a magnetic material or a material including magnetic powder to be a predetermined shape or by attaching a magnetic sheet to a base material casted to be a predetermined shape.

The size and the height of the radio wave shield 38 are not particularly limited. However, it is preferable that the radio wave shield 38 be disposed in the vicinity of the rim of the sensitivity adjuster 31 as shown in FIGS. 8 to 11, and the height thereof be almost equal to or higher than the height of the sensitivity adjuster 31, so as to appropriately shield radio waves entering the antenna 13 from the horizontal direction.

The rest of the configuration in the second embodiment is the same as that in the first embodiment. The same components as those in the first embodiment are denoted by the same reference numerals, and the description thereof is omitted.

Next, operations of the sensitivity adjustment device 30 and the watch 100, which is a radio wave communication device, in the second embodiment are described.

When the pairing mode is selected as a communication mode, the CPU 201 controls the adjuster drive circuit 208 to drive the adjuster drive motor 34 so as to rotate the sensitivity adjuster 31 to a point where the pointer 35 on the dial plate 15 points the "LV. 1" of the mode indicator 311. When the data synchronization mode is selected as a communication mode, the CPU 201 controls the adjuster drive circuit 208 to drive the adjuster drive motor 34 so as to rotate the sensitivity adjuster 31 to a point where the pointer 35 on the dial plate 15 indicates the "LV. 2" of the mode indicator 311. When the terminal search mode/losing prevention mode is selected as a communication mode, the CPU 201 controls the adjuster drive circuit 208 to drive the adjuster drive motor 34 so as to rotate the sensitivity adjuster 31 to a point where the pointer 35 on the dial plate 15 points the "LV. 3" of the mode indicator 311.

No matter which one of the communication modes is selected, the radio wave shield 38 shields radio waves entering the antenna 13 from the horizontal direction. Hence, radio waves enter the antenna 13 from the vertical direction, namely, from the upper side (front side) of the watch 100, the upper side on which the sensitivity adjuster 31 is disposed. Consequently, when the radio wave sensitivity of the antenna 13 is set at the "LV. 1" or the "LV. 2", radio waves only enters the antenna 13 via the shielding part 312A or the hole 312*b* of the sensitivity adjuster 31. Accordingly, the radio wave sensitivity of the antenna can be adjusted with higher accuracy.

As described above, according to the second embodiment, in addition to the effects described in the first embodiment, the following effects can be obtained.

That is, in the embodiment, the radio wave shield 38 which shields radio waves is disposed to stand up and to enclose the circumference of the sensitivity adjuster 31. Consequently, radio waves which attempt to enter the antenna 13 from the horizontal direction (the lateral direction in FIGS. 9 and 10) are shielded by the radio wave shield 38, so that the radio wave transmission/reception direction of the antenna 13 is limited. Consequently, particularly when the radio wave sensitivity of the antenna 13 is set at the "LV. 1" or the "LV. 2", radio waves entering the antenna 13 can be limited to radio waves entering from the vertical direction (from the upper side of the watch 100) via the shielding part 312A or the hole 312*b* of the sensitivity adjuster 31. Accordingly, the radio wave sensitivity of the antenna 13 can be adjusted with higher accuracy.

[Third Embodiment]

Next, a sensitivity adjustment device and a radio wave communication device in a third embodiment of the present invention are described with reference to FIGS. 12 to 14. Only some of the configuration of the sensitivity adjustment device in the third embodiment is different from that of the sensitivity adjustment device in the first embodiment. Hence, in the following, differences from the first embodiment are described in particular.

Figure 12:
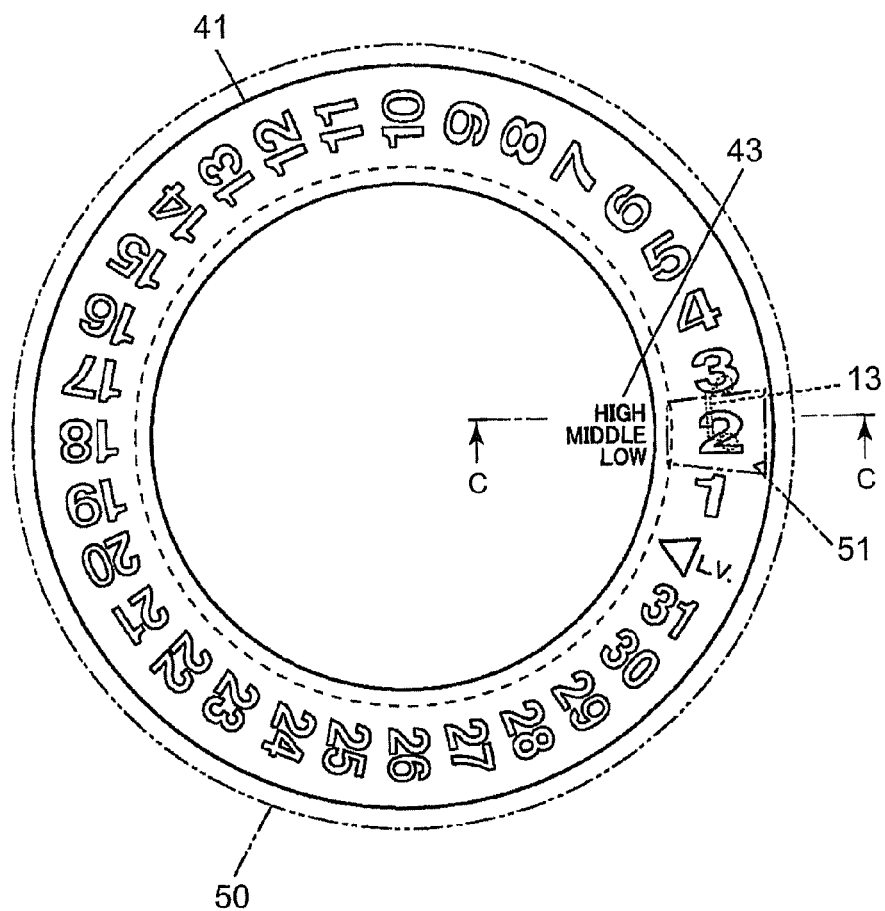
FIG. 12 is a plan view showing a date wheel as a sensitivity adjuster according to a third embodiment of the present invention.
Figure 13:
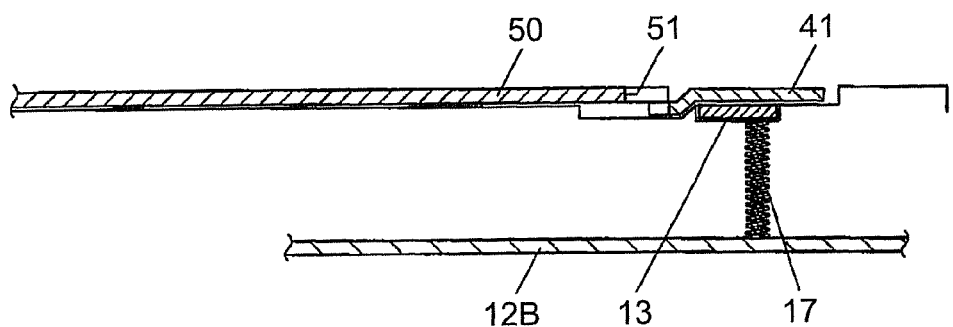
FIG. 13 is a sectional view of the date wheel taken along the line C-C of FIG. 12.

In the embodiment, the watch 100 as a radio wave communication device includes a date wheel 41 shown in FIG. 12 and the like, and has a function to display a date.

FIG. 12 shows a positional relationship between the date wheel 41, the antenna 13 and the like. FIG. 13 is a sectional view taken along the line C-C of FIG. 12. In FIG. 12, a dial plate 50 is shown by a chain double-dashed line. In FIG. 13, the time-indicating characters 16 on the dial plate 50, the hands 11 and the like are not shown.

As shown in FIG. 12, the ring-shaped date wheel 41 is formed by putting numbers "1" to "31" for date display on the front side of a ring-shaped component. As shown in FIGS. 12 and 13, the date wheel 41 is disposed under the dial plate 50 (the back side of the watch 100) so as to overlap with the dial plate 50.

The date wheel 41 has a hole 42 between the numbers for date display. In the embodiment, as shown in FIGS. 12 and 14A to 14C, the hole 42 is made between the number "1" and the number "31". However, the position to make the hole 42 is not limited thereto.

The date wheel 41 is made of a material which shields radio waves, such as a radio wave absorber which absorbs radio waves. More specifically, for example, the date wheel 41 is formed by casting a magnetic material or a material including magnetic powder to be a predetermined shape or by attaching a magnetic sheet to a base material casted to be a predetermined shape. Of the date wheel 41, the hole 42 functions as the penetration part to allow penetration of radio waves, and the part other than the hole 42 functions as the shielding part to shield radio waves. Hence, the date wheel 41 functions as the sensitivity adjuster which adjusts the radio wave sensitivity of the antenna 13 by adjusting the positions of the hole 42 and the shielding part.

At an end of the dial plate 50 (in the embodiment, as shown in FIG. 12, at almost the position of the hour hand 11*c* for three o'clock on the watch 100), a date window 51 which exposes the numbers for date display, the numbers being put on the front side of the date wheel 41, one by one is disposed. Only a number ("2" in FIG. 12) at a position corresponding to the position of the date window 51 can be seen via the date window 51.

In addition, mode indicators 43 (the "LOW", the "MIDDLE" and the "HIGH" in FIGS. 12 and 14A to 14C) for the three communication modes described in the first embodiment (namely, the pairing mode, the data synchronization mode and the terminal search mode/losing prevention mode) are put at the side of the date window 51 on the dial plate 50.

The hole 42 is triangular with the vertex at the side of the date wheel 41, the side which is beside the mode indicators 43. When the communication modes are switched, the vertex of the triangular hole 42 points one of the mode indicators 43.

Under a part where the dial plate 50 and the date wheel 41 are on top of each other (at the lower side in FIG. 13, namely, the back side of the watch 100), the antenna 13 is disposed. The antenna 13 id located to almost completely overlap with the date window 51, and to be beside the "HIGH" of the mode indicator 43.

In the embodiment, when an instruction to switch the communication modes is inputted from the input section 200A, the date wheel 41 is rotated, under the control of a circuit (not shown) which controls rotation of the date wheel 41, to a point where the hole 42 points either the "LOW", the "MIDDLE" or the "HIGH".

Figure 14A:
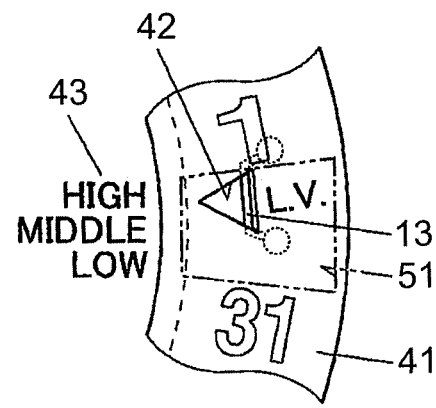
FIG. 14A is a main-part plan view showing that the date wheel shown in FIG. 12 is adjusted to a level of "HIGH"
Figure 14B:
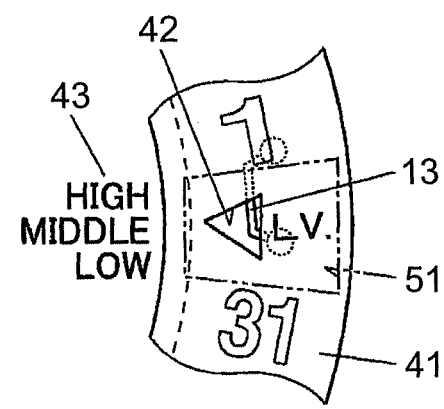
FIG. 14B is a main-part plan view showing that the date wheel shown in FIG. 12 is adjusted to a level of "MIDDLE"
Figure 14C:
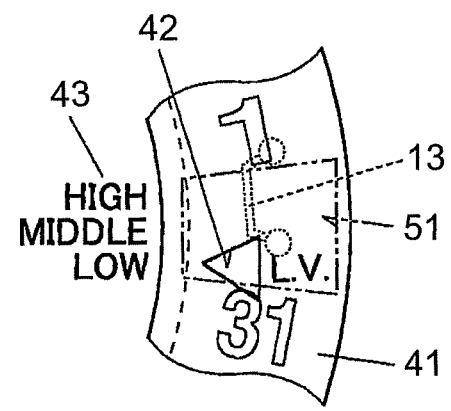
FIG. 14C is a main-part plan view showing that the date wheel shown in FIG. 12 is adjusted to a level of "LOW"

When the date wheel 41 is rotated to a point where the hole 42 points the "LOW" of the mode indicator 43, as shown in FIG. 14C, the hole 42 is not overlapped to the antenna 13 at all, and accordingly the antenna 13 is covered with the part other than the hole 42 (namely, the shielding part) of the date wheel 41. Consequently, the radio wave sensitivity of the antenna 13 becomes the lowest, which is for the pairing mode.

When the date wheel 41 is rotated to a point where the hole 42 points the "MIDDLE" of the mode indicator 43, as shown in FIG. 14B, about half the antenna 13 is exposed through the hole 42. Consequently, the radio wave sensitivity of the antenna 13 becomes medium, which is for the data synchronization mode.

When the date wheel 41 is rotated to a point where the hole 42 points the "HIGH" of the mode indicator 43, as shown in FIG. 14A, almost the entire antenna 13 is exposed through the hole 42. Consequently, the radio wave sensitivity of the antenna 13 becomes the highest, which is for the terminal search mode/losing prevention mode.

In the embodiment, the date wheel 41 which functions as a sensitivity adjuster and a not-shown date wheel moving section which rotates the date wheel 41 constitute the sensitivity adjustment device 30 which adjusts the radio wave sensitivity of the antenna 13.

The rest of the configuration in the third embodiment is the same as that in the first embodiment. The same components as those in the first embodiment are denoted by the same reference numerals, and the description thereof is omitted.

Next, operations of the sensitivity adjustment device 30 and the watch 10, which is a radio wave communication device, in the third embodiment are described.

When the pairing mode is selected as a communication mode, the CPU 201 controls the date wheel moving section so as to rotate the date wheel 41 to a point where the hole 42 points the "LOW" of the mode indicator 43 as shown in FIG. 14C. Consequently, the entire antenna 13 is covered with the part other than the hole 42 (namely, the shielding part) of the date wheel 41, and the radio wave sensitivity of the antenna 13 becomes the lowest, which is for the pairing mode. By performing communications in this state, the watch 100 can perform pairing (initial registration) with a terminal device G which contacts with the watch 100 or comes close enough to the watch 100 to almost contact with the watch 100.

When the data synchronization mode is selected as a communication mode, the CPU 201 controls the date wheel moving section so as to rotate the date wheel 41 to a point where the hole 42 points the "MIDDLE" of the mode indicator 43 as shown in FIG. 14B. Consequently, about half the antenna 13 is exposed through the hole 42, and the radio wave sensitivity of the antenna 13 becomes medium, which is for the data synchronization mode. By performing communications in this state, the watch 100 can transmit/receive data to/from a terminal device G which is located within a distance of about 1 m to 2 m from the watch 100.

When the terminal search mode/losing prevention mode is selected as a communication mode, the CPU 201 controls the date wheel moving section so as to rotate the date wheel 41 to a point where the hole 42 points the "HIGH" of the mode indicator 43 as shown in FIG. 14A. Consequently, almost the entire antenna 13 is exposed through the hole 42, and the radio wave sensitivity of the antenna 13 becomes the highest, which is for the terminal search mode/losing prevention mode. By performing communications in this state, the watch 100 can search for a terminal device G which is located within a distance of about 5 m from the watch 100, or can be informed by a buzzer sound or the like when being 5 m or more away from a terminal device G.

When the communications end, the date wheel 41 rotates to return to its initial point where a date is displayed through the date window 51, and stops there.

As described above, in the third embodiment, in addition to the effects described in the first embodiment, the following effects can be obtained.

That is, because the date wheel 41 is used as a sensitivity adjuster in the embodiment, even when, like a ladies' watch, the area of the dial plate 50 of the watch 100 as a radio wave communication device is small, and hence there is no space to dispose a disc-shaped hand (disc indicator) or the like on the dial plate 50 in addition to the hands 11 (the second hand 11a, the minute hand 11b and the hour hand 11c), a sensitivity adjustment device which adjusts the radio wave sensitivity of the antenna 13 can still be configured as long as the watch 100 includes the date wheel 41 and has a function to display a date.

In the above, the first to third embodiments of the present invention are described. However, the present invention is not limited to the first to third embodiments, and it is needless to say that the present invention can be modified variously without departing from the scope thereof.

Figure 16:
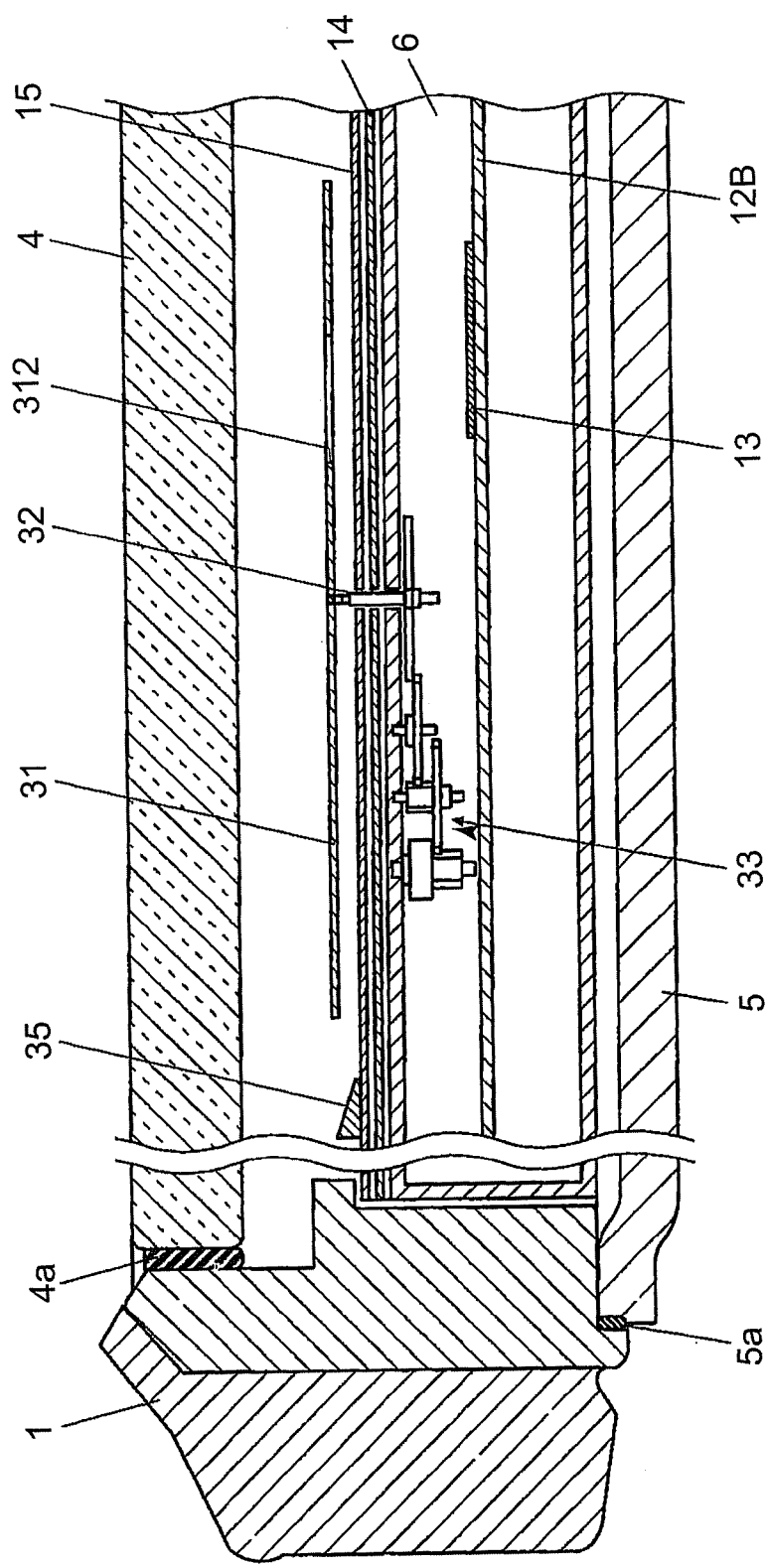
FIG. 16 is a main-part sectional view showing a modification in which an antenna is disposed on a circuit substrate.

For example, in the first to third embodiments, the antenna 13 is disposed under the dial plate. However, the position to dispose the antenna 13 is not limited thereto. For example, the antenna 13 may be disposed under the solar panel 14 (the back side of the watch 100) as shown in FIG. 15, or on the circuit substrate 12B (the front side of the watch 100) as shown in FIG. 16. In the case where the antenna 13 is disposed on the circuit substrate 12B, the antenna 13 and the circuit substrate 12B are directly connected with each other, so that the connector 17 is not necessary.

Figure 17:
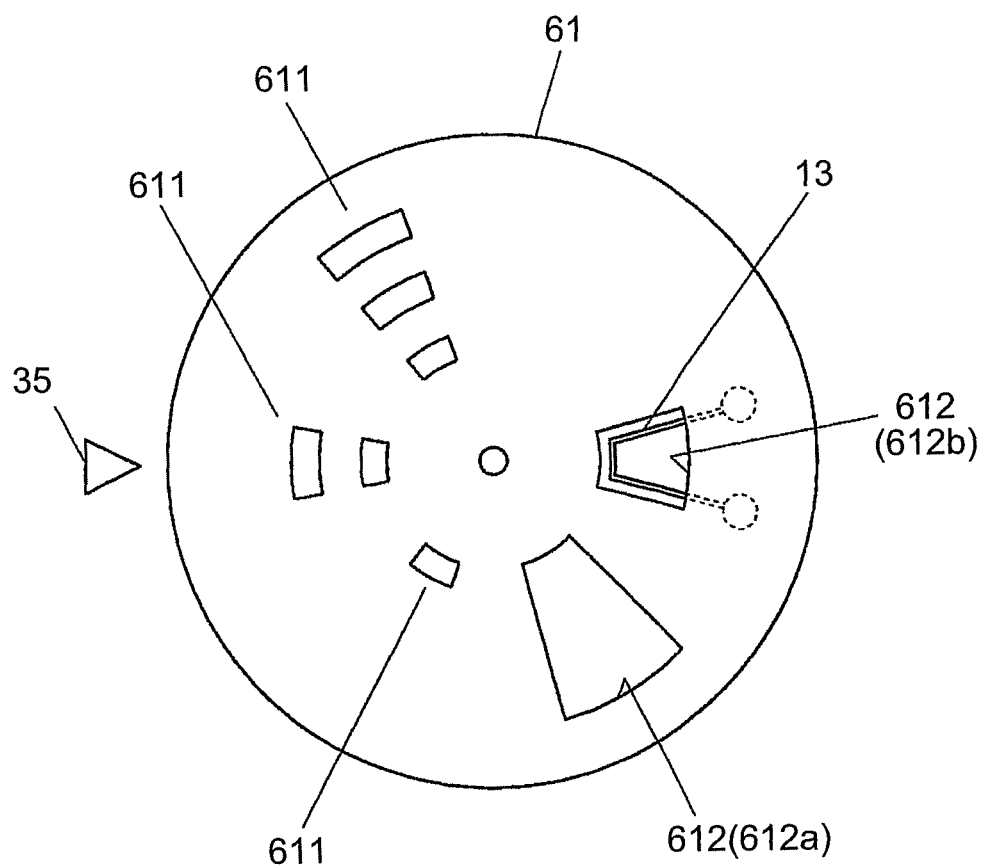
FIG. 17 is a plan view showing a sensitivity adjuster modified from the sensitivity adjuster in the first embodiment and the second embodiment.

Furthermore, the mode indicators are not limited to the examples shown in the figures with reference to which the first to third embodiments are described. For example, as shown in FIG. 17, the mode indicators are not necessary to be letters, and may be patterns or the like. In this case, it is preferable to design the patterns of the mode indicators such that a user can intuitively or easily judge which one of the communication modes is set when looking at the pattern of the mode indicator. For example, a mode indicator 611 for a hole 612a of holes 612 made in a sensitivity adjuster 61 is formed to have a shape by which a user can imagine that a large quantity of radio waves reaches the antenna 13, the hole 612a with which the radio wave sensitivity of the antenna 13 becomes the maximum; and a mode indicator 611 for a hole 612b thereof made in the sensitivity adjuster 61 is formed to have a shape by which a user can imagine that a medium quantity of radio waves reaches the antenna 13, the hole 612b with which the radio wave sensitivity of the antenna 13 becomes medium.

Furthermore, the mode indicators are not limited to the "LV. 1", the "LV. 2" and the "LV. 3" which respectively indicate the levels of the radio wave sensitivity of the antenna 13. For example, the communication modes (the pairing mode, the data synchronization mode and the terminal search mode/losing prevention mode, for example) themselves which respectively correspond to the levels of the radio wave sensitivity of the antenna 13 may be displayed (put) on the sensitivity adjuster as the mode indicators.

Figure 18:
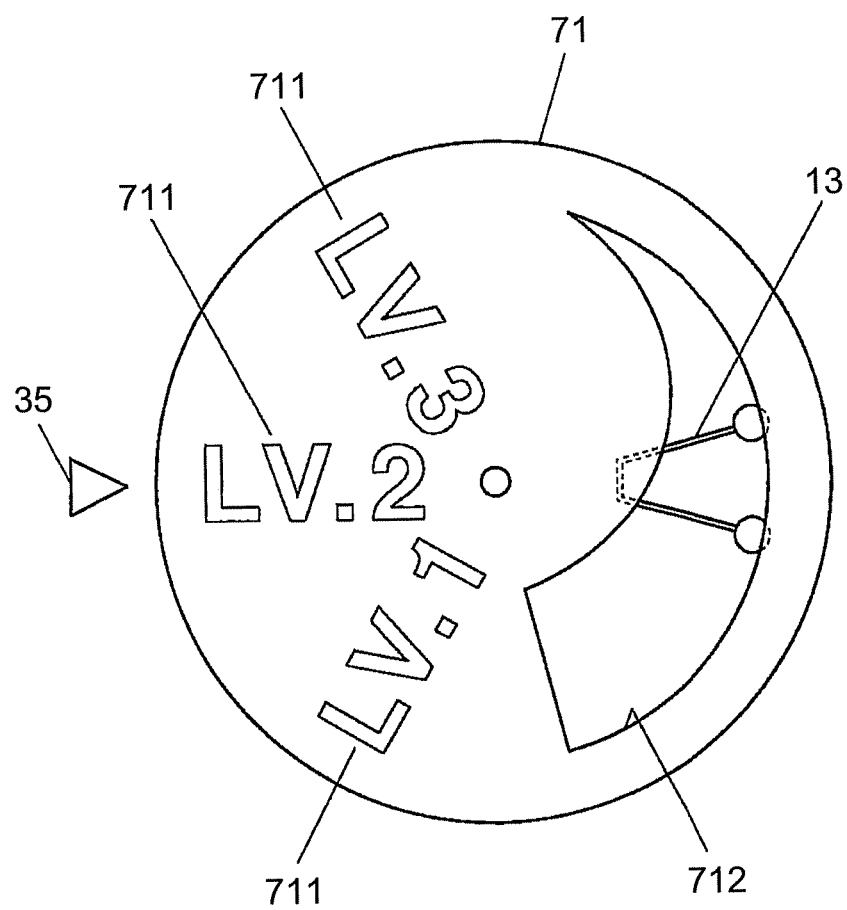
FIG. 18 is a plan view showing a sensitivity adjuster modified from the sensitivity adjuster in the first embodiment and the second embodiment.

Furthermore, the number of holes made in the sensitivity adjuster as the penetration part is not limited to two, and hence may be more than two. Alternatively, for example, as shown in FIG. 18, one hole 712 may be made in a sensitivity adjuster 71. The hole 712 is made in such a way that one end part is wide to expose almost the entire antenna 13, and the other end part is narrow not to expose the antenna 13 almost at all. In this case, the covered area of the antenna 13 covered with a shielding part 712A is changed in accordance with the "LV. 1", the "LV. 2" and the "LV. 3" of mode indicators 711 which indicate the levels of the radio wave sensitivity.

In the first to third embodiments, the number of levels between which the radio wave sensitivity of the antenna 13 can be switched is three, but not limited thereto. For example, the number of the levels may be more than three. Alternatively, in the case where the hole 712 shown in FIG. 18 is made in the sensitivity adjuster 71, the radio wave sensitivity of the antenna 13 may be switched gradually as if there is no limit to the number of the levels.

For example, when pairing is not established with the radio wave sensitivity of the antenna 13 initially set for the pairing mode, a user may manually increase the radio wave sensitivity thereof little by little until the pairing is established.

Furthermore, in the first to third embodiments, the levels of the radio wave sensitivity of the antenna 13 are associated with the communication modes. For example, when the pairing mode is selected, the adjuster drive motor 34 is driven under the control of the CPU 201 and the adjuster drive circuit 208 so that the sensitivity adjuster 31 rotates to make the radio wave sensitivity of the antenna 13 the level 1 (the "LV. 1" in FIG. 4 and the like) which is the lowest level. However, it is not necessary that the switching of the communication modes and the switching of the levels of the radio wave sensitivity are linked, and accordingly the sensitivity adjuster 31 automatically rotates when the communication modes are switched. For example, the sensitivity adjuster 31 may be rotated to a point where desired radio wave sensitivity of the antenna 13 is obtained, by a user manually operating a watch stem or the like.

Figure 19:
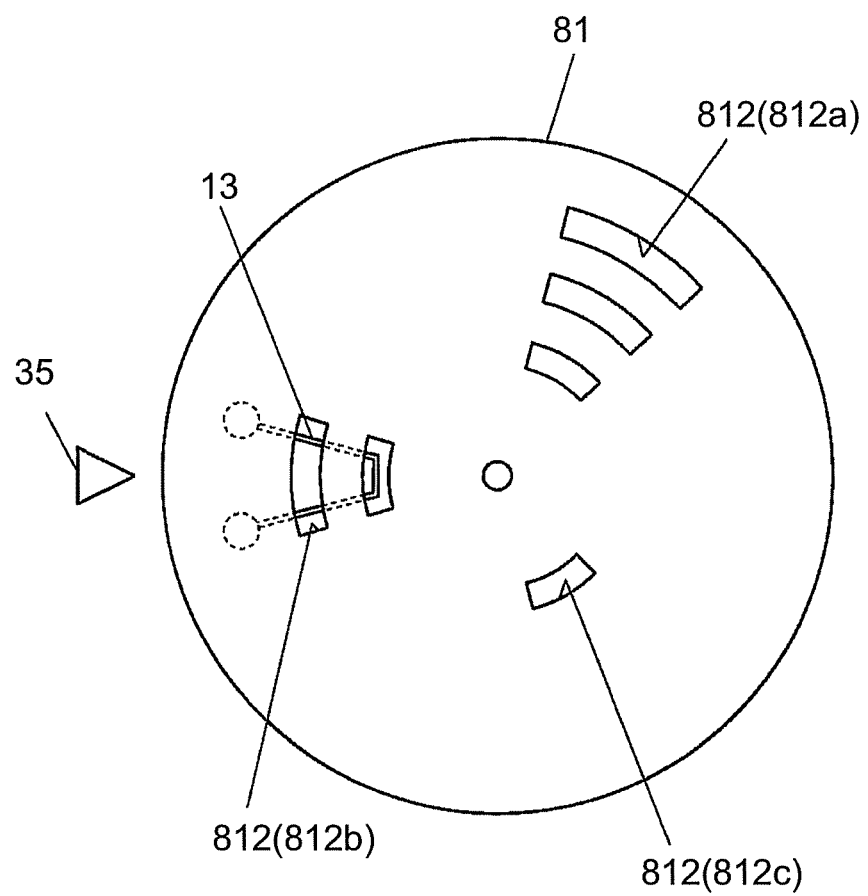
FIG. 19 is a plan view showing a sensitivity adjuster modified from the sensitivity adjuster in the first embodiment and the second embodiment.

Furthermore, as shown in FIG. 19, holes 812 which serve as mode indicators too may be made in a sensitivity adjuster 81.

Figure 20:
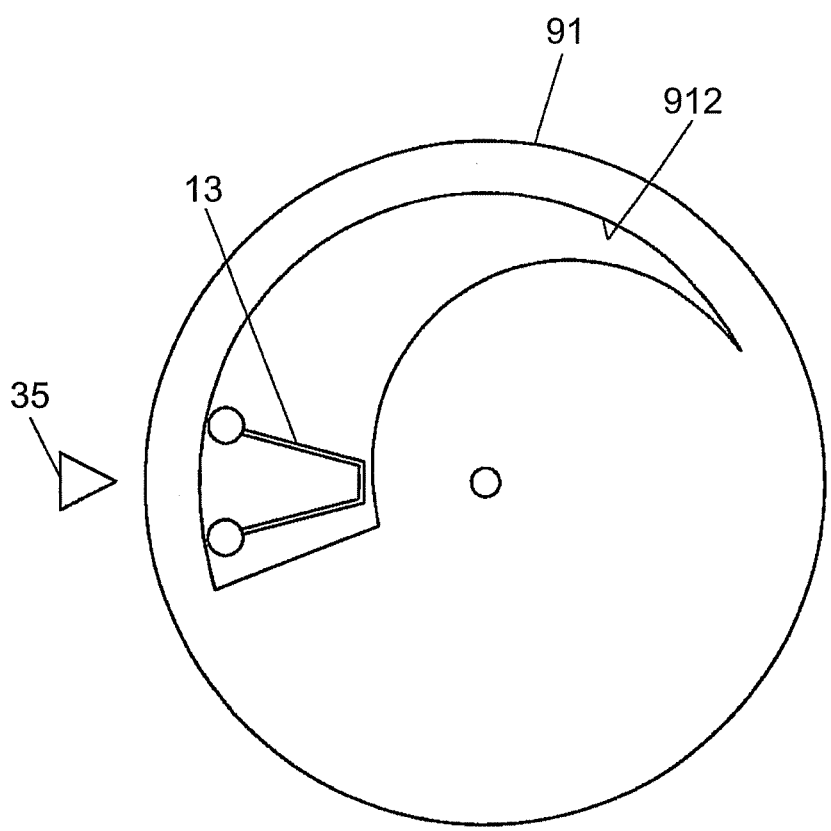
FIG. 20 is a plan view showing a sensitivity adjuster modified from the sensitivity adjuster in the first embodiment and the second embodiment.

Furthermore, it is not necessary that the number of holes which serve as mode indicators too is more than one. For example, as shown in FIG. 20, one hole 912 which serves as mode indicators too may be made in a sensitivity adjuster 91.

Furthermore, in the first to third embodiments, the sensitivity adjuster 31 is a disc-shaped plate, and the radio wave sensitivity of the antenna 13 is controlled by rotation of the sensitivity adjuster 31. However, the shape and the like of the sensitivity adjuster are not limited thereto. For example, the covered area of the antenna 13 covered with the sensitivity adjuster 31 may be adjusted by linear movement of the sensitivity adjuster 31.

Furthermore, the penetration part is not limited to a hole, but may be a notch or the like.

[Fourth Embodiment]

A fourth embodiment of the present invention is described with reference to FIGS. 21 to 28. The same components as those in the first to third embodiments are denoted by the same reference numerals, and the description thereof is omitted when available.

Figure 21:
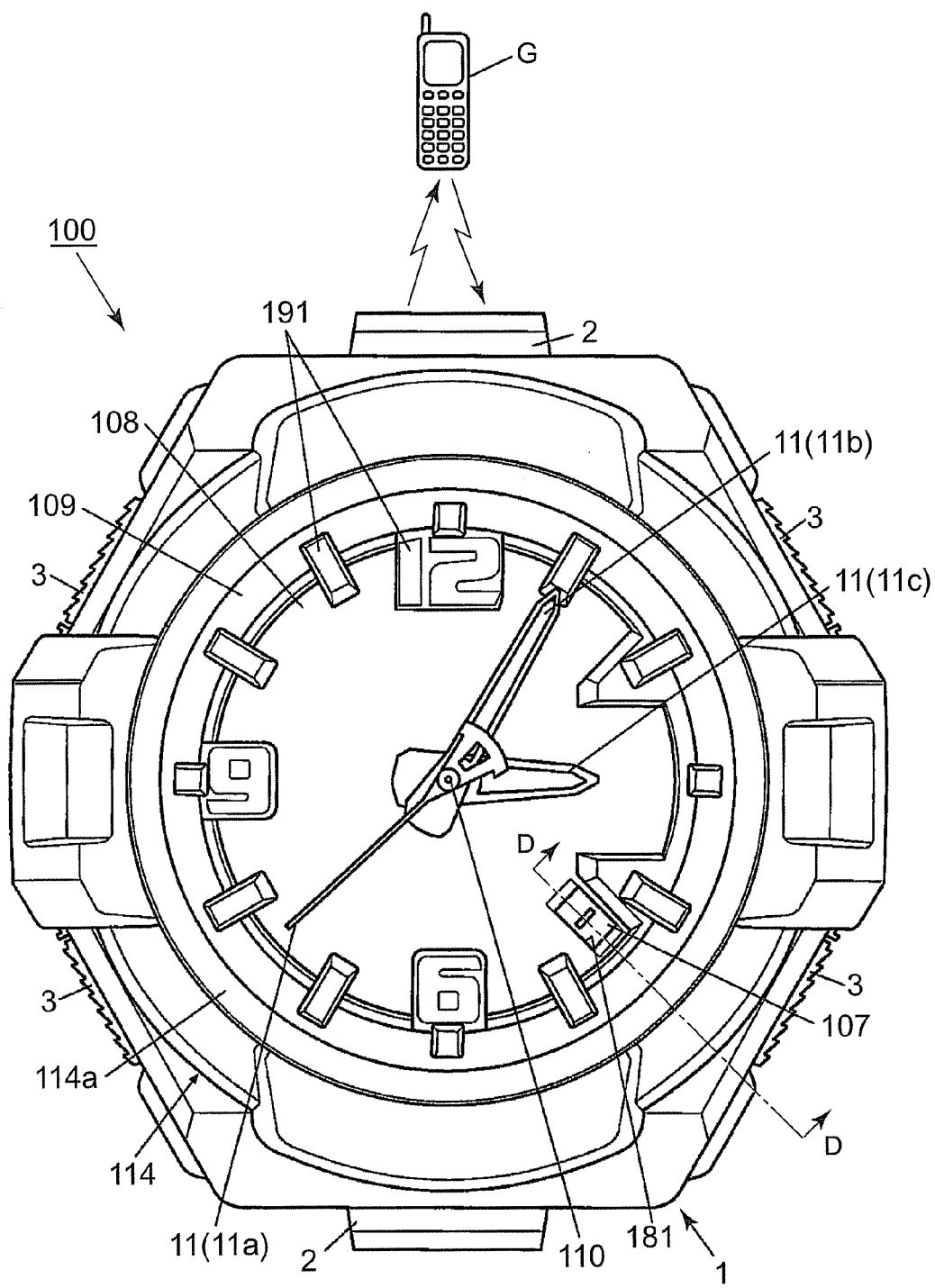
FIG. 21 is a front view of a watch to which a sensitivity adjustment device according to a fourth embodiment of the present invention is applied.
Figure 22:
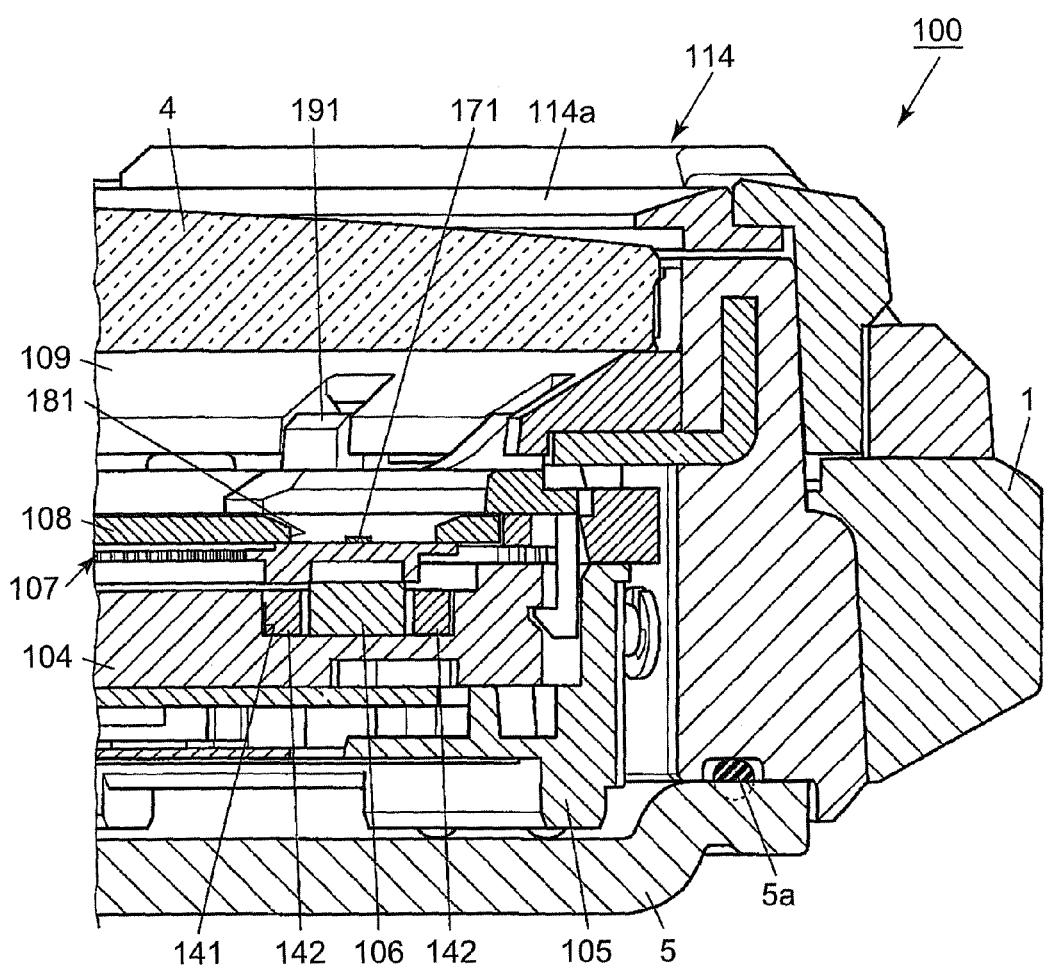
FIG. 22 is a sectional view of the watch taken along the line D-D of FIG. 21.

FIG. 21 is a front view of a watch main body of a watch in the fourth embodiment. FIG. 22 is a sectional view taken along the line D-D of FIG. 21.

The watch 100 in the fourth embodiment, like the watch 100 in the first to third embodiments, can switch communication modes to differ the radio wave sensitivity of an antenna 106 with the operation buttons 3.

The main body case 1 includes the front-side opening part on the front side (the visual confirmation side of the watch 100; the upper side in FIG. 22) and the back-side opening part on the back side (the lower side in FIG. 22). The windshield 4 made of a transparent material such as glass is attached to the main body case 1 so as to cover the front-side opening part via a not-shown waterproof ring.

On the other hand, the back-side cover 5 is attached to the main body case 1 so as to cover the back-side opening part via the waterproof ring 5a. In the embodiment, the back-side cover 5 is made of a metal material such as stainless steel or titanium.

In addition, a ring-shaped bezel 114 having a protection 114a to cover the rim of the windshield 4 is fitted into the front-side opening part from the outside of the main body case 1.

In the main body case 1, a module 104 formed to be almost cylindrical is disposed. The module 104 is supported by a module supporter 105 from the back side (the lower side in FIG. 22), thereby being fixed in the main body case 1 not to be unstable.

Figure 23:
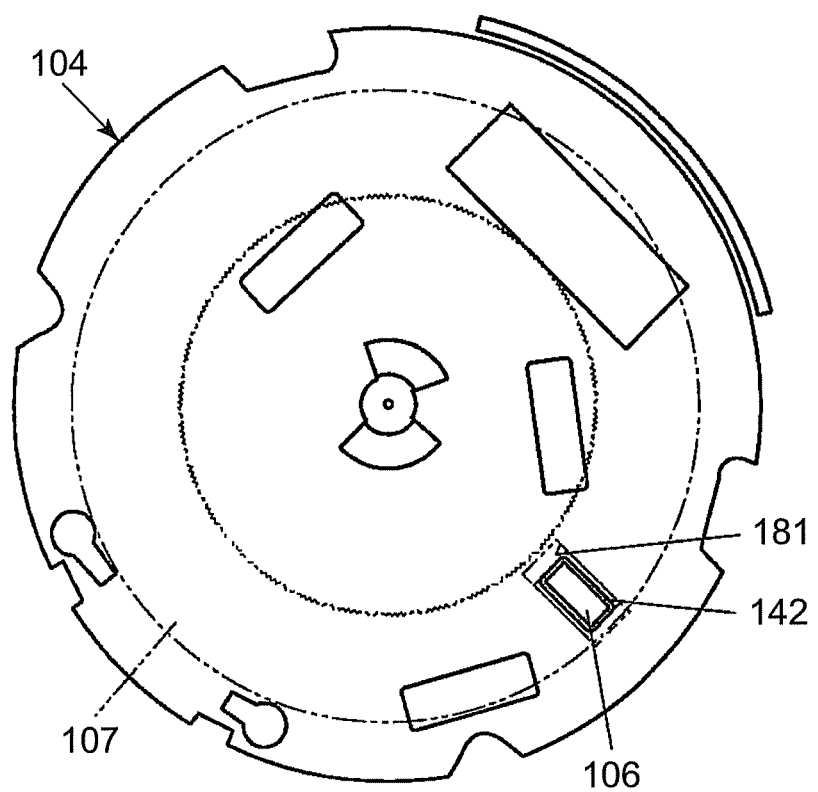
FIG. 23 is a plan view showing a module of the watch shown in FIG. 21.

FIG. 23 is a plan view of the module 104 viewed from the upper side (the visual confirmation side of the watch 100; the upper side in FIG. 22). In FIG. 23, the corresponding positions of a calendar display 107 (described below) and a date window 181 (described below) of a dial plate 108 on the module 104 are shown by chain double-dashed lines.

The module 104 is configured in such a way that a not-shown timepiece movement (a drive motor, a gear train mechanism and the like) which moves the second hand 11a, the minute hand 11b and the hour hand 11c of the hands 11 of the watch 100, a not-shown circuit substrate having various electronic components thereon, and the like are installed in a not-shown housing made of a resin or the like.

As shown in FIGS. 22 and 23, a concave part 141 is formed on the upper side (the visual confirmation side of the watch 100, the upper side in FIG. 22) between a position of the hour hand 11c for four o'clock and a position of the hour hand 11c for five o'clock of the watch 100.

In the concave part 141, for example, the small chip or loop antenna 106 is accommodated. The position where the antenna 106 is disposed is not limited to the position shown in FIGS. 22 and 23, and hence the antenna 106 may be disposed at another position.

The antenna 106 transmits/receives signals to/from an external device (a terminal device G shown in FIG. 21, for example) wirelessly, and is the same as the antenna in the first to third embodiments.

The antenna 106 is electrically connected to the circuit substrate via a not-shown connector or the like, and also connected to a not-shown control circuit (a transmission/reception control circuit, hereinbelow) via the connector. The transmission/reception control circuit controls transmission/reception of radio waves.

In the embodiment, the antenna 106 and the transmission/reception control circuit themselves always maintain the maximum radio wave sensitivity (for example, the radio wave sensitivity with which transmission/reception of radio waves are available within a distance of about 5 m from the antenna 106, in the embodiment), and the radio wave sensitivity of the antenna 106 is mechanically adjusted by changing a covered area of the antenna 106 covered with a calendar display 107 of a sensitivity adjustment device 170 (shown in FIG. 24) (namely, the degree of shielding radio waves which attempt to enter the antenna 106).

In the concave part 141, a radio wave shield 142 is disposed along the inner face of the concave part 141 to enclose the lateral face of the antenna 106. The radio wave shield 142 is a magnetic body made of a magnetic material such as ferrite, a material in which magnetic powder is included in a synthetic resin, or the like. The radio wave shield 142 absorbs radio waves which attempt to enter the antenna 106 with the magnetic loss of its magnetic material, so as to shield the radio waves.

By disposing the radio wave shield 142 to enclose the lateral face of the antenna 106, the radio wave transmission/reception direction of the antenna 106 is limited to the vertical direction. In addition, because in the embodiment, the back-side cover 5 is made of a metal material as described above, radio waves from the back-side cover 5 side are shielded by the back-side cover 5, and consequently the antenna 106 transmits/receives radio waves only via the front side of the watch 100 (the visual confirmation side of the watch 100, the upper side in FIG. 22).

On the module 104, the calendar display 107 is disposed to cover the antenna 106 (shown in FIG. 23).

The calendar display 107 is formed by putting calendar display parts (calendar display parts 171 in FIG. 24) at predetermined intervals in the circumferential direction on the front side of a ring-shaped display main body 107A, and providing a pair of a shielding part (a thick part 174 in FIG. 24) to shield radio waves and a penetration part (a thin part 175 in FIG. 24) disposed next to the shield part to allow penetration of radio waves, for each calendar display part 171. The calendar display 107 is rotatable around the center of the display main body 107A. As shown in FIG. 23, in the embodiment, the calendar display 107 is in the shape of being along the rim of the module 104.

In the embodiment, the calendar display 107 and a calendar moving section 178 which rotates the calendar display 107 around the center thereof constitute the sensitivity adjustment device 170 which adjusts the radio wave sensitivity of the antenna 106.

Figure 24:
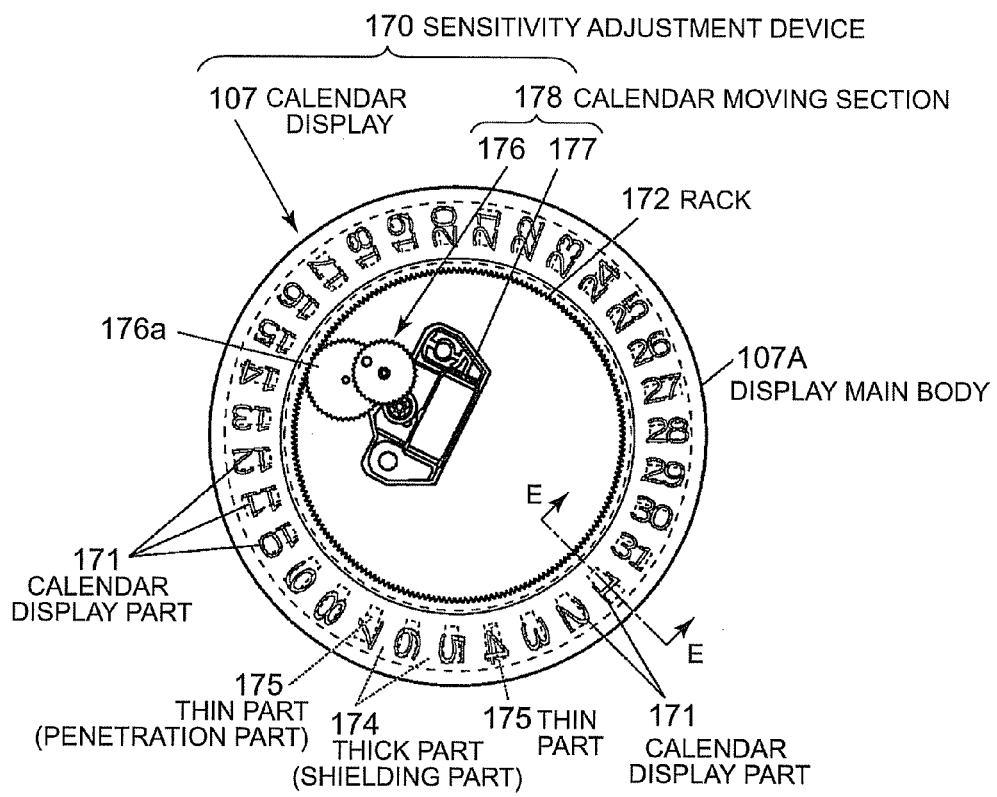
FIG. 24 is a plan view showing the sensitivity adjustment device in the fourth embodiment.

FIG. 24 is a plan view schematically showing the configuration of the sensitivity adjustment device 170 in the embodiment.

In the embodiment, the calendar display 107 is made of a material which shields radio waves, such as a radio wave absorber which absorbs radio waves. More specifically, the calendar display 107 is formed, for example, by casting a magnetic material such as ferrite or a material including magnetic powder to be a predetermined shape. However, the material of the calendar display 107 is not limited thereto.

As shown in FIG. 24, in the embodiment, the calendar display 107 is a date wheel in which, as the calendar display parts 171, the numbers "1" to "31" for date display are disposed on the front side of the ring-shaped display main body 107A along the rim of the calendar display 107 at predetermined intervals clockwise.

Figure 25:
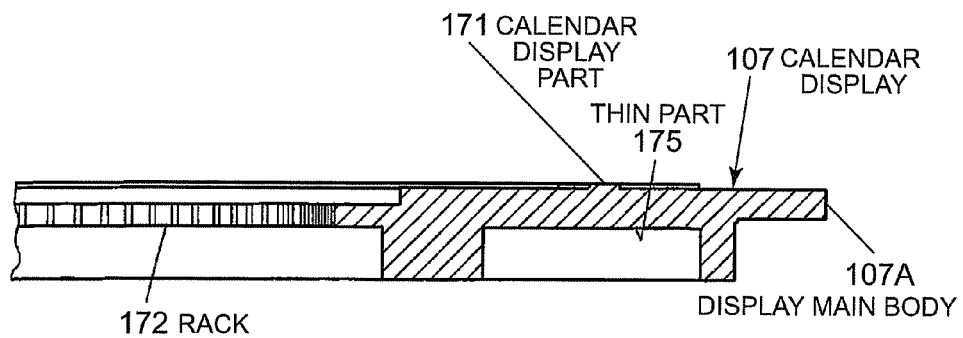
FIG. 25 is a sectional view of a calendar display taken along the line E-E of FIG. 24.

FIG. 25 is a sectional view of the calendar display 107 taken along the line E-E of FIG. 24.

In the embodiment, the calendar display 107 is provided with a pair of the shielding part, which shields radio waves, and the penetration part, which is disposed next to the shielding part and allows penetration of radio waves, for each of the calendar display parts 171. That is, the calendar display 107 is provided with 31 pairs thereof.

As shown in FIGS. 24 and 25, concave parts are engraved at points on the back side of the calendar display 107, the points respectively corresponding to the calendar display parts 171 (date display parts) on the front side of the calendar display 107. Consequently, parts of the calendar display 107 corresponding to the concave parts are thinner than the other parts thereof in a direction in which radio waves penetrate (radio wave passing direction, hereinbelow), thereby being thin parts 175. The above-described other parts, namely, the parts other than the thin parts 175 and respectively disposed next to the thin parts 175, are thick parts 174 which are thicker than the thin parts 175 in the radio wave passing direction.

In the embodiment, the thick parts 174 constitute the shielding part to shield radio waves, and the thin parts 175 constitute the penetration part to allow penetration of radio waves.

In the embodiment, each of the thin parts 175 (namely, the concave parts constituting the thin parts 175) is formed to be a fan-shape with the central angle of 360/62 degrees or less when the center of the calendar display 107 is taken as the rotation center. The shape and the size of each thin part 175 are not limited thereto.

As shown in FIGS. 24 and 25, on the inner face of the display main body 107A of the calendar display 107, a rack 172 is disposed in the circumferential direction.

On the module 104, a calendar-use gear train mechanism 176 and the calendar moving section 178 are disposed. The calendar-use gear train mechanism 176 includes a calendar drive gear 176a which meshes with the rack 172 of the calendar display 107. The calendar moving section 178 includes a motor 177 connected with the calendar-use gear train mechanism 176 to drive the calendar-use gear train mechanism 176. The motor 177 is, for example, a stepping motor.

When the communication modes are switched by the operation buttons 3, the calendar moving section 178 rotates the calendar display 107 in such a way that the radio wave sensitivity of the antenna 106 becomes suitable for the selected communication mode.

More specifically, the calendar moving section 178 drives the calendar-use gear train mechanism 176 with the motor 177, and conveys the power to the calendar display 107 so as to rotate (in the embodiment, rotate counterclockwise) the calendar display 107. Consequently, the positions of the thick parts 174, which are the shielding part of the calendar display 107, and the thin parts 175, which are the penetration part thereof, are changed, and the degree of shielding radio waves (radio wave shielding degree, hereinbelow) by the thick parts 174 as the shielding part is adjusted, whereby the radio wave sensitivity of the antenna 106 is adjusted.

The rotation direction of the calendar display 107, the configurations of the calendar-use gear train mechanism 176 and the motor 177 of the calendar moving section 178 which rotates the calendar display 107, and the like are not limited to those described herein. For example, the calendar moving section 178 may be used as another drive mechanism too, such as a mechanism which rotates the hands 11 of the watch 100.

A dial plate 108 is disposed between the calendar display 107 and the windshield 4. In addition, a partition 109 is disposed between the dial plate 108 and the windshield 4 to cover the rim of the dial plate 108. In the embodiment, as shown in FIG. 21, the partition 109 is provided with time-indicating characters 191, which function to display time on the watch 100, in the circumferential direction.

As shown in FIG. 21, almost in the center of the dial plate 108, shafts 110 are inserted to pass through the dial plate 108 from the module 104 side. The shafts 110 respectively support the second hand 11a, the minute hand 11b and the hour hand 11c of the hands 11 of the watch 100 to be rotatable. Between the calendar display 107 and the windshield 4, for example, a liquid crystal display section which displays numbers, letters and the like by a digital system may be disposed in addition to the analog-system dial plate 108.

In the embodiment, at a position on the dial plate 108 corresponding to the antenna 106, namely, between a position of the hour hand 11c for four o'clock and a position of the hour hand 11c for five o'clock (between a time-indicating character 191 for four o'clock and a time-indicating character 191 for five o'clock in FIG. 21) on the watch 100, a date window 181 which exposes and displays a calendar display part 171 of the calendar display 107 is disposed.

Figure 26A:
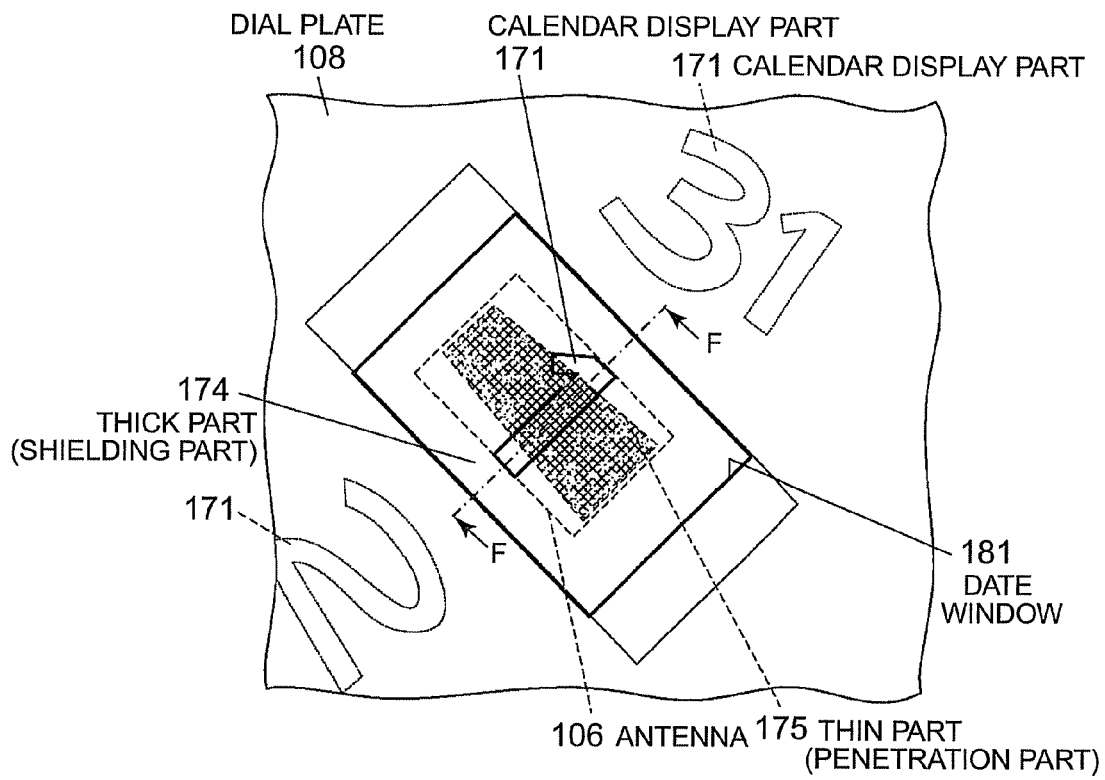
FIG. 26A is a plan view showing a positional relationship between the calendar display and an antenna in a state in which radio wave sensitivity of the antenna is the highest.
Figure 26B:
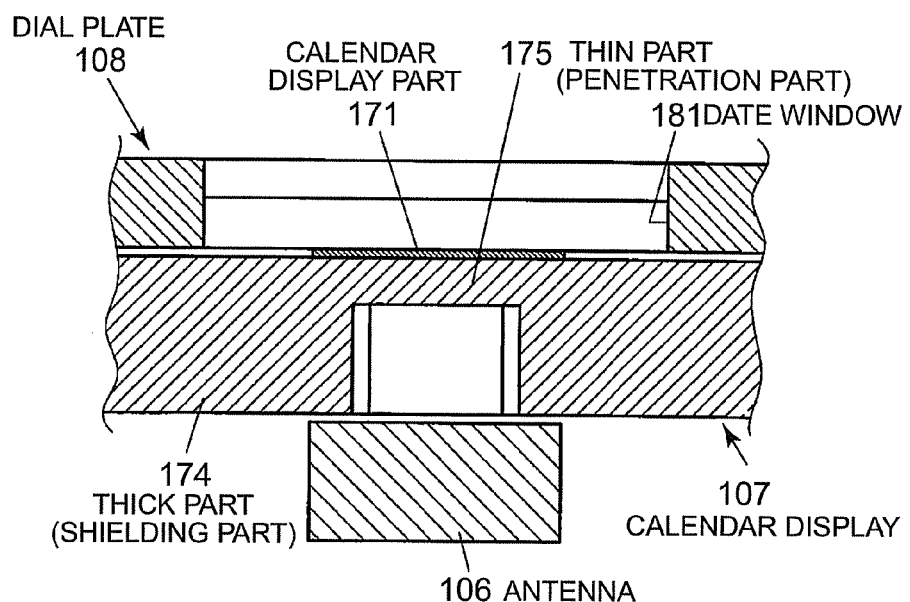
FIG. 26B is a sectional view taken along the line F-F of FIG. 26A.
Figure 27A:
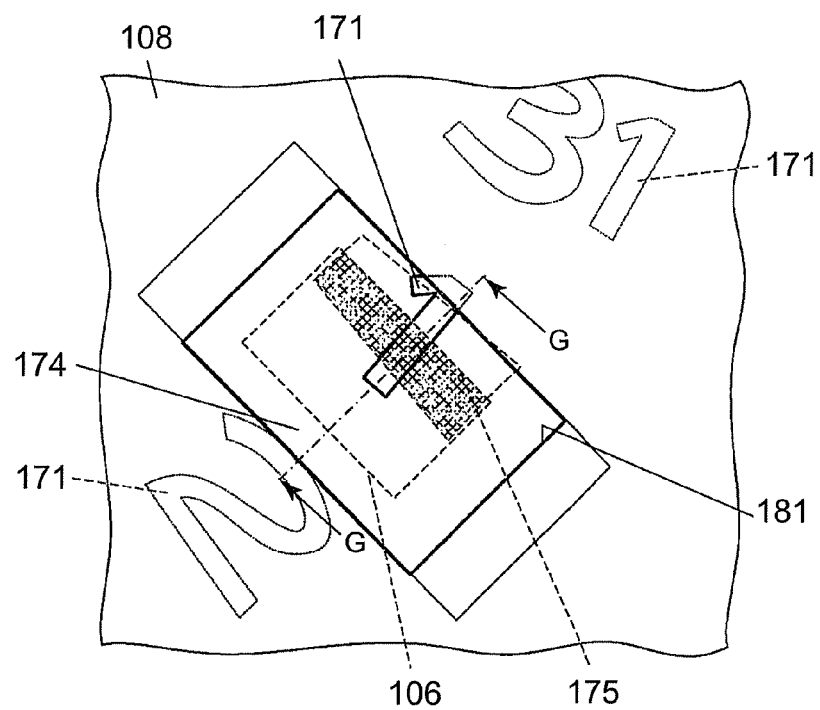
FIG. 27A is a plan view showing a positional relationship between the calendar display and the antenna in a state in which the radio wave sensitivity of the antenna is medium.
Figure 27B:
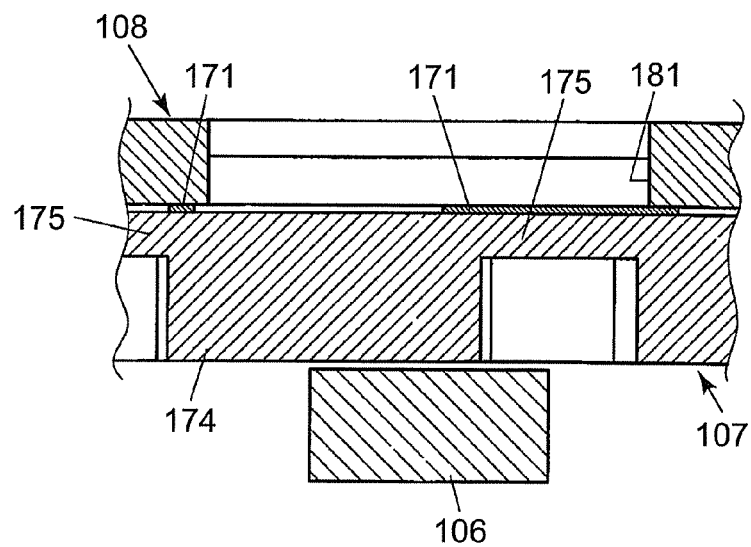
FIG. 27B is a sectional view taken along the line G-G of FIG. 27A.
Figure 28A:
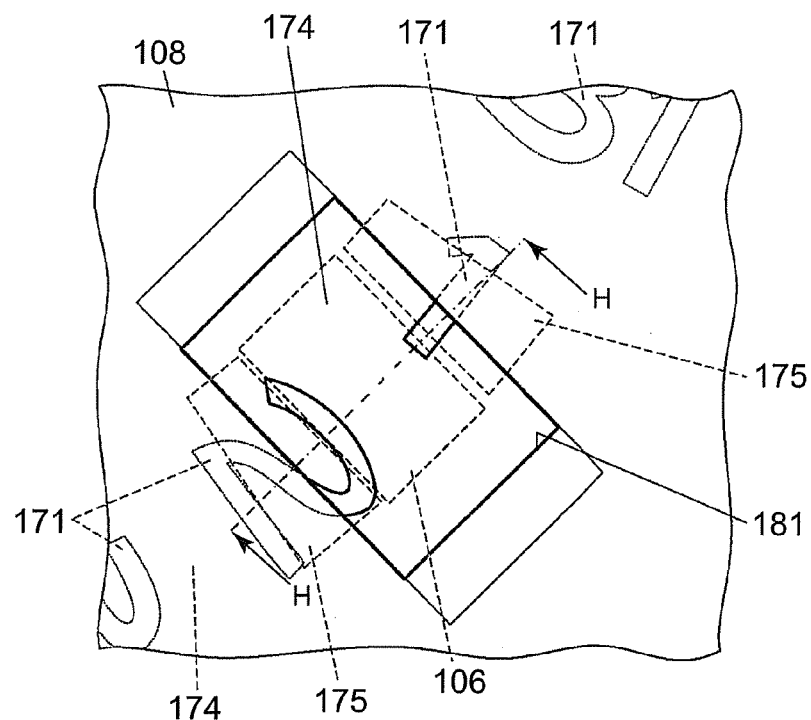
FIG. 28A is a plan view showing a positional relationship between the calendar display and the antenna in a state in which the radio wave sensitivity of the antenna is the lowest.
Figure 28B:
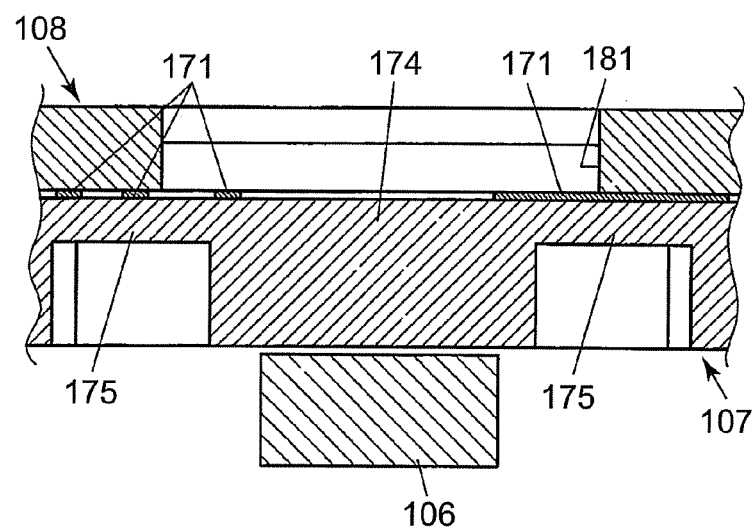
FIG. 28B is a sectional view taken along the line H-H of FIG. 28A.

FIGS. 26A and 26B show a positional relationship between the calendar display 107 and the antenna 106 in a state in which the radio wave sensitivity of the antenna 106 is the highest. FIGS. 27A and 27B show a positional relationship between the calendar display 107 and the antenna 106 in a state in which the radio wave sensitivity of the antenna 106 is medium. FIGS. 28A and 28B show a positional relationship between the calendar display 107 and the antenna 106 in a state in which the radio wave sensitivity of the antenna 106 is the lowest.

In FIGS. 26A, 27A and 28A, the date window 181 of the dial plate 108 is shown by a bold line, positions of the antenna 106 and the thin part 175 are shown by broken lines, and of the thin part 175, a part over the antenna 106 in the radio wave passing direction is shown by shading in gridlike fashion.

As shown in FIGS. 26A and 26B, when a calendar display part 171 is displayed at the date window 181 of the dial plate 108, the entire thin part 175 of the calendar display 107 is overlapped to the antenna 106. Consequently, the radio wave shielding degree by the thick part 174 as the shielding part becomes low. Accordingly, the radio wave sensitivity of the antenna 106 becomes the highest. In the embodiment, when the communication modes are not switched, a calendar display part 171 which indicates the current date (for example, the number "1" when the current date is the "first day" of a month, as shown in FIG. 26A) is displayed at the date window 181, and the antenna 106 maintains the highest radio wave sensitivity.

To make the antenna 106 have the medium radio wave sensitivity, the calendar moving section 178 is operated so that the calendar display 107 is moved to a point where a calendar display part 171 is displayed at the date window 181 of the dial plate 108 in a state in which a part of the calendar display part 171 is out of the date window 181 (i.e. not in the date window 181) as shown in FIGS. 27A and 27B. Consequently, about half a thin part 174 of the calendar display 107 is overlapped to the antenna 106, and about half the antenna 106 is covered with the thick part 174 of the calendar display 107. Accordingly, the radio wave shielding degree by the thick part 174 as the shielding part becomes higher than that in the state shown in FIGS. 26A and 1613, and the radio wave sensitivity of the antenna 106 becomes medium.

To make the antenna 106 have the lowest radio wave sensitivity, the calendar moving section 178 is operated so that the calendar display 107 is moved to a point where a calendar display part 171 is not exposed through the date window 181 of the dial plate 108 almost at all as shown in FIGS. 28A and 28B. Consequently, a thick part 174 of the calendar display 107 is overlapped to the entire upper side of the antenna 106. Accordingly, the radio wave shielding degree by the thick part 174 as the shielding part becomes the highest, and the radio wave sensitivity of the antenna 106 becomes the lowest.

The watch 100 also includes: for example, a control section constituted of a CPU (Central Processing Unit), a ROM (Read Only Memory), a RAM (Random Access Memory) and the like; a transmission/reception control circuit which controls transmission/reception of radio waves: a timer circuit which performs time correction and the like; an oscillation circuit; and a hand drive circuit which drives the hands 11 (all not shown). These are the same as those provided for a conventional watch, and hence the illustrations and description thereof are omitted.

Next, operations of the sensitivity adjustment device 170 and the watch 100 as a radio wave communication device in the embodiment are described.

In the embodiment, as described above, the sensitivity adjustment device 170 adjusts the radio wave shielding degree with the thick part 174 as the shielding part, whereby the watch 100 adjusts the radio wave sensitivity of the antenna 106.

That is, the watch 100 can execute a plurality of communication modes (in the embodiment, the pairing mode, the data synchronization mode and the terminal search mode/losing prevention mode) under different radio wave sensitivity of the antenna 106, and the sensitivity adjustment device 170 adjusts the radio wave shielding degree with the thick part 174 as the shielding part so that the radio wave sensitivity of the antenna 106 becomes suitable for each communication mode. The communication modes (namely, the pairing mode, the data synchronization mode and the terminal search mode/losing prevention mode) are the same as those described in the first to third embodiments, and the description thereof is omitted.

The communication modes are not limited thereto. For example, the present invention may have only one of the pairing mode, the data synchronization mode and the terminal search mode/losing prevention mode, or may have a communication mode in addition to these three communication modes.

When pairing is performed, in order not to establish unexpected pairing with a terminal device which exists around the watch 100 but is not a party for the pairing, it is preferable to adjust the radio wave sensitivity of the antenna 106 to be low to the extent that only when the watch 100 and a terminal device G contact with each other or come close enough to almost contact with each other, transmission/reception of radio waves between the watch 100 and the terminal device G is available.

For that, in the embodiment, when an instruction to select the pairing mode is inputted with an operation button 3 or the like, and the pairing mode is set as a communication mode, the motor 177 of the calendar moving section 178 operates to rotate gears of the calendar-use gear train mechanism 176 successively, and the calendar drive gear 176*a* meshes with the rack 172 of the calendar display 107 to rotate. Consequently, the calendar display 107 rotates counterclockwise to a point where a calendar display part 171 is not exposed through the date window 181 of the dial plate 108 almost at all. That is, the calendar display 107 rotates counterclockwise to the extent that the midway point between two calendar display parts 171 (the numbers "1" and "2" in FIG. 28A) is positioned at the center of the date window 181. Consequently, the radio wave shielding degree by the thick part 174 as the shielding part becomes the highest, and the radio wave sensitivity of the antenna 106 becomes the lowest which is suitable for the pairing mode.

In this state, when a user makes a terminal device G which is a party for the pairing contact with the watch 100 or places the terminal device G close to the watch 100, namely, within a distance of about 10 cm from the watch 100, a query signal for pairing (for example, a signal including an individual identification number or the like of the watch 100) is transmitted from the antenna 106 of the watch 100, and only a terminal device G located within a distance in which the query signal can be received receives the query signal. The terminal device G which receives the query signal returns an answer signal (for example, a signal including an individual identification number or the like of the terminal device G) to the watch 100. When receiving the answer signal, the antenna 106 of the watch 100 transmits the answer signal to the control section of the watch 100. Then, the control section registers the terminal device G as a terminal device which can transmit/receive data to/from the watch 100 thereafter. Thus, pairing (initial registration operation between terminal devices) is completed.

It is preferable that a user is informed about establishment of pairing and/or failure of pairing by flashing of a not-shown light, an alarm sound or the like.

Furthermore, in a case where pairing is not established between the watch 100 and a terminal device G which is a party for the pairing (namely, in a case where a message or warning indicating failure of the pairing is given) in a state in which the radio wave sensitivity of the antenna 106 is the lowest (namely, in a state in which the radio wave shielding degree by the thick part 174 as the shielding part is the highest), pairing may be attempted again. For that, a user operates an operation button 3, so that the calendar moving section 178 rotates the calendar display 107 to a point where a calendar display part 171 is exposed through the date window 181 of the dial plate 108, whereby the position of the thin part 175 as the penetration part is adjusted to cover the antenna 106. Then, pairing is performed. Furthermore, when pairing is not established, even with no user's operation of an operation button 3 or the like, the calendar moving section 178 may automatically operate to rotate the calendar display 107. In this case, the calendar display 107 is rotated in such a way that the radio wave shielding degree by the thick part 174 becomes gradually smaller, until the pairing is established, for example.

In the embodiment, when an instruction to select the data synchronization mode is inputted with an operation button 3 or the like, and the data synchronization mode is set as a communication mode, the motor 177 of the calendar moving section 178 operates to rotate the gears of the calendar-use gear train mechanism 176 successively, and the calendar drive gear 176a meshes with the rack 172 of the calendar display 107 to rotate. Consequently, the calendar display 107 rotates counterclockwise to a point where a calendar display part 171 (the number "1" in FIG. 27A) is displayed at the date window 181 of the dial plate 108 in a state in which a part of the calendar display part 171 is out of the date window 181. Consequently, about half the thin part 175 as the penetration part is overlapped to the antenna 106, and about half the antenna 106 is covered with the thick part 174 as the shielding part. Consequently, the radio wave shielding degree by the thick part 174 as the shielding part becomes medium, and the radio wave sensitivity of the antenna 106 becomes medium which is suitable for the data synchronization mode.

Accordingly, the antenna 106 of the watch 100 can transmit/receive radio waves to/from a terminal device G located a little away from the watch 100. For example, the watch 100 transmits/receives data to/from a mobile phone or the like which a user of the watch 100 wears, to synchronize its data with the data of the mobile phone or the like.

In the embodiment, when an instruction to select the terminal search mode/losing prevention mode is inputted with an operation button 3 or the like, and the terminal search mode/losing prevention mode is set as a communication mode, a normal display state in which a calendar display part 171 (the number "1" in FIG. 26A) is displayed at the date window 181 of the dial plate 108 is maintained.

In this state, the entire thin part 175 of the calendar display 107 is overlapped to the antenna 106. Consequently, the radio wave shielding degree by the thick part 174 as the shielding part becomes the lowest, and the radio wave sensitivity of the antenna 106 becomes the highest which is suitable for the terminal search mode/losing prevention mode.

Thus, for example, in the terminal search mode, a query signal is transmitted from the antenna 106 of the watch 100 to a terminal device G which already establishes pairing with the watch 100, and is located within a distance of about 5 m from the watch 100, the query signal which requires the terminal device G to answer. When the terminal device G receives the query signal, and transmits an answer signal to the watch 100, a user of the watch 100 is informed about that by a buzzer sound, flashing of a light or the like. In the losing prevention mode, a query signal is transmitted from the antenna 106 of the watch 100 to a terminal device G which already establishes pairing with the watch 100, the query signal which requires the terminal device G to answer. The terminal device G receives the query signal, and transmits an answer signal to the watch 100. When not receiving the answer signal from the terminal device G, the control section of the watch 100 judges that the terminal device G is a predetermined distance (in the embodiment, 5 m within which the antenna 106 can transmit/receive radio waves) or more away from the watch 100, and informs the user about that by a buzzer sound, flashing of a light or the like.

As described above, according to the fourth embodiment, a plurality of communication modes (the pairing mode, the data synchronization mode and the terminal search mode/losing prevention mode, for example) can be executed under different radio wave sensitivity of the antenna 106. Accordingly, various communications can be performed in accordance with a user's purpose or use of the watch 100. A watch is expected to be small and have a light weight (miniaturized). Hence, it is difficult to secure space to accommodate a large battery. However, the watch 100 in the embodiment includes the sensitivity adjustment device 170 constituted of the calendar display 107 and the calendar moving section 178, and has a mechanical configuration as a method of adjusting the radio wave sensitivity of the antenna 106 to be suitable for the communication modes. That is, the watch 100 adjusts the radio wave sensitivity of the antenna 106 by rotating the calendar display 107 so as to adjust the radio wave shielding degree by the thick part 174 as the shielding part. Consequently, as compared with a case where the radio wave sensitivity is changed in a communication-related module such as a reception circuit, the watch 100 can reduce the electric power consumption which is necessary for the adjustment of the radio wave sensitivity of the antenna 106.

Furthermore, by reducing the electric power consumption, the watch 100 does not need a large battery or the like. Accordingly, miniaturization of a device can be achieved.

Furthermore, the radio wave sensitivity of the antenna 106 can be adjusted by rotating the calendar display 107 which has the thick parts 174 as the shielding part and the thin parts 175 as the penetration part. Accordingly, the radio wave sensitivity of the antenna 106 can be adjusted to be suitable for the communication modes without adding a component to adjust the radio wave sensitivity thereof, and hence simplification of a configuration of a device and miniaturization of a device can be achieved.

Furthermore, in the embodiment, a plurality of pairs of the thick parts 174 as the shielding part to shield radio waves and the thin parts 175 disposed next to the thick parts 174 as the penetration part to allow penetration of radio waves is provided for the calendar display parts 171, respectively. Consequently, when the radio wave sensitivity of the antenna 106 is adjusted, it is enough to move the calendar display 107 for a distance corresponding to a half day in terms of the calendar display parts 171, and hence it is not necessary to rotate the calendar display 107 greatly. Accordingly, the radio wave sensitivity of the antenna 106 can be adjusted to desired radio wave sensitivity promptly.

Furthermore, in the embodiment, the thin parts 175 as the penetration part to allow penetration of radio waves are provided so as to respectively correspond to the positions of the calendar display parts 171, and when a calendar display part 171 for the current date is exposed through the date window 181 of the dial plate 108, the radio wave sensitivity of the antenna 106 is the best (highest). Accordingly, in a normal display state in which a date is displayed at the date window 181, a state in which the watch 100 can freely transmit/receive radio waves to/from an external terminal device G is maintained.

Furthermore, as described above, when a calendar display part 171 for the current date is exposed through the date window 181 of the dial plate 108, the radio wave sensitivity of the antenna 106 is the best, and the more the calendar display part 171 is out of the date window 181, the lower the radio wave sensitivity of the antenna 106 becomes. Accordingly, a user can easily and visually confirm the radio wave sensitivity of the antenna 106.

In the above, the fourth embodiment of the present invention is described. However, the present invention is not limited to the embodiment, and it is needless to say that the present invention can be modified variously without departing from the scope thereof.

For example, in the fourth embodiment, the calendar display 107 is constituted of a radio wave shielding material, such as a magnetic material or the like, and the calendar display 107 includes the thin parts 175 as the penetration part and the thick parts 174 as the shielding part. The thin parts 175 are formed by engraving the concave parts on the calendar display 107. Each of the thin parts 175 is almost in the shape of a trapezoid and thinner than the other parts in the radio wave passing direction. The thick parts 174 are the other parts which are thicker than the thin parts 175. However, the shapes or the like of the thick parts 174 as the shielding part and the thin parts 175 as the penetration part are not limited thereto.

Figure 29:
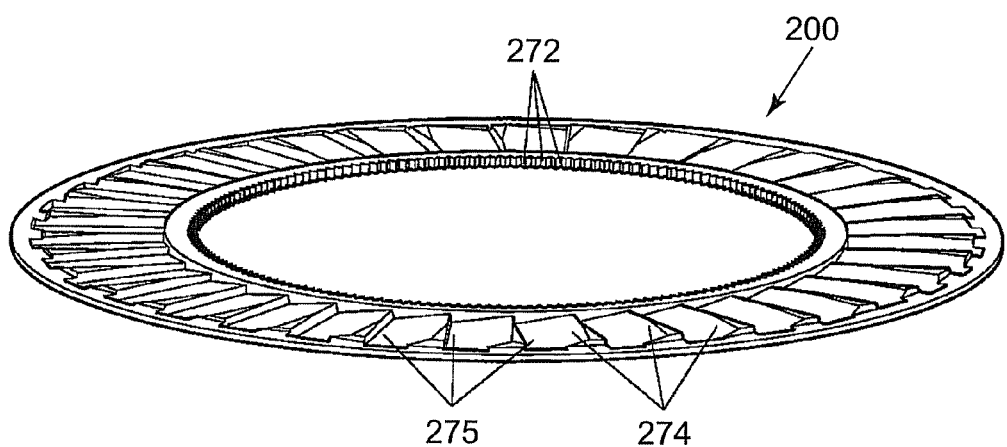
FIG. 29 is a perspective view showing a modified calendar display.
Figure 30:
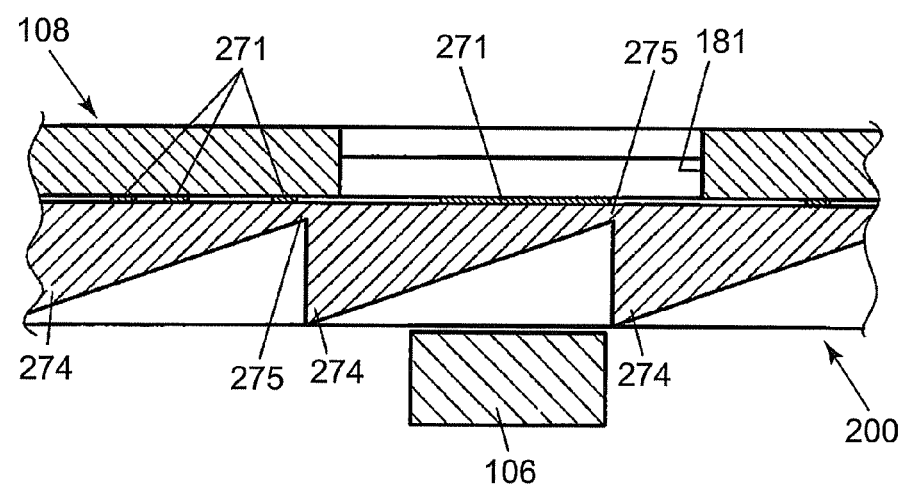
FIG. 30 is a sectional view of FIG. 29, and shows a positional relationship between the calendar display and an antenna in a state in which the radio wave sensitivity of the antenna is the highest.

For example, as shown in FIGS. 29 and 30, it is possible that on the back side of a calendar display 200 including a rack 272 disposed to be along the inner circumferential face of the calendar display 200, a plurality of inclination parts is disposed to correspond to calendar display parts 271, respectively, so as to be almost in the shape of a saw in a sectional view, and a point of each inclination part corresponding to near the center of its corresponding calendar display part 271 is the thinnest. In this case, a point of each inclination part, the point which is dug the deepest (namely, the point which is the thinnest in the radio wave passing direction) is a thin part 275 as the penetration part, and the peak of each inclination part (namely, the peak of each tooth of a saw) is a thick part 274 as the shielding part.

In this case too, when the entire calendar display part 271 is exposed through the date window 181 of the dial plate 108 so as to be displayed thereat, the upper side of the antenna 106 is covered with the thin part 275. Hence, the radio wave sensitivity of the antenna 106 becomes the best (highest). The more the calendar display part 271 is out of the date window 181, the more the upper side of the antenna 106 is covered with the thick part 274, and accordingly, the lower the radio wave sensitivity of the antenna 106 becomes gradually.

In the case where a plurality of inclination parts is disposed on the back side of a calendar display, the shape thereof in a sectional view is not limited to the shape of a saw shown in FIGS. 29 and 30. That is, it is not necessary that an angle of inclination at one side of the thin part 275 is more acute than that at the other side of the thin part 275.

Figure 31:
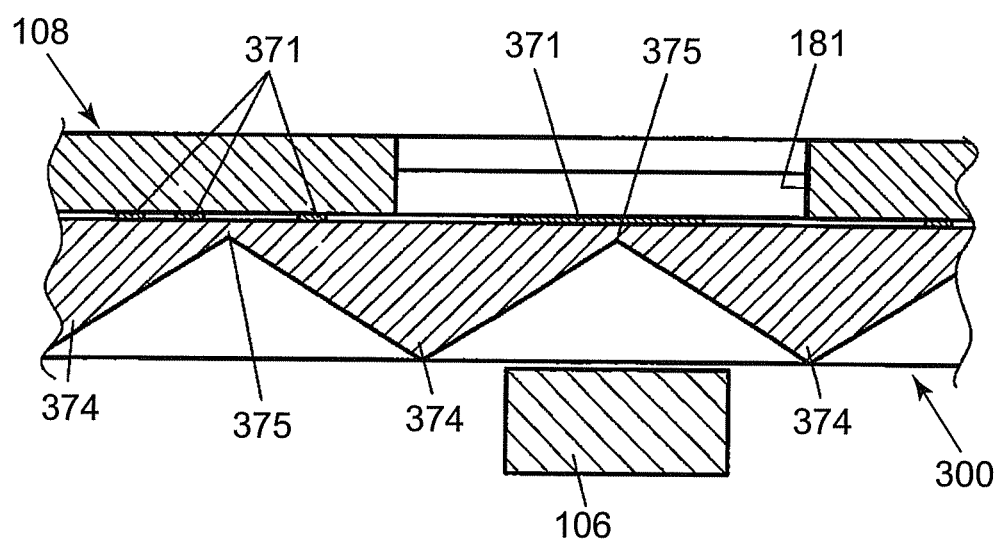
FIG. 31 is a sectional view of another modified calendar display, and shows a positional relationship between the calendar display and an antenna in a state in which the radio wave sensitivity of the antenna is the highest.

For example, as shown in FIG. 31, it is possible that on the back side of a calendar display 300, a plurality of inclination parts is disposed to correspond to calendar display parts 371, respectively, so as to be in the shape of a mountain chain in a sectional view, and a point of each inclination part corresponding to almost the center of its corresponding calendar display part 371 is the thinnest, and a point thereof corresponding to the middle between the calendar display part 371 and its adjacent calendar display part 371 is the thickest.

In this case, the point of each inclination part, the point which corresponds to almost the center of its corresponding calendar display part 371 (namely, the point which is the thinnest in the radio wave passing direction) is a thin part 375 as the penetration part, and the point of each inclination part, the point which corresponds to the middle between the calendar display part 371 and its adjacent calendar display part 371, is a thick part 374 as the shielding part.

In this case too, when the entire calendar display part 371 is exposed through the date window 181 of the dial plate 108, the upper side of the antenna 106 is covered with the thin part 375. Hence, the radio wave sensitivity of the antenna 106 becomes the best. The more the calendar display part 371 is out of the date window 181, the more the upper side of the antenna 106 is covered with the thick part 374, and accordingly, the lower the radio wave sensitivity of the antenna 106 becomes gradually.

In the case where the inclination parts shown in FIGS. 29 to 31 are provided, steps may be formed on the inclined plane of each inclination part so as to be in the shape of a staircase.

When the inclination parts shown in FIGS. 29 to 31 are provided, and the points thereof which are the thinnest in the radio wave passing direction are the thin parts as the penetration part, the radio wave sensitivity of the antenna 106 can be changed further gradually and smoothly.

Furthermore, in the embodiment, the calendar display 107 itself is constituted of a radio wave shielding material such as a magnetic material or the like, the thin parts which are the thinnest in the radio wave passing direction are the penetration part, and the thick parts which are parts other than the thin parts are the shielding part. However, the configuration of the calendar display 107 to shield radio waves is not limited thereto.

For example, it is possible that a calendar display itself is made of a material which allows penetration of radio waves such as a resin, and a material which shield radio waves such as a magnetic sheet made of a magnetic material is attached to parts of the calendar display, the parts which are other than parts corresponding to calendar display parts.

In this case, the parts to which the radio wave shielding material is attached are the shielding part to shield radio waves, and the parts to which the radio wave shielding material is not attached are the penetration part to allow penetration of radio waves.

Furthermore, in the embodiment, the radio wave shield 142, disposed around the antenna 106, and the calendar display 107 are made of magnetic materials to absorb radio waves by magnetic loss, thereby shielding the radio waves. However, as long as the radio wave shield 142 and the calendar display 107 shield radio waves, the configurations thereof are not limited to those which absorb radio waves by the magnetic loss.

Furthermore, in the embodiment, a pair of the shielding part (thick part 174) to shield radio waves and the penetration part (thin part 175) disposed next to the shield part to allow penetration of radio waves is provided for each calendar display part 171. That is, a plurality of pairs (namely, 31 pairs) thereof is provided. However, the pair of the shielding part and the penetration part is not necessary to be provided for each of all the calendar display parts 171. For example, it is possible that the penetration parts are provided for calendar display parts of "5", "10", "15", "20", "25" and "30", and the shielding parts are between the penetration parts. In this case, when a calendar display part displayed at the date window 181 is "5", "10", "15", "20", "25" or "30", the radio wave sensitivity of the antenna 106 is the best, and the more the calendar display part 171 of these numbers is out of the date window 181, the lower the radio wave sensitivity of the antenna 106 gradually becomes.

Furthermore, in the embodiment, the calendar display 107 is a date wheel having the numbers "1" to "31" for date display as the calendar display parts 171. However, the calendar display 107 is not limited to a date wheel.

For example, the calendar display 107 may be a calendar display having, as the calendar display parts, day display parts of "Sunday" to "Monday" for days-of-a-week display. In this case, seven pairs of the shielding parts (the thick parts, for example) and the penetration parts (the thin parts, for example) are provided for the calendar display parts.

Furthermore, in the embodiment, the calendar display 107 is formed to be ring-shaped so as to be along the rim of the module 104, and the center thereof almost matches the shaft 110 of the watch 100. However, the shape and size of the calendar display 107 are not limited thereto. For example, a calendar display may be ring-shaped, and have a small diameter which is about ¼ of the diameter of the module 104. In this case, the center of the calendar display is not needed to match the shaft 110 of the watch 100. In this case too, the calendar display is disposed to cover the upper side of the antenna 106.

Furthermore, in the embodiment, the calendar moving section 178 which rotates the calendar display 107 is constituted of the calendar-use gear train mechanism 176 and the motor 177. However, the configuration of the calendar moving section 178 is not limited thereto.

For example, in the case of a watch having a watch stem, it is possible that a drive conveyance mechanism (gear mechanism or the like) which conveys rotation of the watch stem or the like to the calendar display is provided, and the watch stem and the drive conveyance mechanism (gear mechanism or the like) constitute the calendar moving section.

In this case, in order to adjust the radio wave sensitivity of the antenna 106, for example, a user rotates the watch stem or the like, thereby manually rotating and moving the calendar display to a point where desired radio wave sensitivity of the antenna 106 can be obtained.

Furthermore, in the embodiment, the radio wave sensitivity of the antenna 106 is adjusted to three levels of the pairing mode, the data synchronization mode and the terminal search mode/losing prevention mode. However, the number of levels to which the radio wave sensitivity of the antenna 106 is adjusted is not limited to three.

For example, it is possible that when communications are made in the pairing mode, the shielding part is positioned over the antenna 106, and when communications are made in the data synchronization mode or the terminal search mode/losing prevention mode, the penetration part is positioned over the antenna 106. That is, the radio wave sensitivity may be adjusted to two levels.

Furthermore, for example, by gradually adjusting the positional relationship between the shielding part and the antenna 106, the radio wave sensitivity of the antenna 106 may be adjusted to four levels or more. In this case, when communications are made in the pairing mode, but pairing is not established in a state in which the entire antenna 106 is covered, a user thereof can gradually increase the radio wave sensitivity of the antenna 106 until pairing is established.

Furthermore, in the embodiment, the main body case 1 is made of a material which allows penetration of radio waves, such as a resin. However, the material of the main body case 1 is not limited thereto. For example, the main body case 1 may be made of a metal material such as stainless steel or titanium.

In this case, radio waves cannot enter the antenna 106 either from the back side of the watch 100, the back side on which the back-side cover 5 is disposed, or from the lateral face thereof. Hence, radio waves can enter the antenna 106 only from the front side (upper side in FIG. 22) thereof. Therefore, in this case, it is not necessary to dispose the radio wave shield 142 around the antenna 106.

Furthermore, in the embodiment, the back-side cover 5 is made of a metal material such as stainless steel or titanium. However, the material of the back-side cover 5 is not limited thereto. For example, the back-side cover 5 may be made of a material which allows penetration of radio waves, such as a resin.

In this case, radio waves enter the antenna 106 from the back side of the watch 100 too, the back side on which the back-side cover 5 is disposed. Therefore, it is preferable to dispose radio wave shields not only around the antenna 106 but also under the antenna 106 (namely, the back side of the watch 100).

Furthermore, in the embodiment, the watch 100 is an analog watch having the hands 11. However, the watch 100 is not limited thereto. For example, the watch 100 may be a watch in which a liquid crystal display section constituted of a liquid crystal panel or the like is disposed on a part of an analog dial plate so as to have both hands and the liquid crystal display section.

[Fifth Embodiment]

Figure 32:
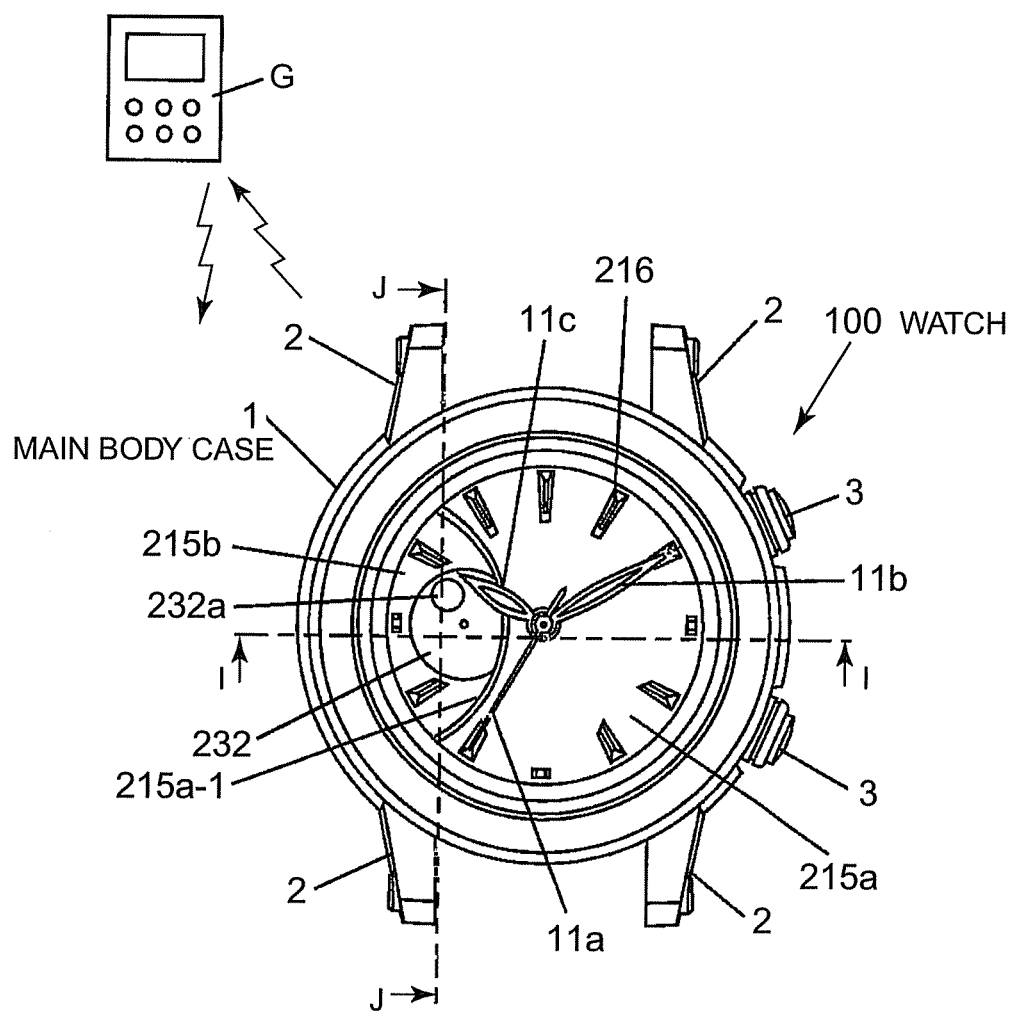
FIG. 32 is a front view of a watch main body of a watch according to a fifth embodiment of the present invention.
Figure 33:
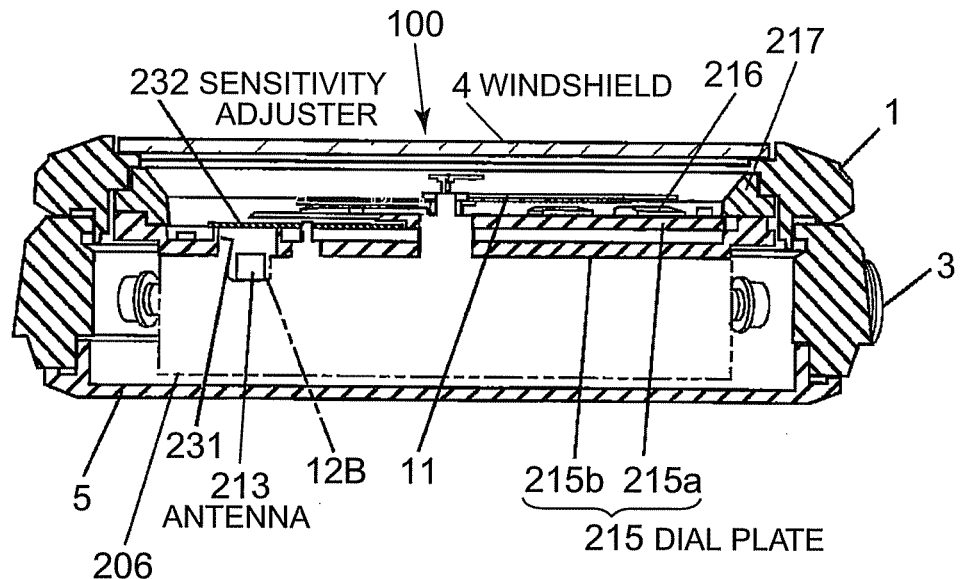
FIG. 33 is a sectional view of the watch taken along the line I-I of FIG. 32.
Figure 34:
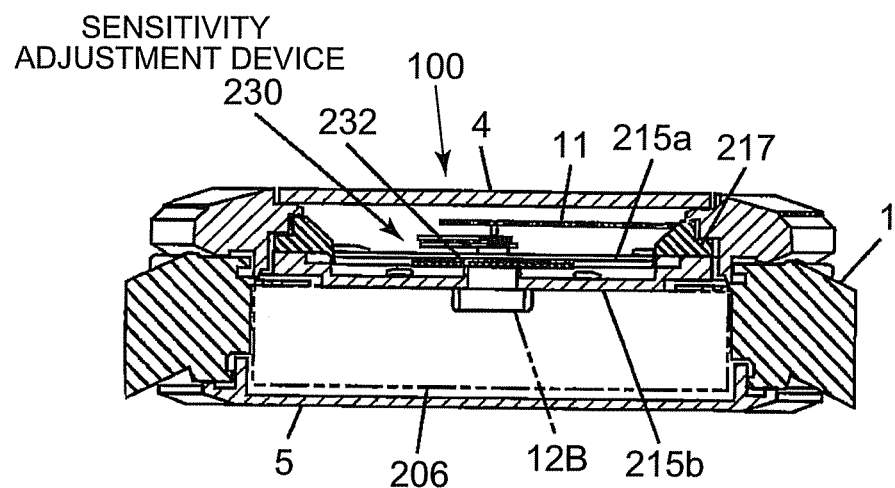
FIG. 34 is a sectional view of the watch taken along the line J-J of FIG. 32.

FIG. 32 is a front view of a watch main body of a watch in a fifth embodiment of the present invention. FIG. 33 is a sectional view taken along the line I-I of FIG. 32. FIG. 34 is a sectional view taken along the line J-J of FIG. 32.

The same components as those in the first to fourth embodiments are denoted by the same reference numerals, and the description thereof is omitted when available.

In the main body case 1 in the embodiment, as shown in FIG. 34, the housing 206 made of a resin or the like is disposed. In the housing 206, the timepiece movement (not shown), the circuit substrate 12B having various electronic components thereon, and the like are installed. The timepiece movement moves the hands 11 of the second hand 11a, the minute hand 11b and the hour hand 11c. A chip antenna 213 is installed in the circuit substrate 12B which functions as an antenna supporter. It is not necessary that the antenna supporter is a circuit substrate.

In the main body case 1, a dial plate 215 is disposed between the housing 206 and the windshield 4. The dial plate 215 includes an upper dial plate 215a and a lower dial plate 215b. The nine o'clock part of the upper dial plate 215a is cut out. A cut-out edge 215a-1 formed by the cut-out is in the shape of a circular arc as if the cut-out edge 215a-1 swells toward the center of the upper dial plate 215a. The lower dial plate 215b is exposed from the cut-out edge 215a-1. Time-indicating characters 216 are disposed at 12 points on the front side of the dial plate 215 in the circumferential direction at almost regular intervals.

Between the windshield 4 and the dial plate 215, a partition 217 is disposed to be along the rim of the dial plate 215.

Next, the circuit configuration in the watch 100 is described.

Figure 35:
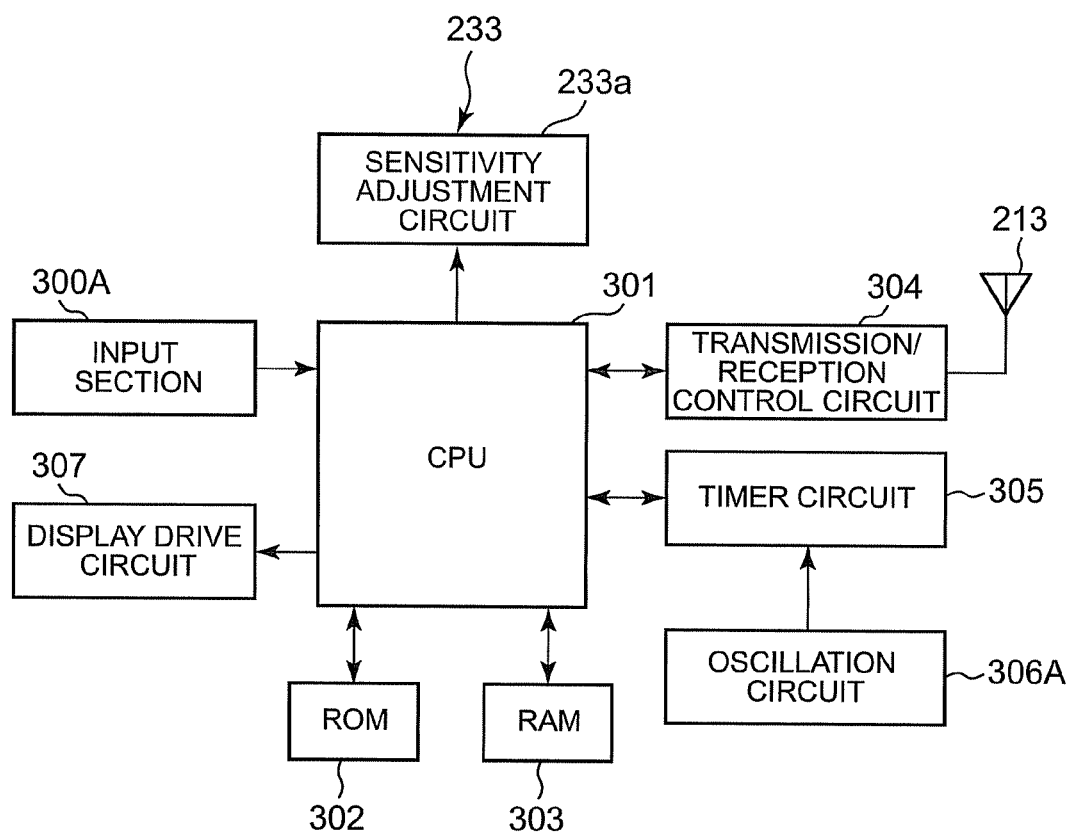
FIG. 35 is a block diagram showing a circuit configuration in the watch shown in FIG. 32.

As shown in FIG. 35, the watch 100 includes an input section 300A constituted of a switch which is operated by the operation buttons 3 or the like, a CPU (Central Processing Unit) 301, a ROM (Read Only Memory) 302, a RAM (Random Access memory) 303, a transmission/reception control circuit 304, a timer circuit 305, an oscillation circuit 306A, a display drive circuit 307 to drive a motor (not shown) which operates the hands 11, and an antenna 213.

The watch 100 is provided with a sensitivity adjustment device 230.

Figure 36:
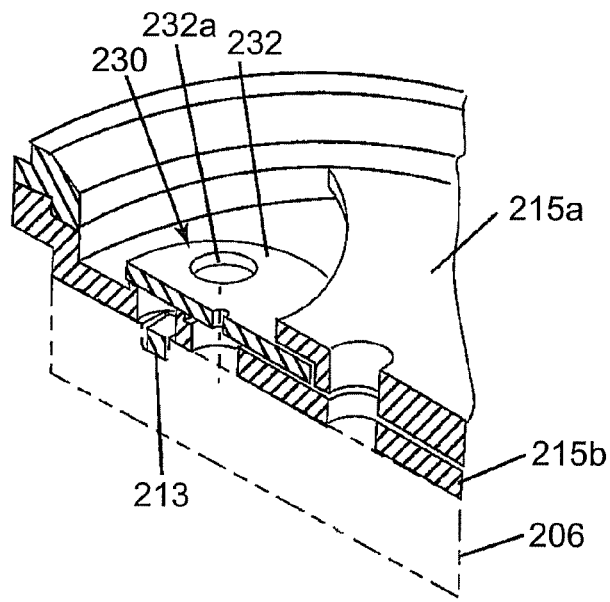
FIG. 36 is a perspective view showing a sensitivity adjuster of the watch and the vicinity thereof shown in FIG. 32.
Figure 37:
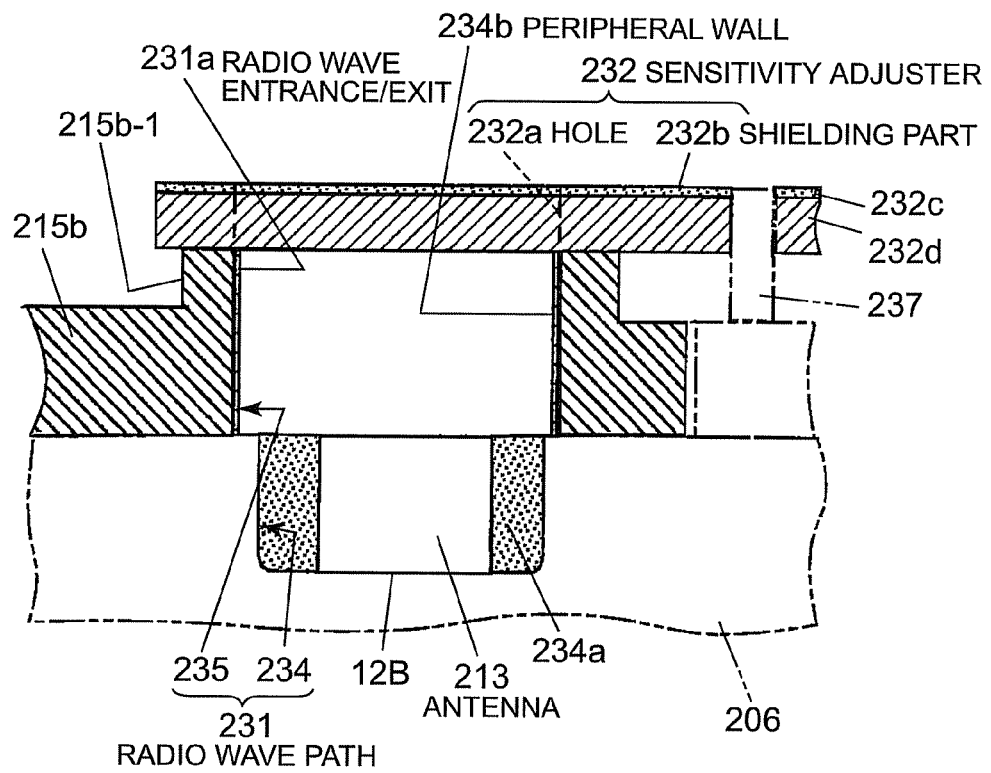
FIG. 37 is a sectional view showing the sensitivity adjuster of the watch and the vicinity thereof shown in FIG. 32.

As shown in FIGS. 36 and 37, the sensitivity adjustment device 230 includes a radio wave path 231 which limits the radio wave transmission/reception direction, a sensitivity adjuster 232 which changes the extent of covering a radio wave entrance/exit 231a of the radio wave path 231 and the antenna 213 by extension, and a adjuster moving section 233 which operates the sensitivity adjuster 232.

The radio wave path 231 includes a concave part 234 having the peripheral wall 234a constituted of a radio wave shielding material, and a hole part 235 having the peripheral wall 234b constituted of a radio wave shielding material and passing through the lower dial plate 215b. The radio wave shielding materials of the peripheral walls 234a and 234b are, for example, magnetic sheets.

The concave part 234 is located under the cut-out edge 215a-1 of the upper dial plate 215a. The bottom of the concave part 234 is constituted of the circuit substrate 12B, and the antenna 213 is installed on the circuit substrate 12B.

The hole part 235 is located over the concave part 234. An opening at the upper end of the hole part 235 is made in the top face of a rib 215b-1 which is formed to stand up on the upper side of the lower dial plate 215b. At a position where the hole part 235 is located, the lower dial plate 215b contacts with the housing 206. Consequently, the hole part 235 communicates with the concave part 234.

The sensitivity adjuster 232 is formed by attaching a magnetic sheet 232c to a base material 232d, for example. The sensitivity adjuster 232 itself may be made of a material including magnetic powder.

The sensitivity adjuster 232 is disposed on the lower dial plate 215b. The sensitivity adjuster 232 is formed to be disc-shaped. The diameter of the sensitivity adjuster 232 is more than twice as large as the diameter of the radio wave entrance/exit 231a. The sensitivity adjuster 232 is fixed to and supported by a rotation shaft 237 in such a way as to cover the radio wave entrance/exit 231a with a part of the sensitivity adjuster 232, the part which is not the center thereof. The rotation shaft 237 passes through the lower dial plate 215b, extends into the housing 206, and is connected to the adjuster moving section 233.

At a position which is not the center of the sensitivity adjuster 232, a hole 232a is made. The diameter of the hole 232a is equal to the diameter of the radio wave entrance/exit 231a or more.

The hole 232a constitutes the penetration part to expose the radio wave entrance/exit 231a and the antenna 213 by extension, and the other part of the sensitivity adjuster 232 constitutes the shielding part 232b to cover the radio wave entrance/exit 231a and the antenna 213 by extension. The hole 232a of the sensitivity adjuster 232 can be positioned to be completely overlapped to the radio wave entrance/exit 231a, to be partially overlapped to the radio wave entrance/exit 231a, and not to be overlapped to the radio wave entrance/exit 213a at all, depending on a point to which the sensitivity adjuster is rotated (rotation angle of the sensitivity adjuster 232).

Figure 38:
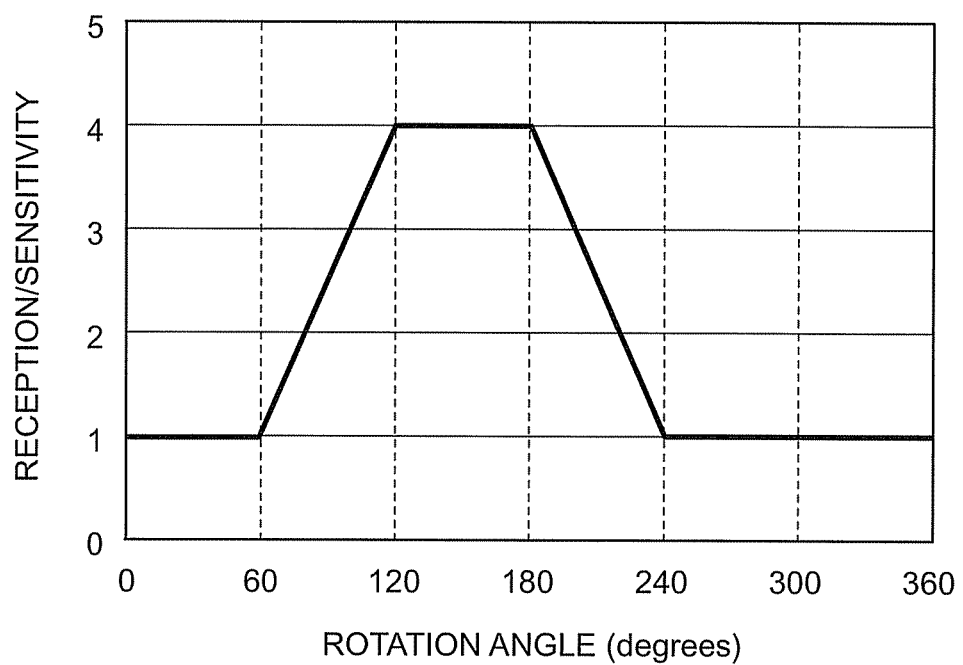
FIG. 38 is a graph showing an example of a relationship between the rotation angle and the reception/sensitivity of the sensitivity adjuster shown in FIG. 32.

FIG. 38 is a graph showing an example of a relationship between the rotation angle of the sensitivity adjuster 232 and the sensitivity (reception) of the antenna 213.

As shown in FIG. 38, when the sensitivity adjuster 232 rotates, the sensitivity of the antenna 213 varies in accordance with the rotation angle of the sensitivity adjuster 232.

It is preferable that the diameter of the hole 232a be larger than the diameter of the radio wave entrance/exit 231a, and smaller than the diameter of the rib 215a-1. Consequently, even when the hole 232a of the sensitivity adjuster 232 is positioned to be completely overlapped to the radio wave entrance/exit 231a, because the edge of the hole 232a of the sensitivity adjuster 232 contacts with the top face of the rib 215b-1, it can be prevented that the rib 215b-1 is fitted into the hole 232a. This is especially effective when the sensitivity adjuster 232 is made of a material having flexibility.

The adjuster moving section 233 is a group of components and mechanisms to rotate the sensitivity adjuster 232. In the embodiment, the adjuster moving section 233 is constituted of a sensitivity adjustment circuit 233a controlled by the CPU 301 which executes an adjuster moving program, a motor (not shown) driven by the sensitivity adjustment circuit 233a, and a power conveyance mechanism (not shown) which conveys motor power to the rotation shaft 237. The adjuster moving section 233 may mechanically rotate the sensitivity adjuster 232 by rotation of a watch stem.

Although not particularly being limited, the adjuster moving section 233 can place the sensitivity adjuster 232 at three points.

Figure 39A:
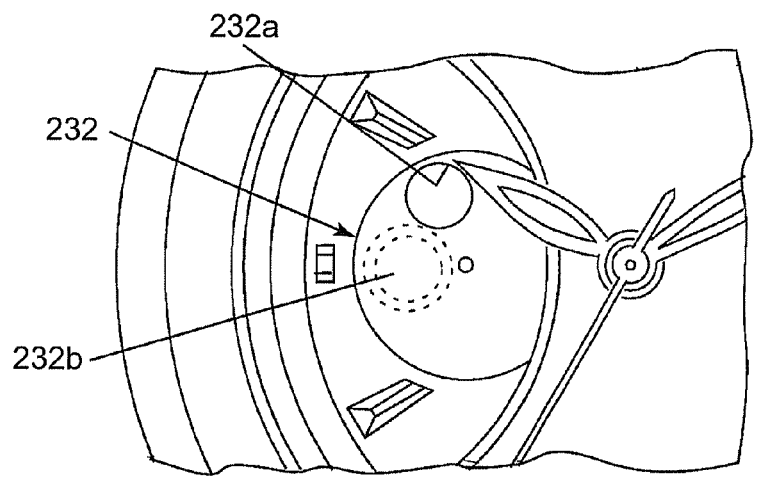
FIG. 39A shows the main part of the watch in a state in which a radio wave entrance/exit is completely covered with the sensitivity adjuster.
Figure 39B:
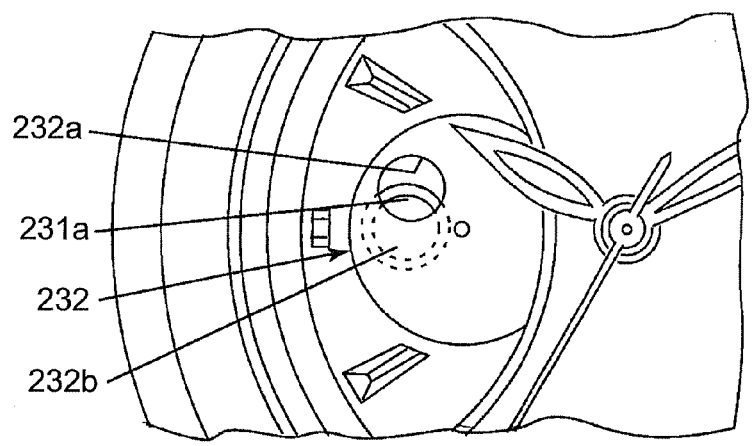
FIG. 39B shows the main part of the watch in a state in which the radio wave entrance/exit is partially covered with the sensitivity adjuster.
Figure 39C:
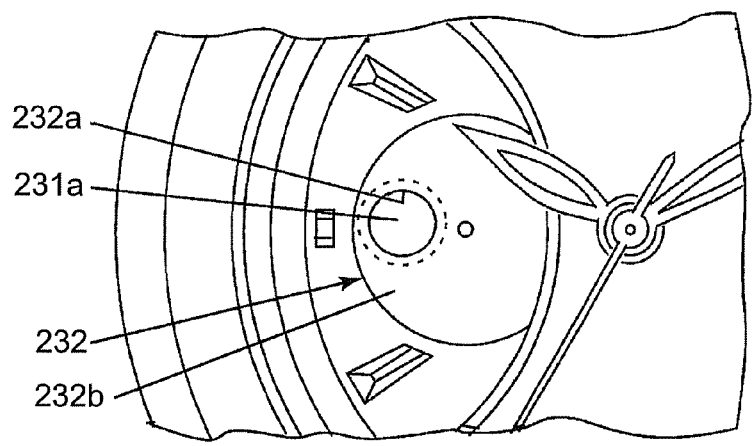
FIG. 39C shows the main part of the watch in a state in which the radio wave entrance/exit is completely open with the sensitivity adjuster.
Figure 40A:
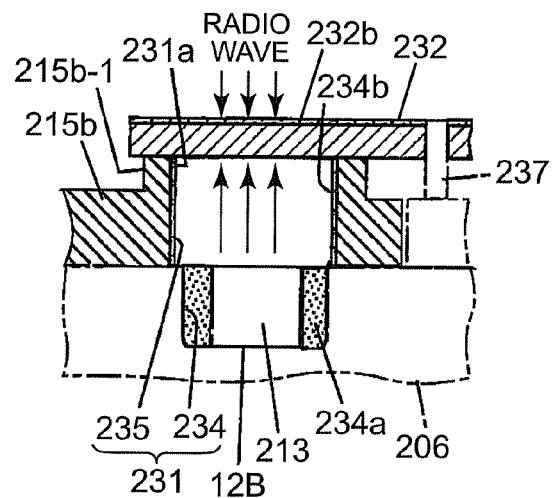
FIG. 40A is a main-part sectional view showing a radio wave shielding degree by the sensitivity adjuster shown in FIG. 39A.
Figure 40B:
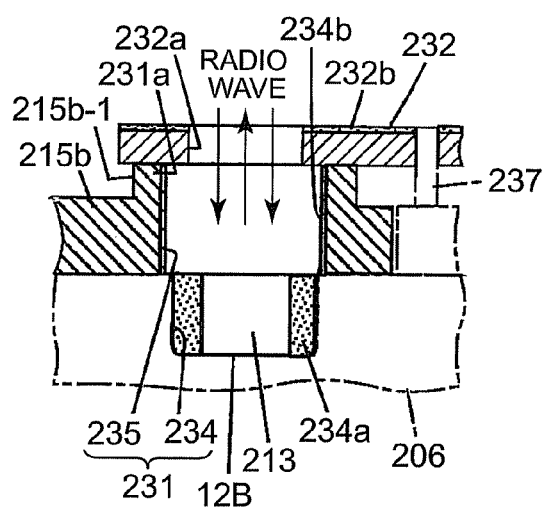
FIG. 40B is a main-part sectional view showing the radio wave shielding degree by the sensitivity adjuster shown in FIG. 39B.
Figure 40C:
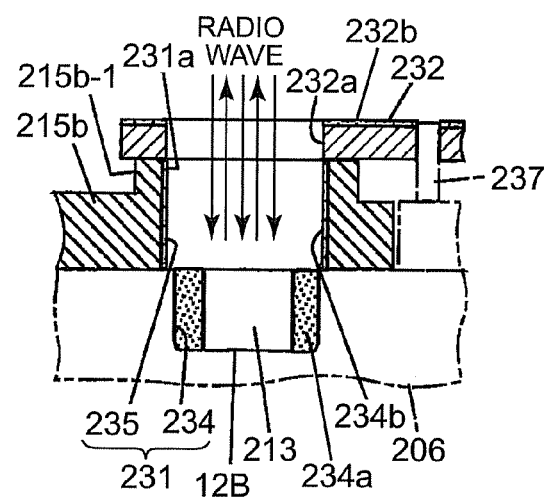
FIG. 40C is a main-part sectional view showing the radio wave shielding degree by the sensitivity adjuster shown in FIG. 39C.

That is, the adjuster moving section 232 rotates the sensitivity adjuster 232, thereby, for example, changing the extent that the radio wave entrance/exit 231a of the radio wave path 231 is covered with the sensitivity adjuster 232 between three levels. More specifically, the adjuster moving section 233 can select one of the three points to place the sensitivity adjuster 232. The three points are a point where the hole 232a is not overlapped to the radio wave entrance/exit 231a at all and the radio wave entrance/exit 231a is completely covered with the shielding part 232b (shown in FIGS. 39B and 40B), a point where the hole 232a is partially overlapped to the radio wave entrance/exit 231a and the radio wave entrance/exit 231a is partially covered with the shielding part 232b (shown in FIGS. 39A and 40A), and a point where the hole 232a is completely overlapped to the radio wave entrance/exit 231a so as to expose the radio wave entrance/exit 231a through the hole 232a completely (shown in FIGS. 39C and 40C).

In the embodiment, the extent that the radio wave entrance/exit 231a and the antenna 213 by extension are covered with the sensitivity adjuster 232 is changed between three levels. However, this is not a limit. For example, the extent that the radio wave entrance/exit 231a is covered with the sensitivity adjuster 232 may be changed gradually as if there is no limit to the number of the levels. Alternatively, the extant may be changed between two levels. That is, the adjuster moving section 233 may select one of two points to place the sensitivity adjuster 232. The two points are a point where the radio wave entrance/exit 231a is completely covered with the shielding part 232b (shown in FIGS. 39A and 40A) and a point where the radio wave entrance/exit 231a is completely exposed through the hole 232a (shown in FIGS. 39C and 40C).

Next, a radio wave sensitivity adjustment method in the watch 100 is described.

For example, when a user wearing the watch 100 would like to make the watch 100 communicate with an eternal device G which is located very close to the watch 100, the user operates a button, so that the sensitivity adjuster 232 operates to completely cover the radio wave entrance/exit 231a. Although the radio wave entrance/exit 231a is completely covered with the sensitivity adjuster 232, because the radio wave shielding material of the sensitivity adjuster 232 is a magnetic sheet or the like, the watch 100 can communicate with the external device G which is located very close to the watch 100.

Furthermore, when a user wearing the watch 100 would like to make the watch 100 communicate with an eternal device G which is located in a same room, the user operates a button, so that the sensitivity adjuster 232 operates to partially cover the radio wave entrance/exit 231a.

Furthermore, when a user wearing the watch 100 would like to make the watch 100 communicate with an eternal device G which is located several tens meters away from the watch 100, the user operates a button, so that the sensitivity adjuster 232 operates to completely match the hole 232a of the sensitivity adjuster 232 with the radio wave entrance/exit 231a.

The sensitivity adjustment device 230 and the watch 100 can obtain the following effects.

That is, according to the sensitivity adjustment device 230 and the watch 100, the radio wave sensitivity can be adjusted by making the sensitivity adjuster 232 operate to change the extent that the radio wave entrance/exit 231a is covered with the sensitivity adjuster 232. Thus, because the radio wave sensitivity can be adjusted by only making the sensitivity adjuster 232 operate, the configuration is simple, and the electric power consumption for communications can be reduced.

Furthermore, according to the sensitivity adjustment device 230 and the watch 100, because the radio wave transmission/reception direction is limited by the radio wave path 231 having the peripheral wall constituted of a radio wave shielding material, the accuracy of control of the radio wave sensitivity can be increased.

Furthermore, according to the watch 100, because the movement of the sensitivity adjuster 232 can be visually confirmed through the windshield 4 from the front side of the watch 100, it is easy to confirm the radio wave sensitivity.

[Sixth Embodiment]

Figure 41:
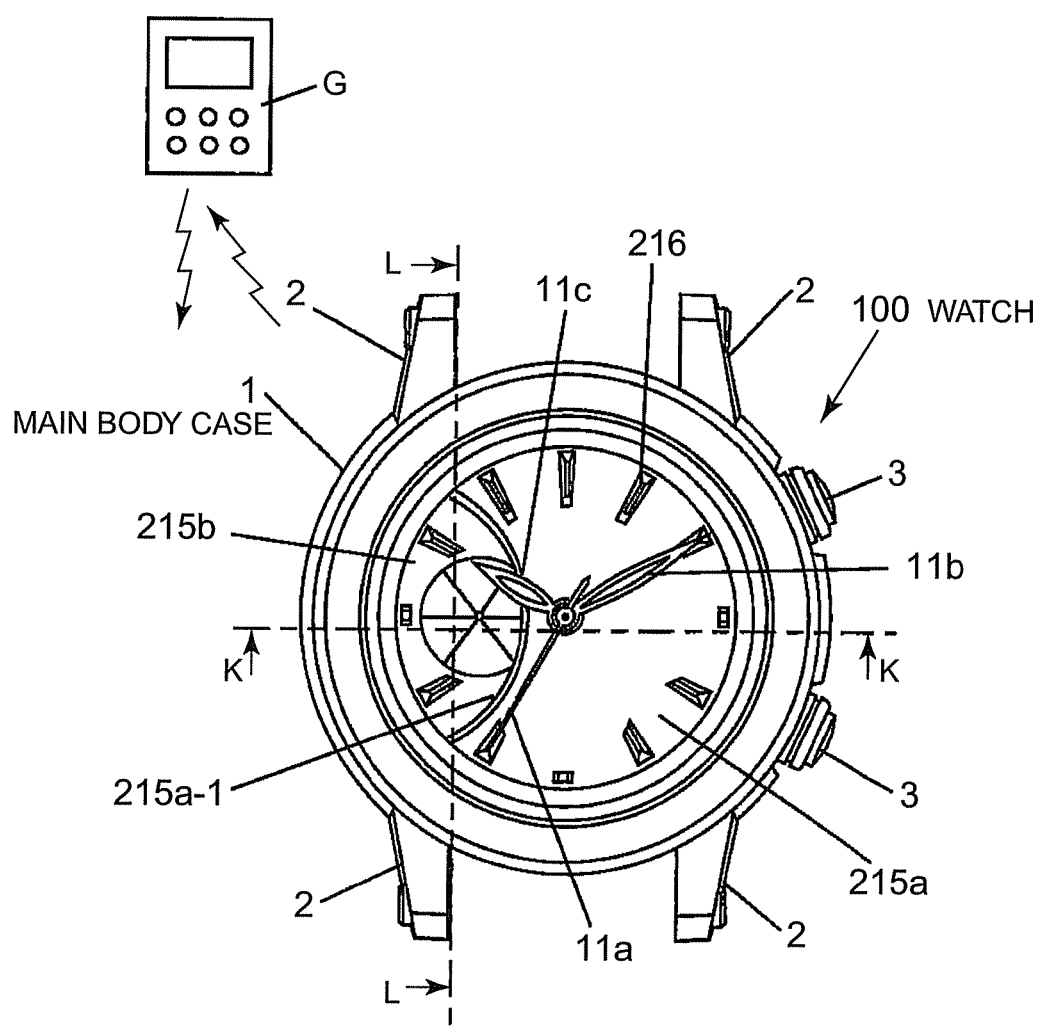
FIG. 41 is a front view of a watch main body of a watch to which a wireless communication device according to a sixth embodiment of the present invention is applied.
Figure 42:
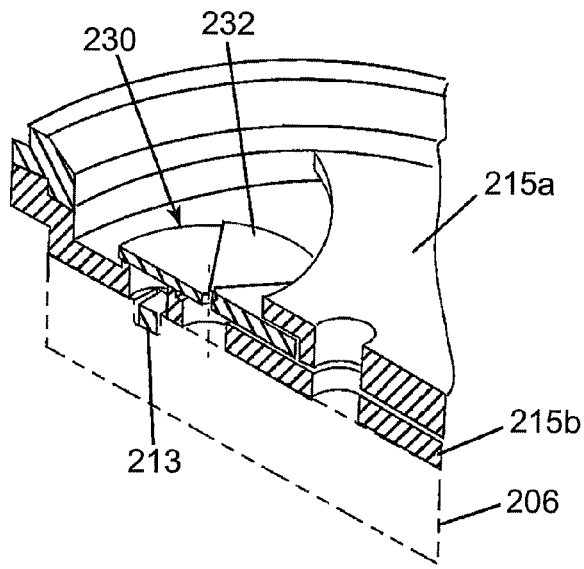
FIG. 42 is a perspective view showing a sensitivity adjuster of the watch and the vicinity thereof shown in FIG. 41.
Figure 43:
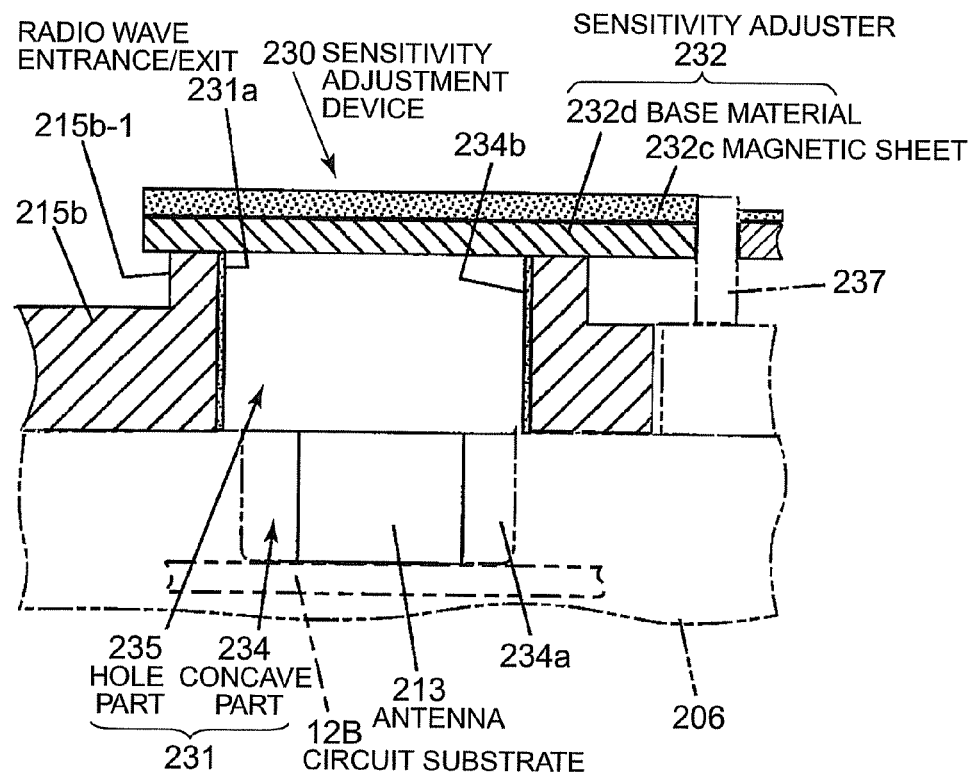
FIG. 43 is a sectional view showing the sensitivity adjuster of the watch and the vicinity thereof shown in FIG. 41.

FIG. 41 is a front view of a watch main body of a watch in a sixth embodiment of the present invention.

The sectional views taken along the line K-K and the line L-L of FIG. 41 are the same as those shown in FIGS. 33 and 34, respectively, and hence the figures thereof are omitted. In addition, the same components as those in the fifth embodiment are denoted by the same reference numerals, and the description thereof is omitted when available.

The sensitivity adjuster 232 in the sixth embodiment is formed by attaching a magnetic sheet 232c made of a material which has low radio wave penetrating property to a base material 232d made of a material which has high radio wave penetrating property such as a synthetic resin.

The sensitivity adjuster 232 is configured in such a way that the radio wave shielding degree by the shielding part can be changed between six levels in the circumferential direction. The configuration can be obtained by changing the number of magnetic sheets to be piled up or by changing the thickness in the vertical direction of a magnetic sheet in the circumferential direction. The sensitivity adjuster 232 changes the sensitivity (radio wave sensitivity) of the antenna 213 in accordance with a point to which the sensitivity adjuster 232 is rotated (rotation angle).

Figure 44:
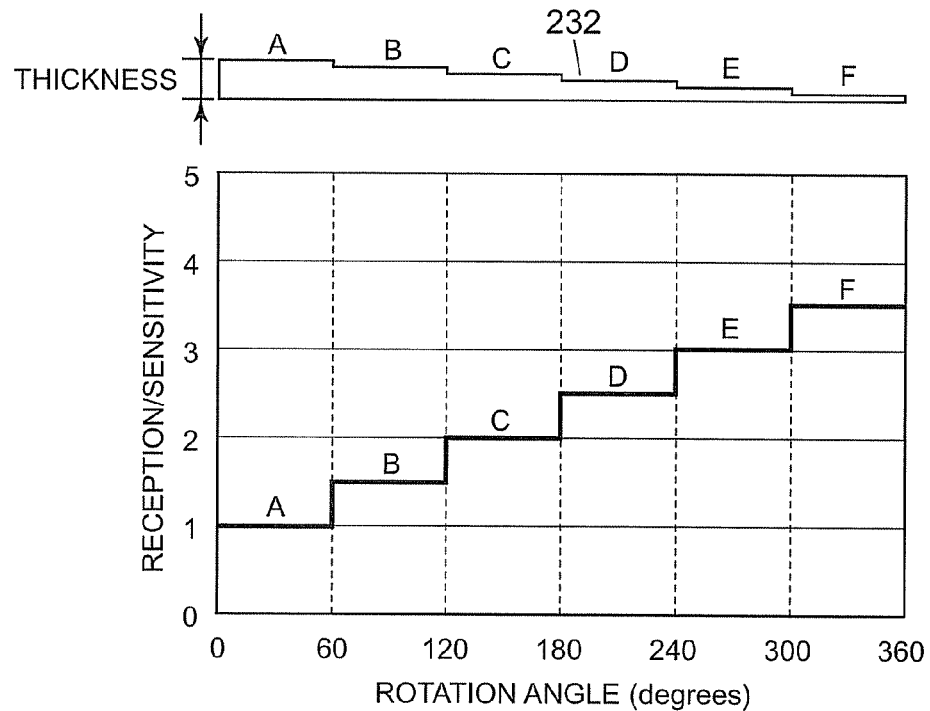
FIG. 44 is a graph showing an example of a relationship between the rotation angle and the reception/sensitivity of the sensitivity adjuster of the watch shown in FIG. 41 in the circumferential direction.

FIG. 44 is a graph showing an example of a relationship between the rotation angle of the sensitivity adjuster 232 and the sensitivity (reception) of the antenna 213. The "A", "B", "C", "D", "E" and "F" put on the sensitivity adjuster 232 represent shielding regions having different radio wave shielding degrees. The degree becomes lower in the order named. The upper part of FIG. 44 shows change of the thickness of the circumference of the sensitivity adjuster 232.

Thus, according to the sensitivity adjuster 232, the sensitivity of the antenna 213 can be changed between six levels by selectively using the shielding regions A, B, C, D, E or F to cover the antenna 213. The sensitivity of the antenna 213 can be changed between more levels by using two shielding regions which are next to each other together, too. Alternatively, the sensitivity of the antenna 213 can be changed between two levels (for example, ON and OFF) by using two of the shielding regions A, B, C, D, E and F.

Figure 45:
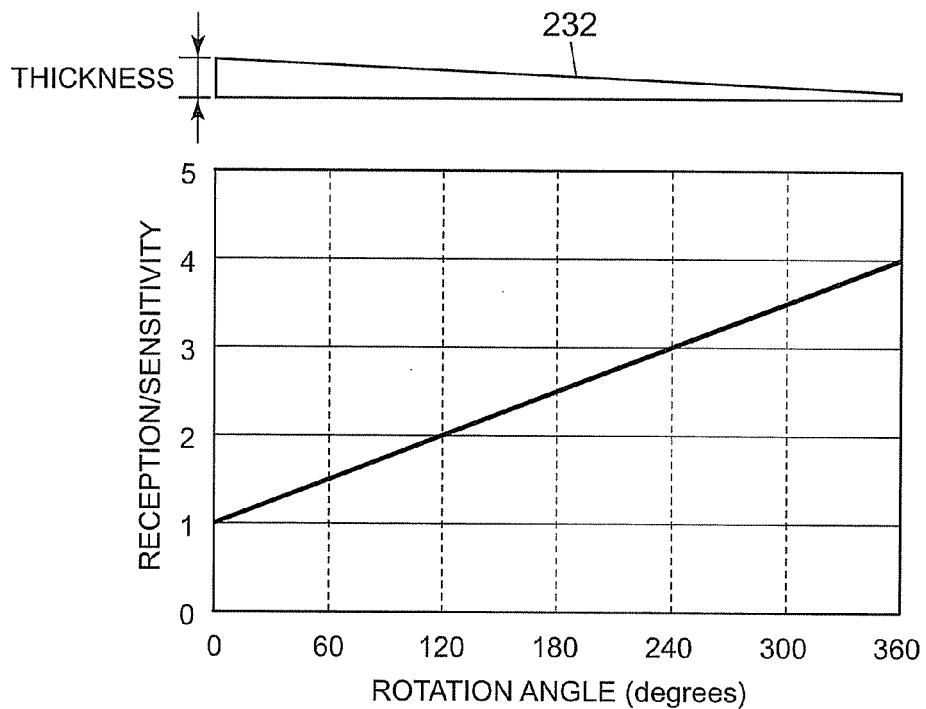
FIG. 45 is a graph showing another example of a relationship between the rotation angle and the reception/sensitivity of a sensitivity adjuster of the watch in the circumferential direction.

As shown in FIG. 45, the sensitivity adjuster 232 may be configured in such a way that the radio wave shielding degree varies continuously (namely, no stepwise) in the circumferential direction. The upper part of FIG. 45 shows change of the thickness of the circumference of the sensitivity adjuster 232. In this case, the sensitivity of the antenna 213 can be changed gradually as if there is no limit to the number of the levels.

The adjuster moving section 233 is a group of components and mechanisms to rotate the sensitivity adjuster 232. In the embodiment, the adjuster moving section 233 is constituted of the sensitivity adjustment circuit 233a controlled by the CPU 301 which executes the adjuster moving program, the motor (not shown) driven by the sensitivity adjustment circuit 233a, and the power conveyance mechanism (not shown) which conveys motor power to the rotation shaft 237. The adjuster moving section 233 may mechanically rotate the sensitivity adjuster 232 by rotation of a watch stem.

The adjuster moving section 233 rotates the sensitivity adjuster 232.

Next, a radio wave sensitivity adjustment method in the watch 100 is described. In the embodiment, a case where the sensitivity is changed between three levels by using the sensitivity adjuster 232 shown in FIG. 44 is described.

Figure 46A:
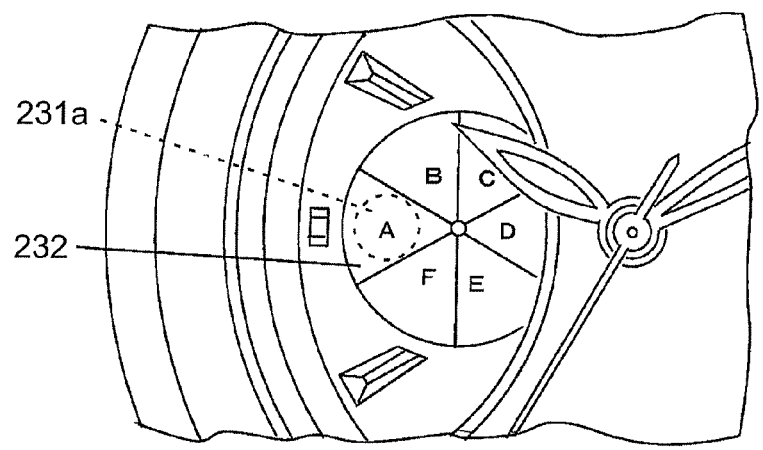
FIG. 46A shows the main part of the watch shown in FIG. 41, and shows that a shielding region of the sensitivity adjuster thereof having a maximum radio wave shielding degree covers an antenna.
Figure 47A:
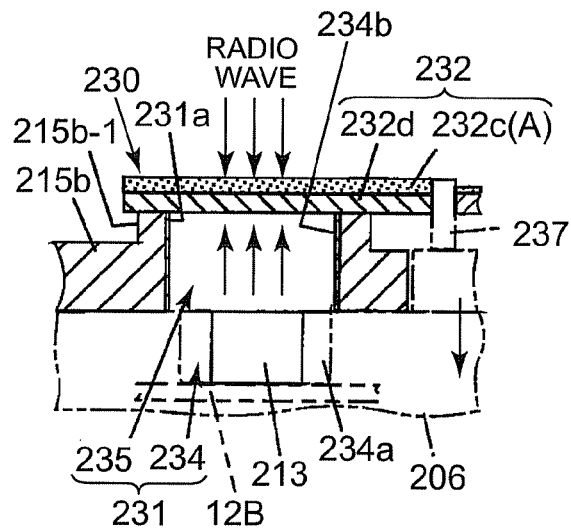
FIG. 47A is a main-part sectional view showing the radio wave shielding degree by the sensitivity adjuster shown in FIG. 46A.

For example, when a user wearing the watch 100 would like to make the watch 100 communicate with an eternal device G which is located very close to the watch 100, the user operates a button, so that the sensitivity adjuster 232 operates to match the shielding region A having the maximum radio wave shielding degree with the radio wave entrance/exit 231a (shown in FIGS. 46A and 47A).

Figure 46B:
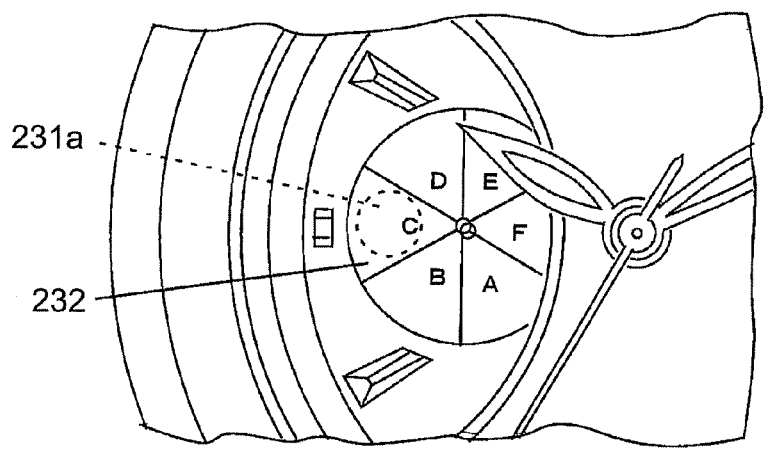
FIG. 46B shows the main part of the watch shown in FIG. 41, and that a shielding region of the sensitivity adjuster thereof having a medium radio wave shielding degree covers the antenna.
Figure 47B:
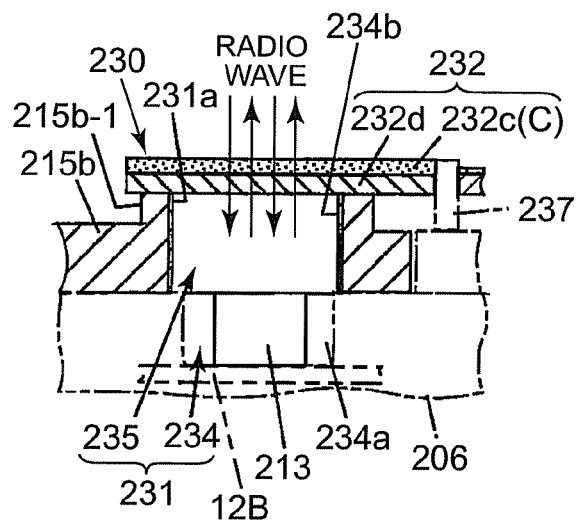
FIG. 47B is a main-part sectional view showing the radio wave shielding degree by the sensitivity adjuster shown in FIG. 46B.

Furthermore, when a user wearing the watch 100 would like to make the watch 100 communicate with an eternal device G which is located in a same room, the user operates a button, so that the sensitivity adjuster 232 operates to match the shielding region C having the medium radio wave shielding degree with the radio wave entrance/exit 231a (shown in FIGS. 46B and 47B).

Figure 46C:
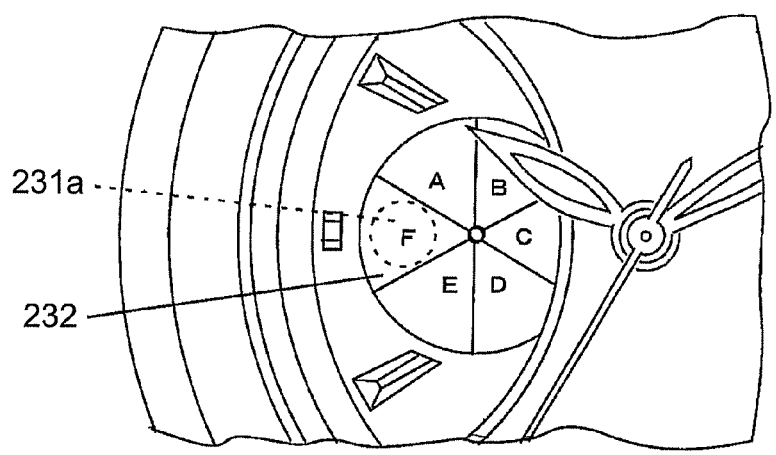
FIG. 46C shows the main part of the watch shown in FIG. 41, and that a shielding region of the sensitivity adjuster thereof having a minimum radio wave shielding degree covers the antenna.
Figure 47C:
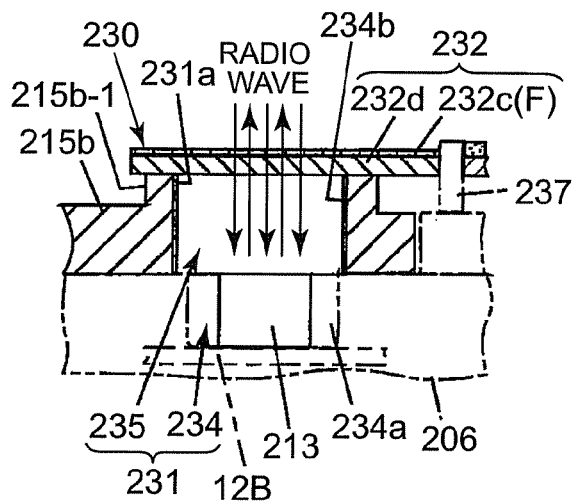
FIG. 47C is a main-part sectional view showing the radio wave shielding degree by the sensitivity adjuster shown in FIG. 46C.

Furthermore, when a user wearing the watch 100 would like to make the watch 100 communicate with an eternal device G which is located several tens meters away from the watch 100, the user operates a button, so that the sensitivity adjuster 232 operates to match the shielding region F having the minimum radio wave shielding degree with the radio wave entrance/exit 231a (shown in FIGS. 46C and 47C).

The sensitivity adjustment device 230 and the watch 100 can obtain the following effects.

That is, according to the sensitivity adjustment device 230 and the watch 100, the radio wave shielding degree can be changed by only moving the sensitivity adjuster 232 with the adjuster moving section 233, and hence the configuration is simple, and the electric power consumption can be reduced.

Furthermore, according to the sensitivity adjustment device 230 and the watch 100, because the radio wave transmission/reception direction is limited by the radio wave path 231 having the peripheral wall constituted of a radio wave shielding material, the accuracy of control of the radio wave sensitivity can be increased.

Furthermore, according to the watch 100, because the movement of the sensitivity adjuster 232 can be visually confirmed through the windshield 4 from the front side of the watch 100, it is easy to confirm the radio wave sensitivity.

[Seventh Embodiment]

Figure 48:
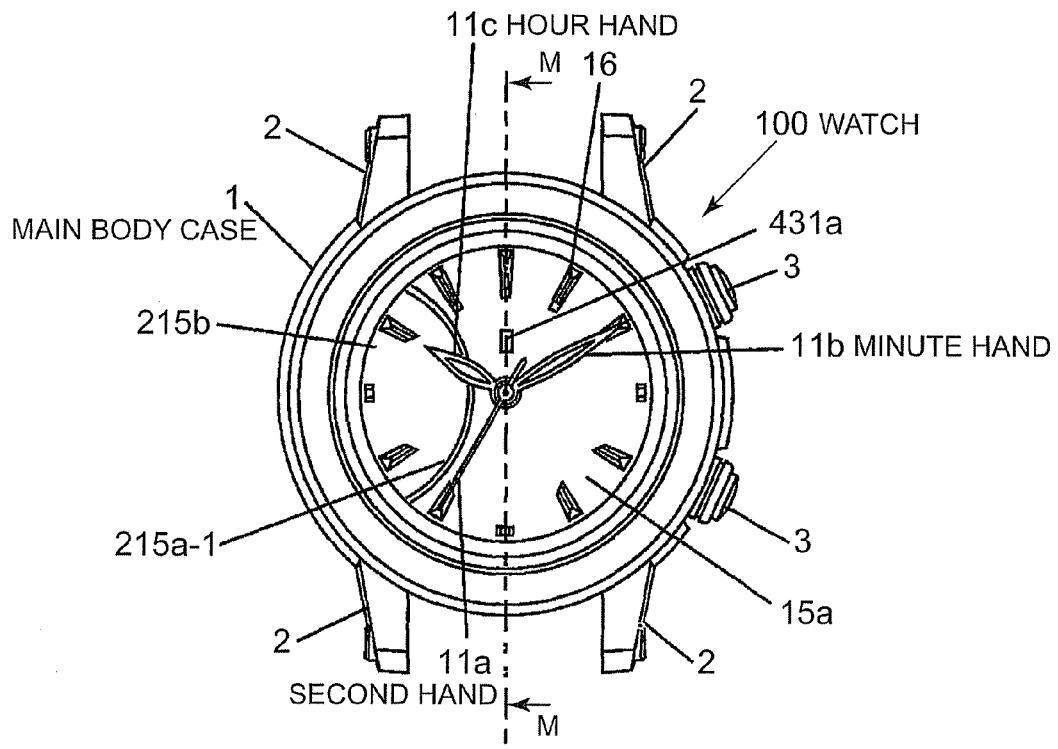
FIG. 48 is a plan view of a watch main body of a watch according to a seventh embodiment of the present invention.
Figure 49:
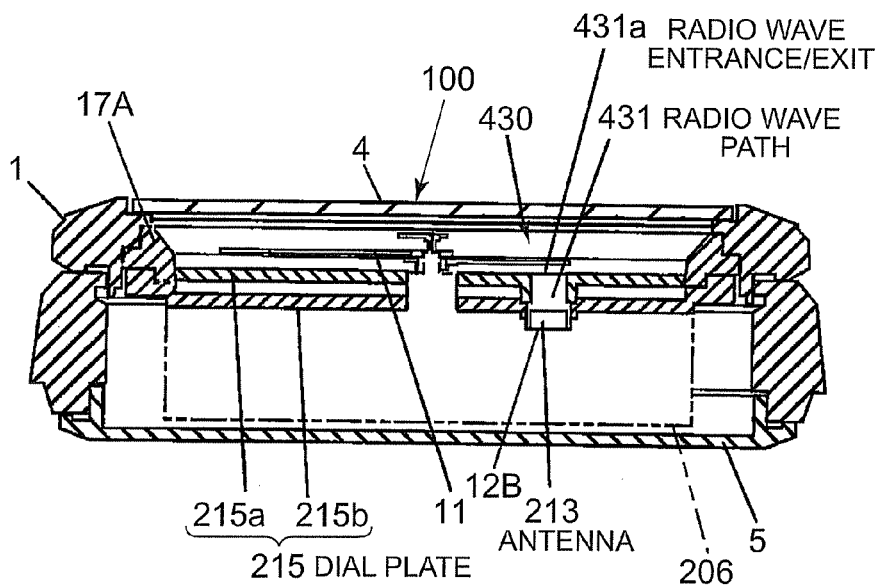
FIG. 49 is a sectional view of the watch taken along the line M-M of FIG. 48.

FIG. 48 is a front view of a watch main body of a watch (hand-type timepiece) in a seventh embodiment of the present invention. FIG. 49 is a sectional view taken along the line M-M of FIG. 48.

The same components as those in the fifth embodiment are denoted by the same reference numerals, and the description thereof is omitted when available.

In the main body case 1 in the seventh embodiment, the housing 206 made of a resin or the like is disposed. In the housing 206, stepping motors 408a, 408b and 408c and gear train mechanisms 409a, 409b and 409c which rotate the secondhand 11a, the minute hand 11b and the hour hand 11c of the hands 11; and the circuit substrate 12B having the chip antenna 213, a microcomputer and other circuit components thereon are disposed.

Next, the circuit configuration in the watch 100 in the embodiment is described.

Figure 50:
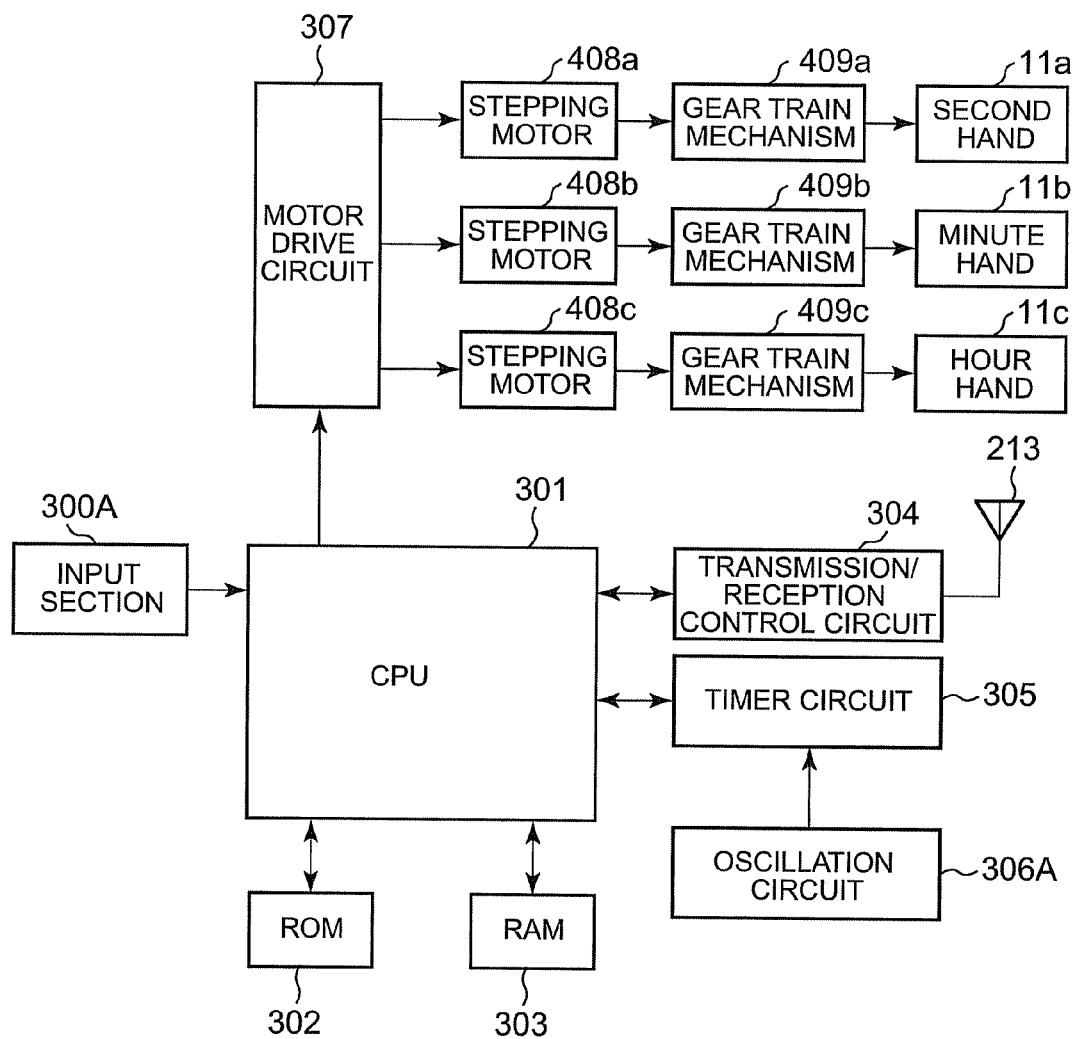
FIG. 50 is a block diagram showing a circuit configuration in the watch shown in FIG. 48.

As shown in FIG. 50, the watch 100 includes an input section 300A constituted of a switch which is operated by the operation buttons 3 or the like, the CPU (Central Processing Unit) 301, the ROM (Read Only Memory) 302, the RAM (Random Access memory) 303, the transmission/reception control circuit 304, the timer circuit 305, the oscillation circuit 306A, the motor drive circuit (display drive circuit) 307 which drives the stepping motors 408a, 408b and 408c, and the antenna 213. The rotations of the stepping motors 408a, 408b and 408c are conveyed to the second hand 11a, the minute hand 11b and the hour hand 11c via the gear train mechanisms 409a, 409b and 409c so as to rotate the second hand 11a, the minute hand 11b and the hour hand 11c, respectively.

The input section 300A is an input section to select each mode of the watch 100 and each function of each mode. In the embodiment, a radio wave transmission/reception mode (communication mode) and a sensitivity level (level of the radio wave sensitivity of the antenna 213) can be selected via the input section 300A.

In addition to various programs, in the embodiment, a sensitivity adjustment program and data required when the sensitivity adjustment program is executed are stored in the ROM 302.

The CPU 301 executes various programs stored in the ROM 302 to execute various modes and functions of the watch 100.

In the embodiment, the CPU 301 executes the sensitivity adjustment program based on a sensitivity level inputted from the input section 300A before transmitting or receiving radio waves, thereby controlling the motor drive circuit 307 and adjusting the radio wave sensitivity of the antenna 312. Hence, the CPU 301 functions as a sensitivity adjustment section.

The motor drive circuit 307, the stepping motors 408a, 408b and 408c, and the gear train mechanisms 409a, 409b and 409c constitute the hand drive section.

Next, a sensitivity adjustment device 430 installed in the watch 100 is described.

The sensitivity adjustment device 430 is an aggregate of the components contributing to adjustment of the radio wave sensitivity. More specifically, the sensitivity adjustment device 430, which includes the above-described hands 11, the CPU 301 executing the sensitivity adjustment program, and the like, has a position and a configuration to dispose the antenna 213.

In the following, the position and the configuration to dispose the antenna 213, which are not described above, are described.

Figure 51A:
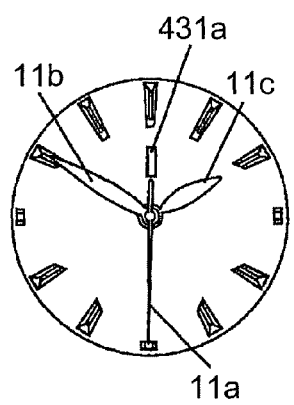
FIG. 51A shows positions of hands in a sensitivity level 5.

As shown in FIG. 51A and the like, under an operation area of the hands 11, a radio wave path 431 is formed. The radio wave path 431 is a concave part which extends from the dial plate 215 to the housing 206. The upper end of the radio wave path 431 is a radio wave entrance/exit 431a, and made in the dial plate 215 to be open.

The radio wave entrance/exit 431a is an opening in the shape of a rectangle, and made at a position over which all of the second hand 11a, the minute hand 11b and the hour hand 11c pass. More specifically, the radio wave entrance/exit 431a is formed between a hand shaft and a time-indicating character 16 which indicates zero o'clock on the dial plate 215.

At the bottom of the radio wave path 431, the chip antenna 213 is installed to directly contact with the circuit substrate 12B.

The peripheral wall 431b of the radio wave path 431 is constituted of a radio wave shielding material. Consequently, the radio wave transmission/reception direction is limited to the vertical direction.

Next, the hands 11 are described.

In the embodiment, as the hands 11, the second hand 11a, the minute hand 11b and the hour hand 11c are provided. The second hand 11a, the minute hand 11b and the hour hand 11c are constituted of radio wave shielding materials.

For example, the secondhand 11a, the minute hand 11b and the hour hand 11c are formed by attaching a magnetic sheet or the like to a base material made of a material which has radio wave penetrating property such as a synthesis resin, or by making the material which has radio wave penetrating property, such as a synthesis resin, include magnetic powder.

Next, a radio wave sensitivity adjustment method in the watch 100 is described.

FIGS. 51 to 55 show examples of the sensitivity adjustment. The higher the numeral value is, the higher the sensitivity level is. FIGS. 51 to 55 respectively correspond to the sensitivity levels 5 to 1.

Figure 51B:
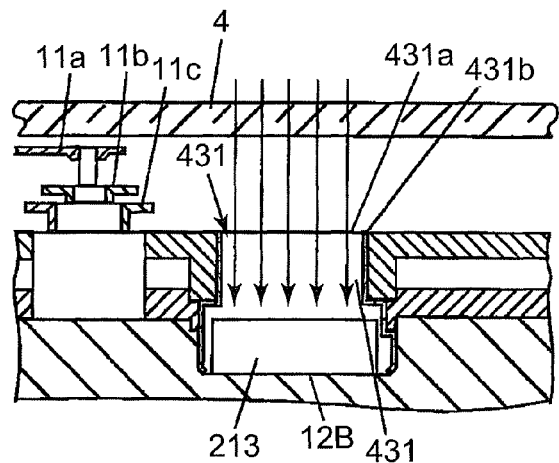
FIG. 51B shows reception of radio waves in the sensitivity level 5.

FIG. 51A shows positions of the hands 11 at the sensitivity level 5. FIG. 51B shows reception of radio waves at the sensitivity level 5.

At the sensitivity level 5, the hands 11 indicate the time of 02:50:30. In this state, none of the hands 11 are overlapped to the radio wave entrance/exit 431a.

Hence, radio waves are not shielded by the hands 11, so that the radio wave sensitivity becomes the maximum.

Figure 52A:
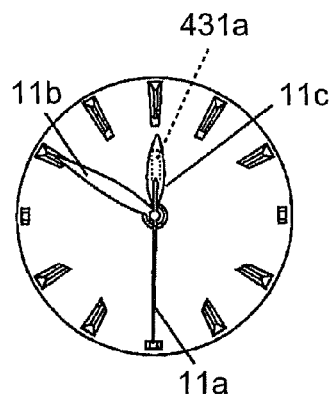
FIG. 52A shows positions of the hands in a sensitivity level 4.
Figure 52B:
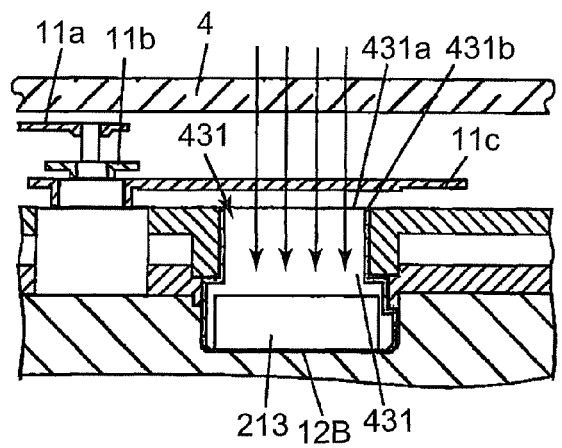
FIG. 52B shows reception of radio waves in the sensitivity level 4.

FIG. 52A shows positions of the hands 11 at the sensitivity level 4. FIG. 52B shows reception of radio waves at the sensitivity level 4.

At the sensitivity level 4, the hands 11 indicate the time of 00:50:30. In this state, the hour hand 11c is overlapped to the radio wave entrance/exit 431a, but the minute hand 11b and the second hand 11a are not overlapped to the radio wave entrance/exit 431a.

Hence, radio waves are shielded by the hand hour 11c, so that the radio wave sensitivity at the sensitivity level 4 becomes lower than that at the sensitivity level 5.

Figure 53A:
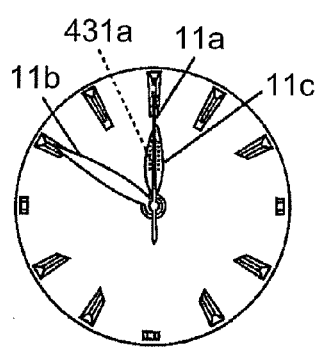
FIG. 53A shows positions of the hands in a sensitivity level 3.
Figure 53B:
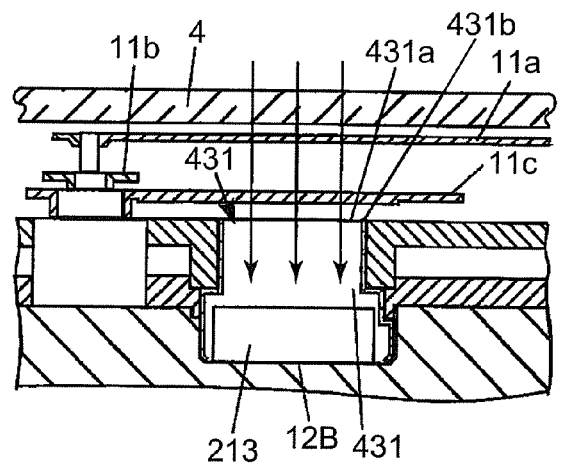
FIG. 53B shows reception of radio waves in the sensitivity level 3.

FIG. 53A shows positions of the hands 11 at the sensitivity level 3. FIG. 53B shows reception of radio waves at the sensitivity level 3.

At the sensitivity level 3, the hands 11 indicate the time of 00:50:00. In this state, the hour hand 11c and the second hand 11a are overlapped to the radio wave entrance/exit 431a, but the minute hand 11b is not overlapped to the radio wave entrance/exit 431a.

Hence, radio waves are shielded by the hand hour 11c and the second hand 11a which are on top of each other, so that the radio wave sensitivity at the sensitivity level 3 becomes lower than that at the sensitivity level 4.

Figure 54A:
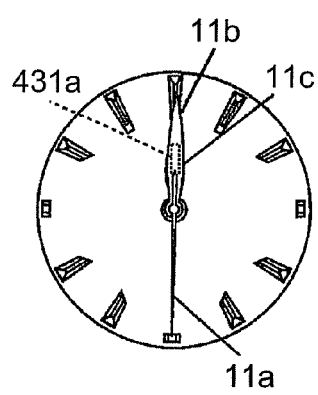
FIG. 54A shows positions of the hands in a sensitivity level 2.
Figure 54B:
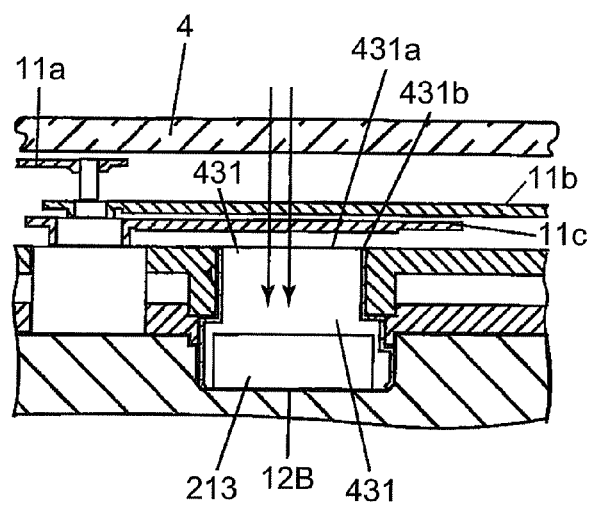
FIG. 54B shows reception of radio waves in the sensitivity level 2.

FIG. 54A shows positions of the hands 11 at the sensitivity level 2. FIG. 54B shows reception of radio waves at the sensitivity level 2.

At the sensitivity level 2, the hands 11 indicate the time of 00:00:30. In this state, the hour hand 11c and the minute hand 11b are overlapped to the radio wave entrance/exit 431a, but the second hand 11c is not overlapped to the radio wave entrance/exit 431a.

Hence, radio waves are shielded by the hand hour 11c and the minute hand 11b which are on top of each other, so that the radio wave sensitivity at the sensitivity level 2 becomes lower than that at the sensitivity level 3.

The reason is as follows.

The minute hand 11b rotates right above the hour hand 11c, and the second hand 11a rotates further above the hour hand 11c as compared with the minute hand 11b. In addition, the minute hand 11b is wider than the second hand 11a.

Hence, the hour hand 11c and the minute hand 11b on top of each other have a higher radio wave shielding degree than the hour hand 11c and the second hand 11a on top of each other.

Therefore, the sensitivity level in the case of the hour hand 11c and the minute hand 11b being on top of each other is lower than the sensitivity level in the case of the hour hand 11c and the second hand 11a being on top of each other.

Figure 55A:
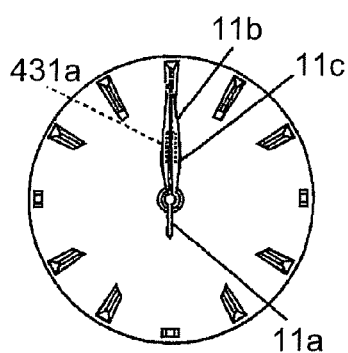
FIG. 55A shows positions of the hands in a sensitivity level 1.
Figure 55B:
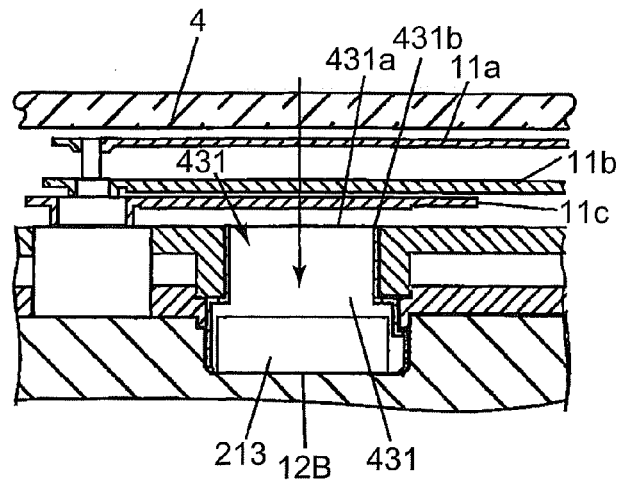
FIG. 55B shows reception of radio waves in the sensitivity level 1.

FIG. 55A shows positions of the hands 11 at the sensitivity level 1. FIG. 55B shows reception of radio waves at the sensitivity level 1.

At the sensitivity level 1, the hands 11 indicate the time of 00:00:00. In this state, all of the hour hand 11c, the minute hand 11b and the second hand 11c are overlapped to the radio wave entrance/exit 431a.

Hence, radio waves are shielded by all of the hour hand 11c, the minute hand 11b and the second hand 11a, so that the radio wave sensitivity at the sensitivity level 1 becomes lower than that at the sensitivity level 2.

Figure 56:
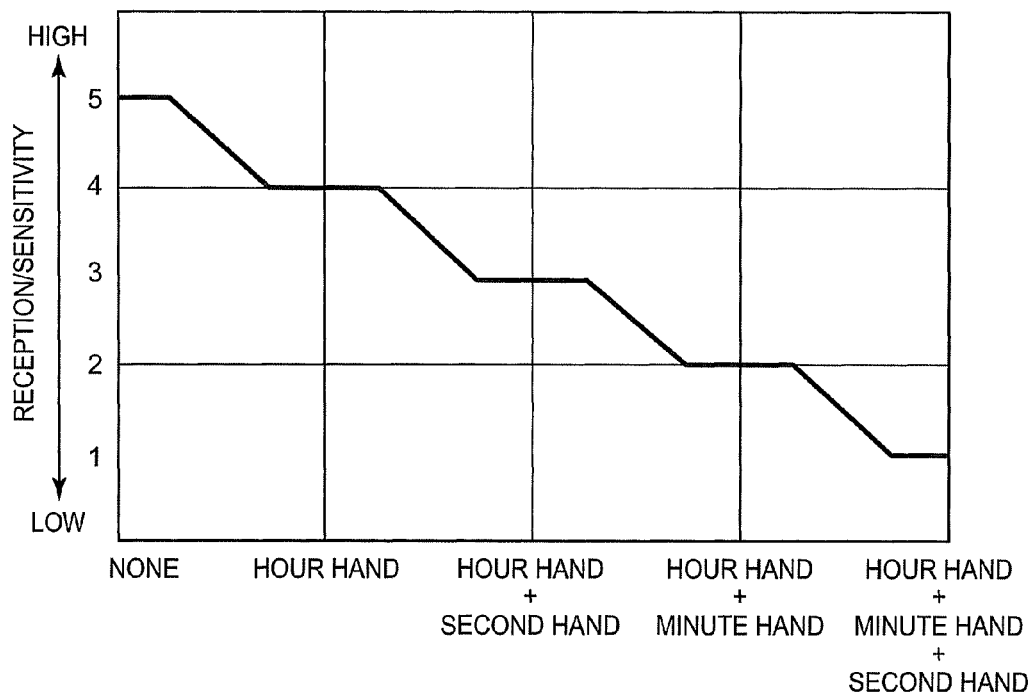
FIG. 56 is a graph showing an example of a relationship between overlapping degrees of the hands and an antenna and the sensitivity levels.

FIG. 56 is a graph showing an example of the transition of the sensitivity levels shown in FIGS. 51 to 55.

As shown in FIG. 56, the sensitivity adjustment device 430 can change the radio wave sensitivity between five levels by changing the positions of the hands 11.

In the embodiment, although the radio wave sensitivity is changed between five levels, this is not a limit. The radio wave sensitivity may be changed between more than five levels. That is, other states (positions) of the hands 11 can be also used for sensitivity levels, for example, a state in which the hour hand 11c is not overlapped to the radio wave entrance/exit 431a, but one of the minute hand 11b and the second hand 11a is overlapped to the radio wave entrance/exit 431a; and a state in which the hour hand 11c is not overlapped to the radio wave entrance/exit 431a, but both the minute hand 11b and the second hand 11a are overlapped to the radio wave entrance/exit 431a.

The watch 100 in the embodiment can obtain the following effects.

First, the sensitivity adjustment can be performed by a conventional hand drive section rotating conventional hands 11. Accordingly, the configuration is simple.

Second, the overlapping degree of the hands 11 and the radio wave entrance/exit 431a can be visually confirmed from outside. Accordingly, it is easy to confirm the current sensitivity level.

Third, the sensitivity levels can be inputted from the input section 300A. Accordingly, a desired sensitivity level can be surely and promptly obtained. In addition, if a necessary sensitivity level is known beforehand, the necessary sensitivity level can be set with one attempt. Accordingly, the electric power consumption can be reduced.

Fourth, the radio wave transmission/reception direction is limited by the radio wave path 431 having the peripheral wall 431b constituted of the radio wave shielding material. Accordingly, the accuracy of control of the radio wave sensitivity can be increased.

In the seventh embodiment, as a hand-type timepiece, a watch is used. However, as long as a timepiece has hands, it is not necessary that the timepiece is a watch.

The scope of the present invention is not limited to the embodiments described above, and hence includes the scope of claims attached below and equivalences thereof.

This application is based upon and claims the benefit of priority under 35 USC 119 of Japanese Patent Applications No. 2011-066887 filed on Mar. 25, 2011, No. 2011-066892 filed on Mar. 25, 2011, No. 2011-066895 filed on Mar. 25, 2011, No. 2011-145811 filed on Jun. 30, 2011, and No. 2011-249241 filed on Nov. 15, 2011, the entire disclosure of which, including the descriptions, claims, drawings, and abstracts, is incorporated herein by reference in its entirety.

What is claimed is:

1. A sensitivity adjustment device comprising:
an antenna which wirelessly transmits/receives a signal to/from an external device;
a hand which is rotated above the antenna by a hand drive section; and
a sensitivity adjustment section which makes the hand drive section rotate the hand to adjust an overlapping degree of the hand and the antenna, so as to adjust radio wave sensitivity of the antenna.

2. The sensitivity adjustment device according to claim 1 further comprising an input section by which a sensitivity level is inputted, wherein
the sensitivity adjustment device includes multiple hands which are rotated above the antenna by a hand drive section; and
the sensitivity adjustment section makes the hand drive section rotate the hands in accordance with the sensitivity level inputted by the input section to adjust the overlapping degree of the hands and the antenna.

3. The sensitivity adjustment device according to claim 2, wherein
the hands include an hour hand and a minute hand, and
the sensitivity adjustment section controls the hand drive section to selectively place the hands in such a position that (a) neither the hour hand nor the minute hand is overlapped to the antenna, or (b) at least one of the hour hand and the minute hand is overlapped to the antenna, prior to a transmission and reception of a radio wave.

4. The sensitivity adjustment device according to claim 2, wherein
the hands include an hour hand, a minute hand and a second hand, and
the sensitivity adjustment section controls the hand drive section to selectively place the hands in such a position that (a) all of the hour hand, the minute hand and the second hand are not overlapped to the antenna, or (b) at least one of the hour hand, the minute hand and the second hand is overlapped to the antenna, prior to a transmission and reception of a radio wave.

5. The sensitivity adjustment device according to claim 1 further comprising:
a dial plate between the hand and the antenna; and
a radio wave path including (a) a radio wave entrance/exit made to be open in the dial plate, (b) the antenna at a bottom, and (c) a peripheral wall constituted of a radio wave shielding material.

* * * * *